United States Patent
Jupp et al.

(10) Patent No.: US 7,187,452 B2
(45) Date of Patent: Mar. 6, 2007

(54) LIDAR SYSTEM AND METHOD

(75) Inventors: David L. Jupp, Acton (AU); David A. Parkin, Acton (AU); George V. Poropat, Acton (AU); Jennifer L. Lovell, Acton (AU)

(73) Assignee: Commonwealth Scientific and Industrial Research Organisation (AU)

(*) Notice: Subject to any disclaimer, the term of this patent is extended or adjusted under 35 U.S.C. 154(b) by 187 days.

(21) Appl. No.: 10/467,607

(22) PCT Filed: Jan. 2, 2002

(86) PCT No.: PCT/AU02/00001

§ 371 (c)(1),
(2), (4) Date: Jan. 22, 2004

(87) PCT Pub. No.: WO02/065153

PCT Pub. Date: Aug. 22, 2002

(65) Prior Publication Data

US 2004/0130702 A1   Jul. 8, 2004

(30) Foreign Application Priority Data

Feb. 9, 2001   (AU) .................................... PR3014

(51) Int. Cl.
*G01B 11/02*   (2006.01)

(52) U.S. Cl. .................... 356/501; 356/3.01; 356/4.01; 356/5.01

(58) Field of Classification Search ................ 356/501
See application file for complete search history.

(56) References Cited

U.S. PATENT DOCUMENTS

| 5,557,397 A | * | 9/1996 | Hyde et al. ................ 356/5.01 |
| 5,638,164 A | | 6/1997 | Landau |
| 5,886,662 A | * | 3/1999 | Johnson .................... 342/25 A |

FOREIGN PATENT DOCUMENTS

| DE | 43 39 108 C1 | 1/1995 |
| WO | WO 01/31290 A2 | 5/2001 |

OTHER PUBLICATIONS

International Search Report for PCT/NZ02/0035, Jul. 1998.
"Method for Evaluating Stock of Trees," English Abstract (published Sep. 27, 2000) of Russian Patent RU2156567.

(Continued)

*Primary Examiner*—Thomas H. Tarcza
*Assistant Examiner*—Luke D. Ratcliffe

(57) ABSTRACT

A ground-based method is disclosed which determines the spatial statistics of fragmented and spatially variably dispersed objects in a transmissive medium, by generating a plurality of pulsed beams of laser energy, the beams having selectively variable width and shape; selectively varying the width and shape of the beams; directing the beams toward the dispersed objects; measuring the time and/or phase and intensity of signals returned by the dispersed objects, and calculating the apparent reflectance of the dispersed objects as a function of the range of the dispersed objects for each beam width and beam shape.

8 Claims, 24 Drawing Sheets

CAR Lidar pulse with Rayleigh and Gaussian approximations.

OTHER PUBLICATIONS

"Sky scanner sees the forest and the trees," CSIRO Media Release, Mar. 28, 2000.

"Canopy Lidar for Sounding Vegetation Canopies and estimating biomass," CSIRO presentation, made at least as early as Mar. 29, 2000.

"CSIRO Vegetation Assessment and Monitoring Initiative," Earth Observation Centre Presentation made at least as early as Mar. 29, 2000.

"Lidar Mapping of Vegetation Canopies," Media release, Mar. 29, 2000, http://www.eoc.csiro.au/vsis/lidhome.htm.old.

Supplementary European Search Report for EP 02 70 9883, Nov. 18, 2005.

"Imaging Laser Radar for High-Speed Monitoring of the Environment," English Abstract, Proceedings of the Spie-Int, Soc. Opt. Eng. USA, vol. 3207, 1998, pp. 50-64, XP00235787.

"Surface Lidar Remote Sensing of Basal Area and Biomass in Deciduous Forests of Eastern Maryland, USA," Elsevier Science Inc, New York NY USA, vol. 67, No. 1, Jan. 1999, pp. 83-98, XP002354788.

"Feasibility for Estimation of Single Tree Characteristics Using Laser Scanner," International Geoscience and Remote Sensing Symposium, Piscataway, NJ, USA, vol. 3, 2000, pp. 981-983, XP002354789.

\* cited by examiner

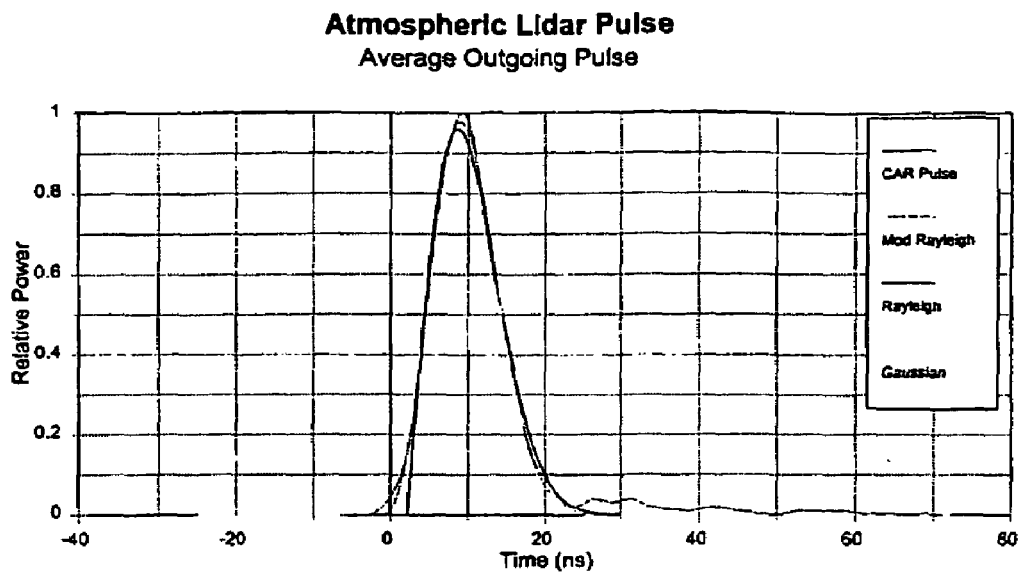
FIG 1.1: CAR Lidar pulse with Rayleigh and Gaussian approximations.
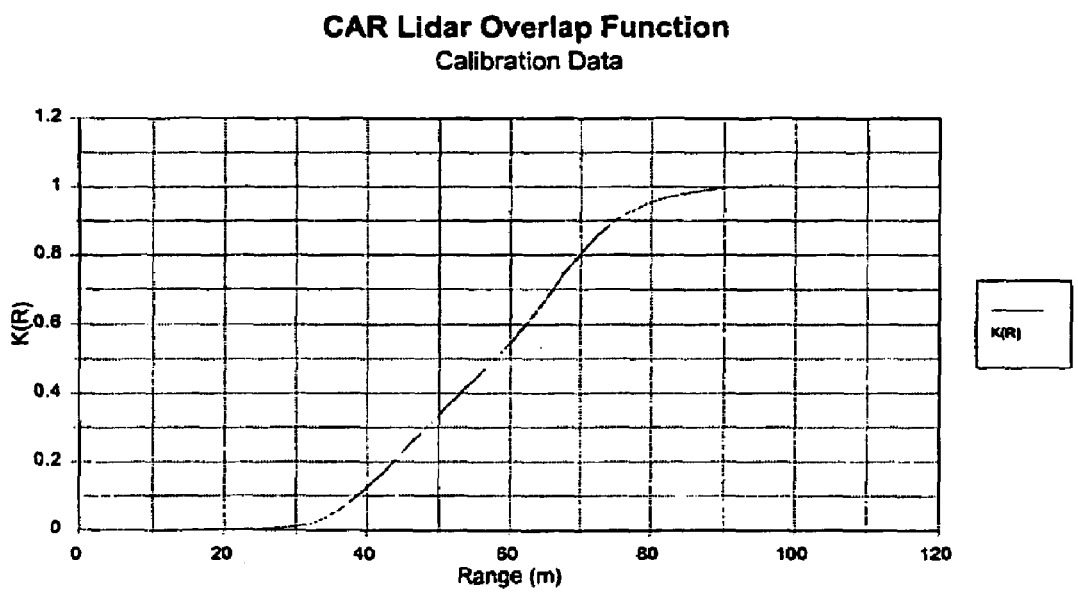
FIG 1.2: Overlap function defining near range calibration for CAR Lidar

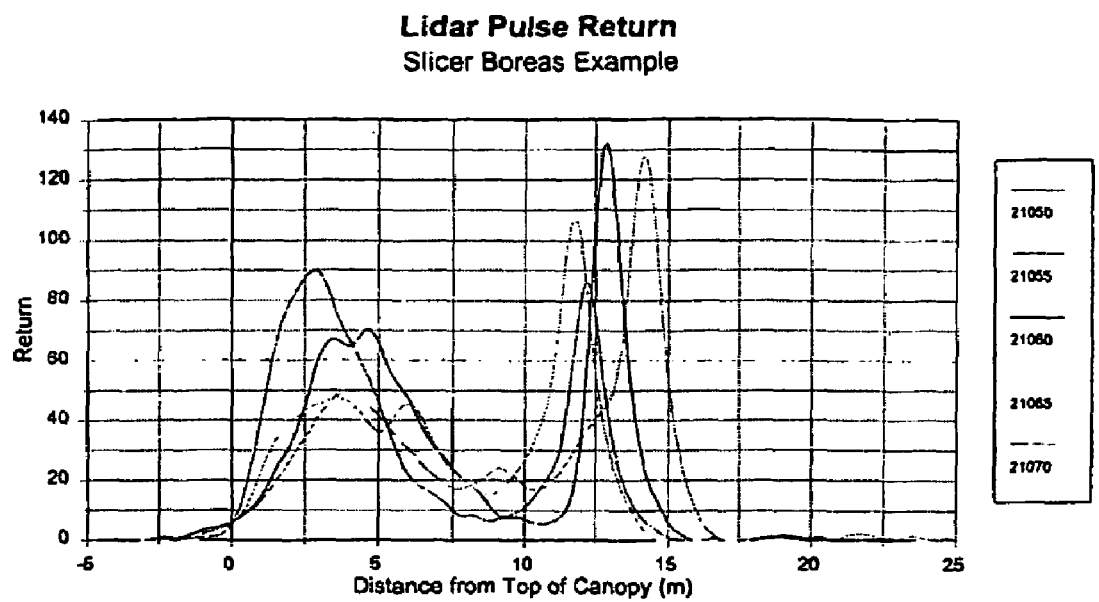
FIG 1.3: Lidar pulse returns from a forest canopy
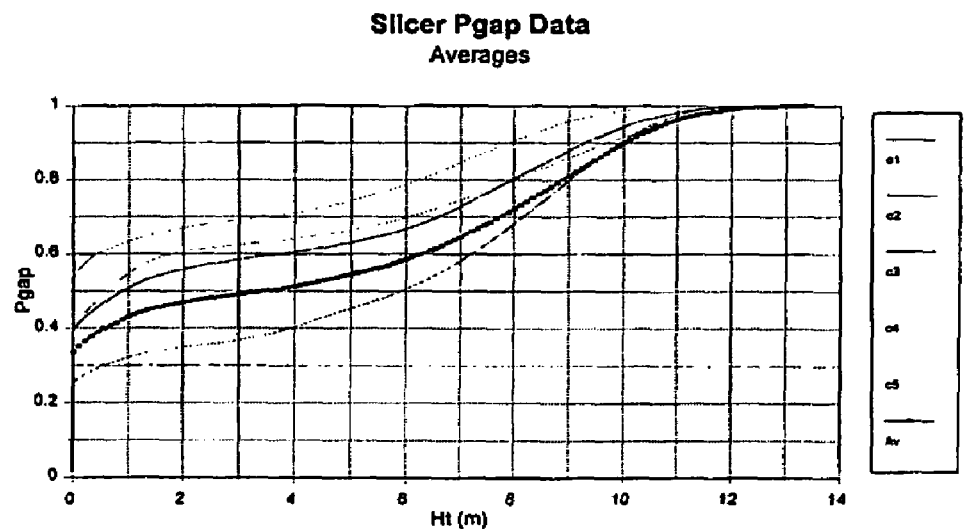
FIG 1.4: Gap probabilities derived from SLICER data.

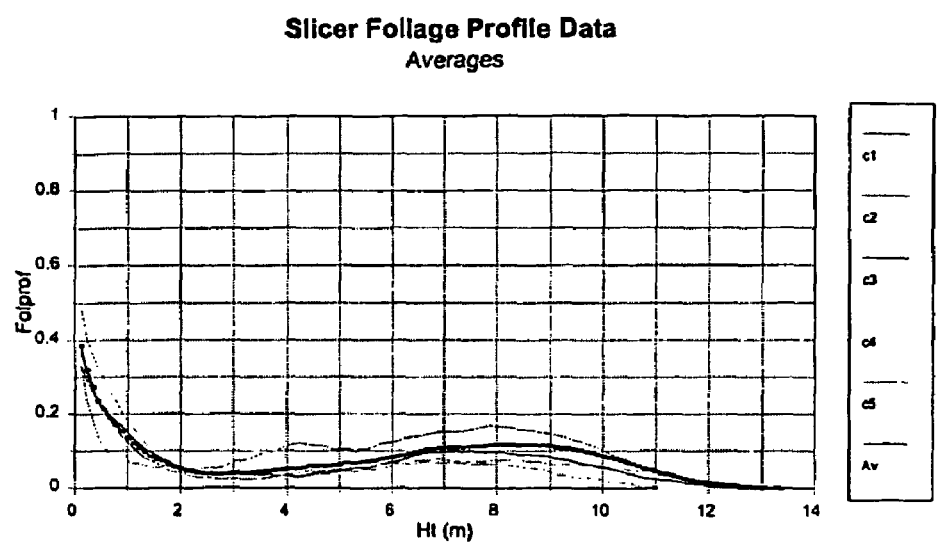
FIG 1.5: Estimated apparent foliage profiles for SLICER data.

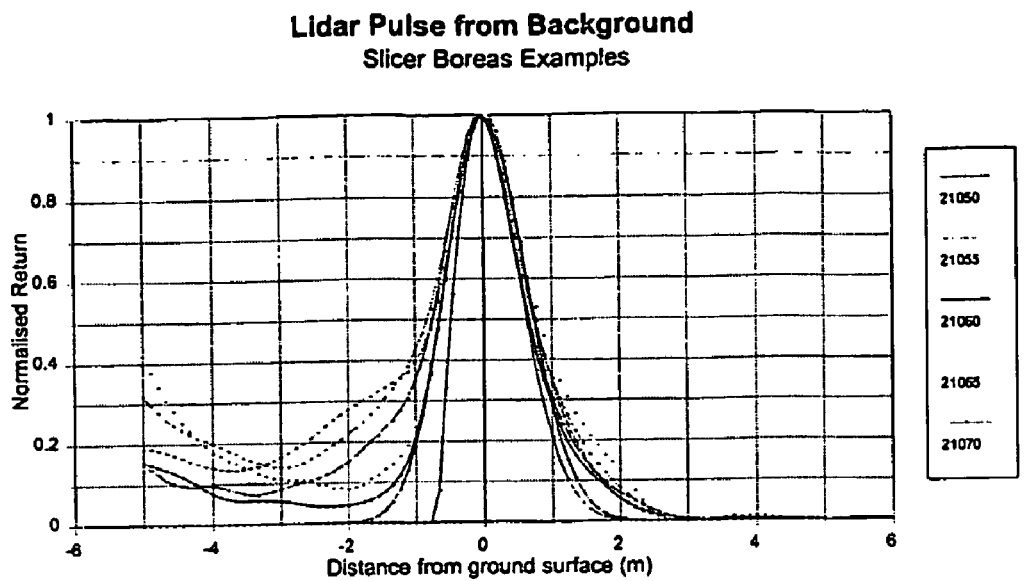
FIG 1.6: Ground pulses from SLICER normalised to unit at ground.
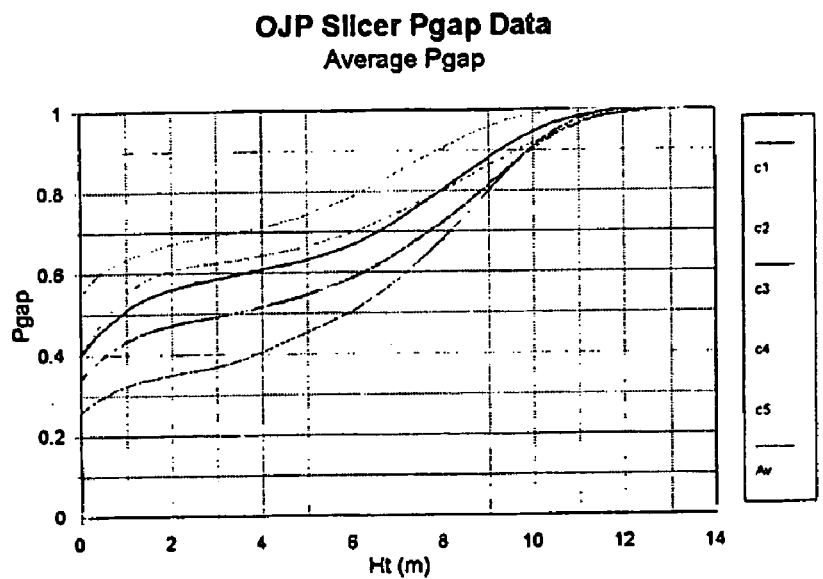
FIG 1.7: Line and Total Average SLICER Pgap Profiles.

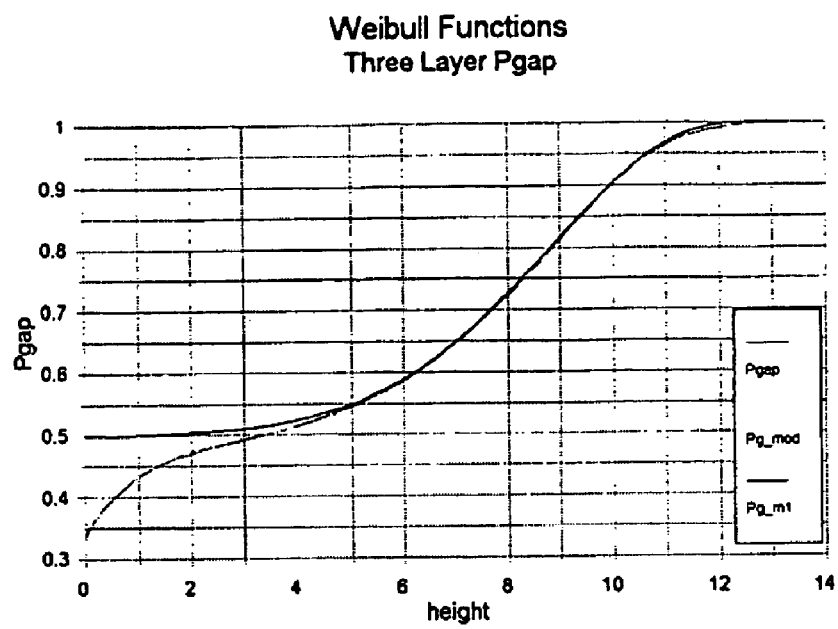
FIG 1.8: Gap profile for fitted Weibull model
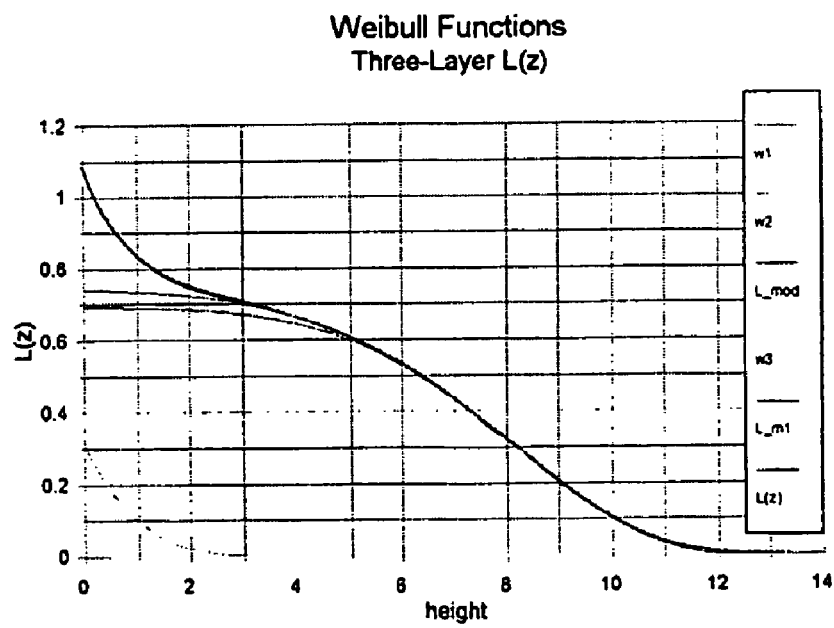
FIG 1.9: Fitted Weibull function components

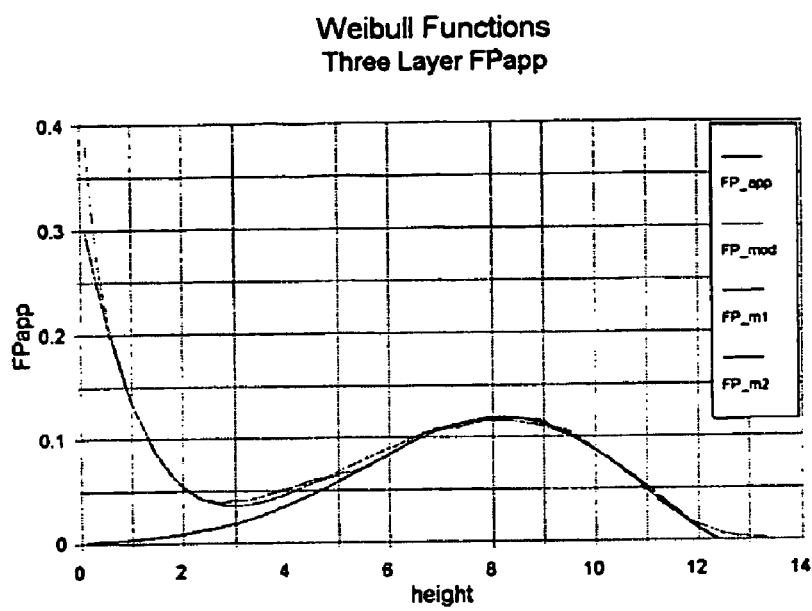
FIG 1.10: Fitted Weibull Foliage Profile Models
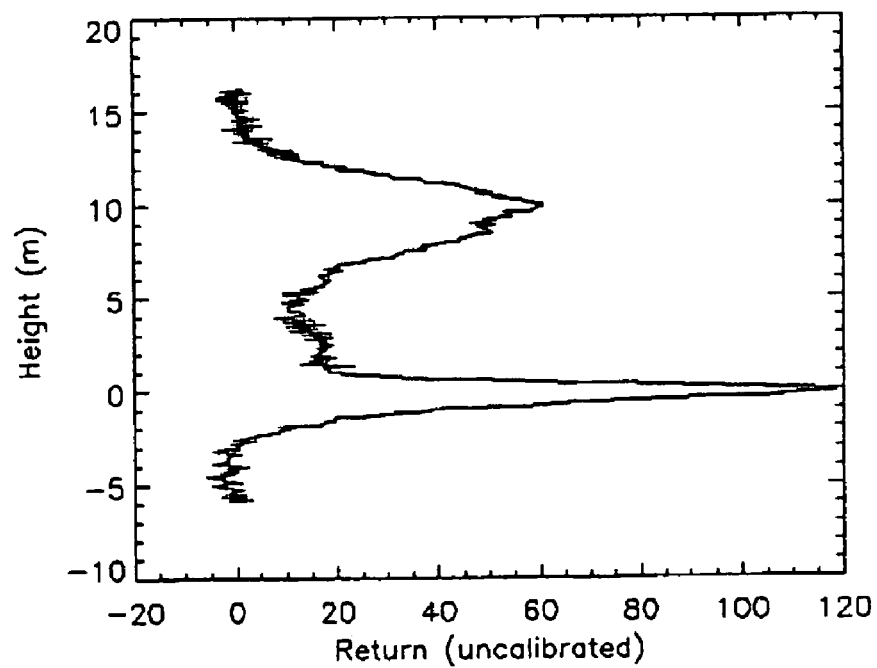
FIG 2.1: SLICER Lidar Waveform (BOREAS Data)

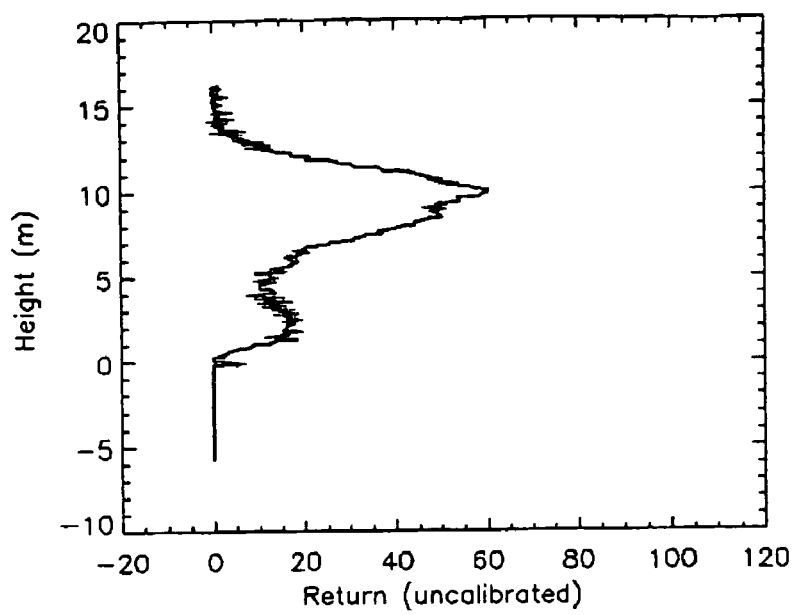
FIG 2.2: Lidar waveform corrected for ground pulse
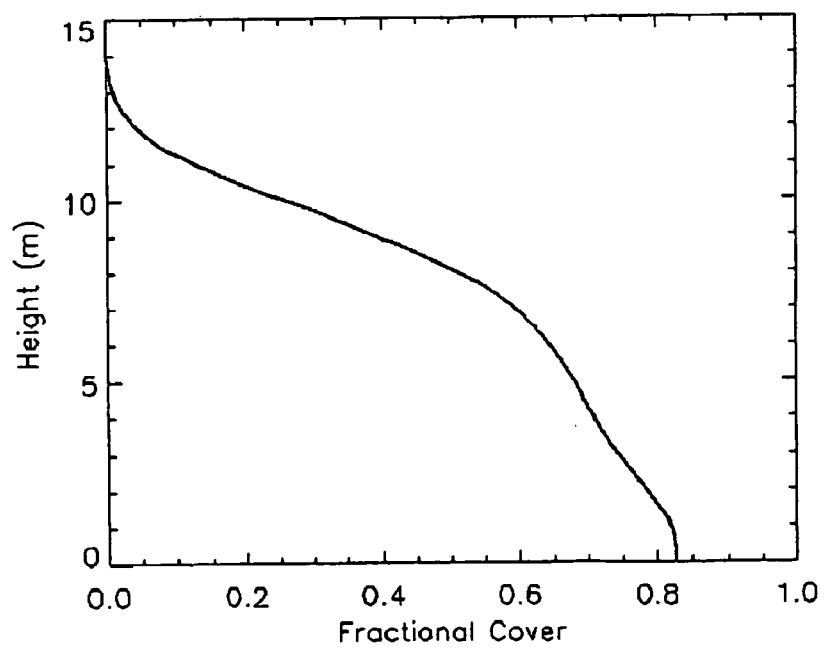
FIG 2.3: Fractional Cover as a function of Height

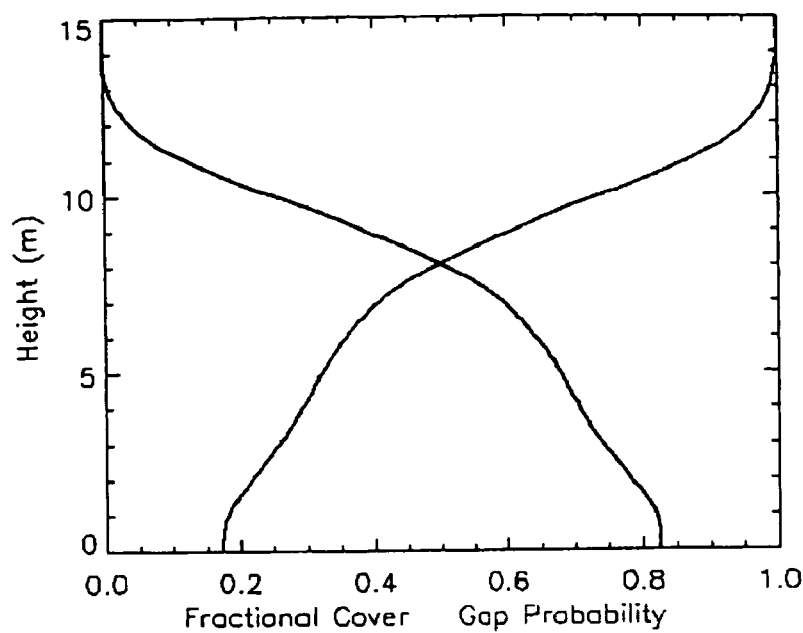
FIG 2.4: Fractional Cover and Gap Probability
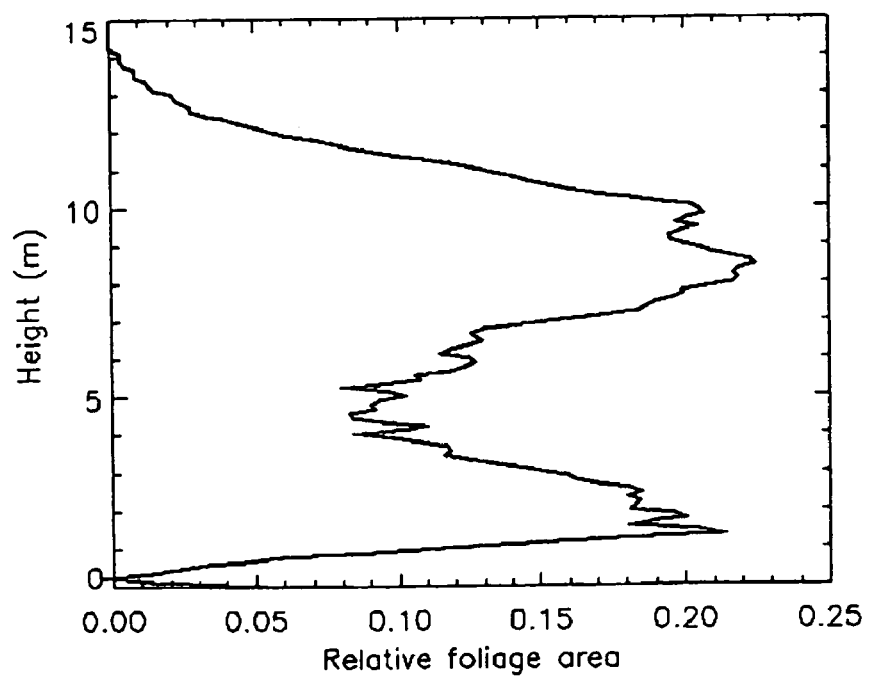
FIG 2.5: Apparent Foliage Profile

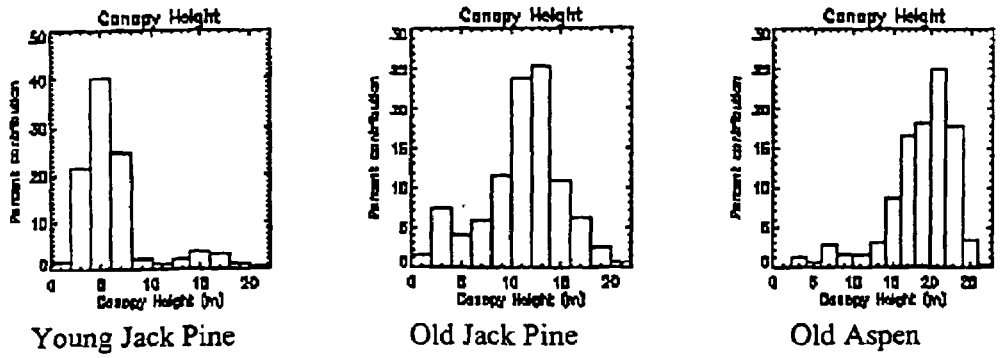
FIG 2.6: Canopy height distributions at the three sites
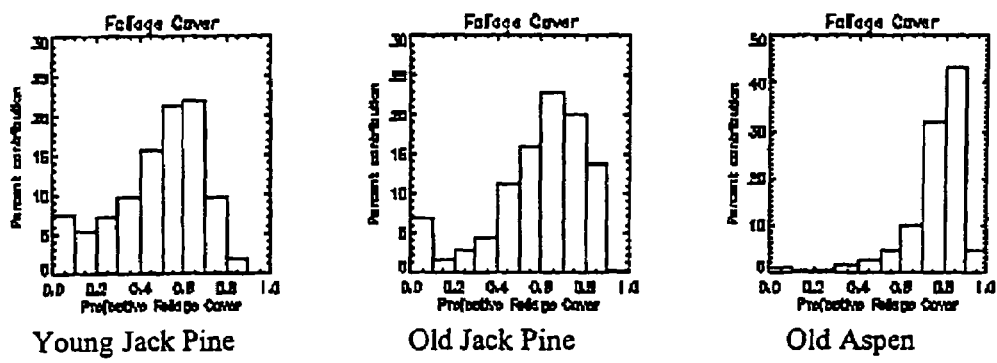
FIG 2.7: Foliage cover histograms for the three sites.
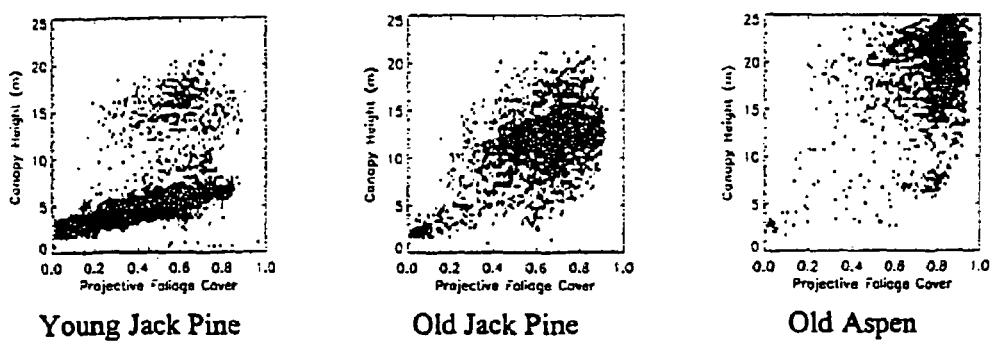
FIG 2.8: Structure Diagrams for the three sites.

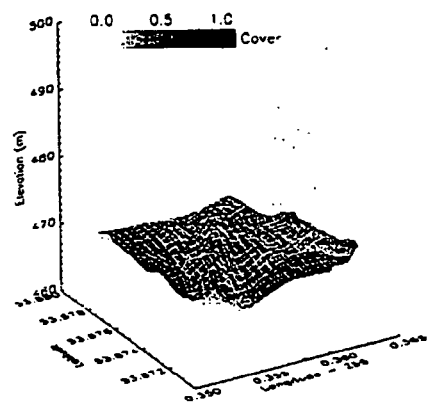
Young Jack Pine
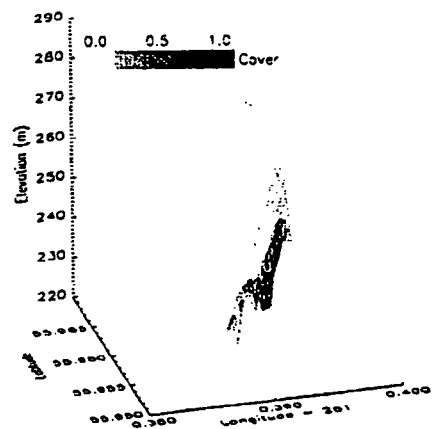
Old Jack Pine
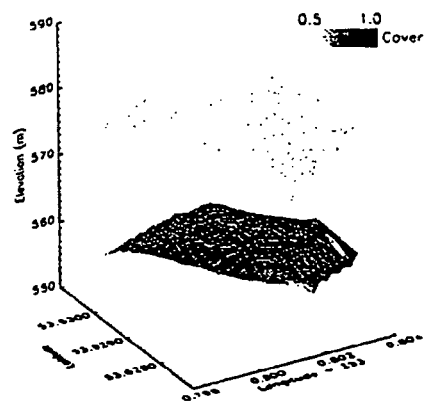
Old Aspen
FIG 2.9: Spatial distribution of cover and height for the three sites

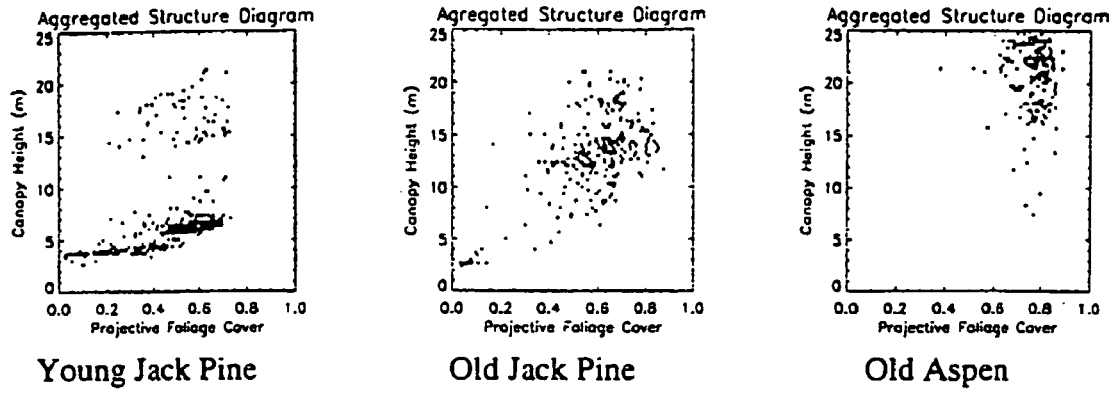
FIG 2.10: structure Diagrams after 3x3 aggregation
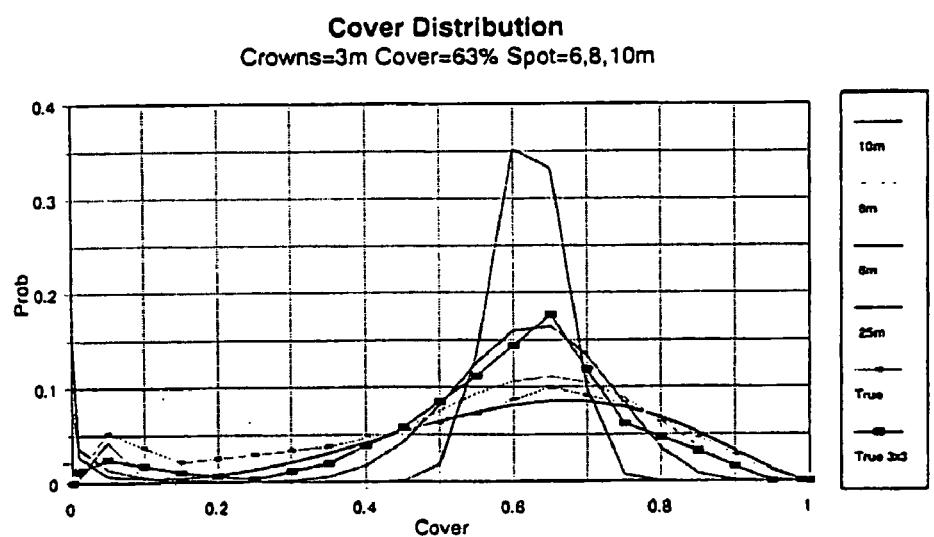
FIG 2.11: Cover as a function of spot size.

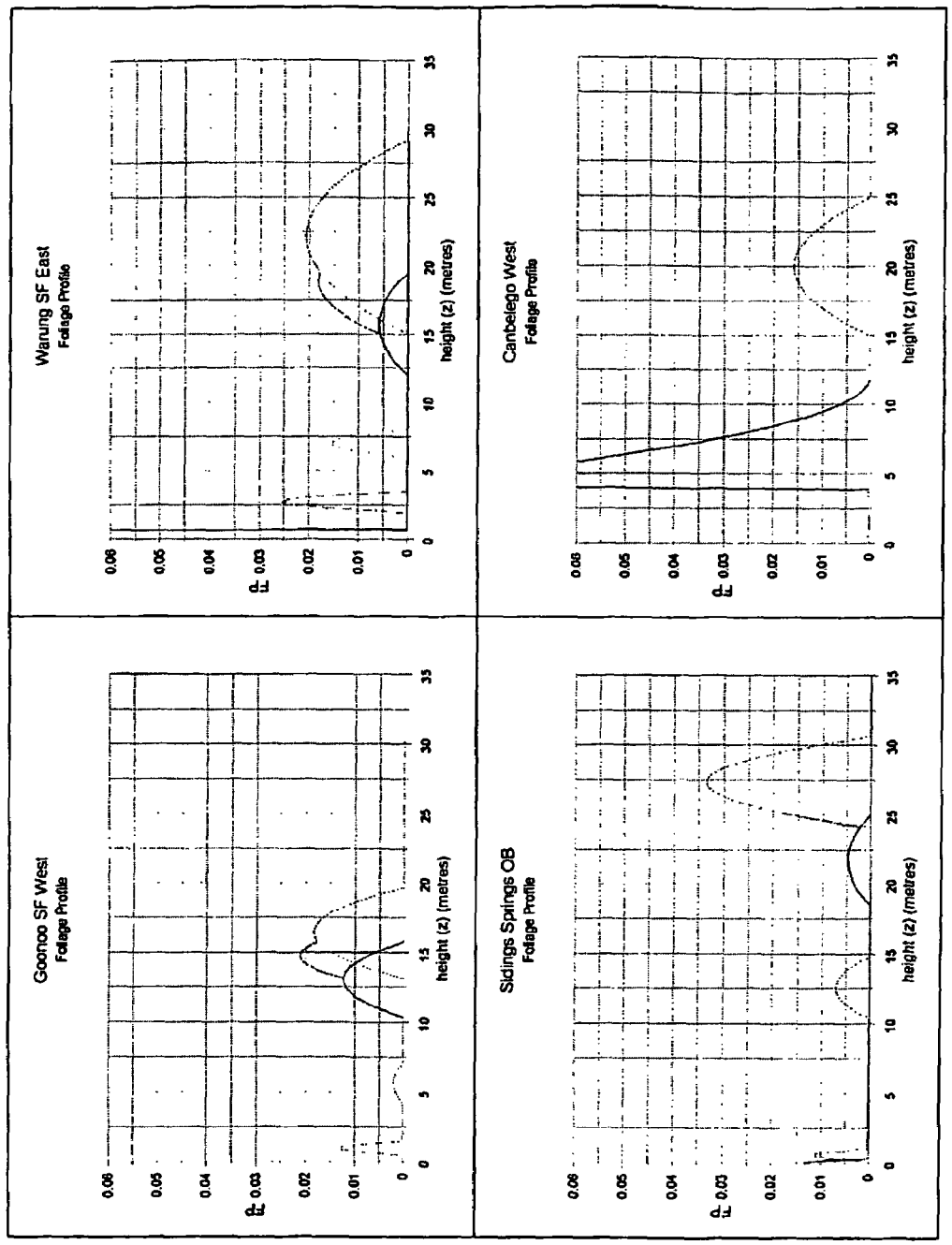
FIG 3.1: Foliage Profiles for Four Sites in the MDB

FIG 3.2: Apparent Reflectance Models for the four sites
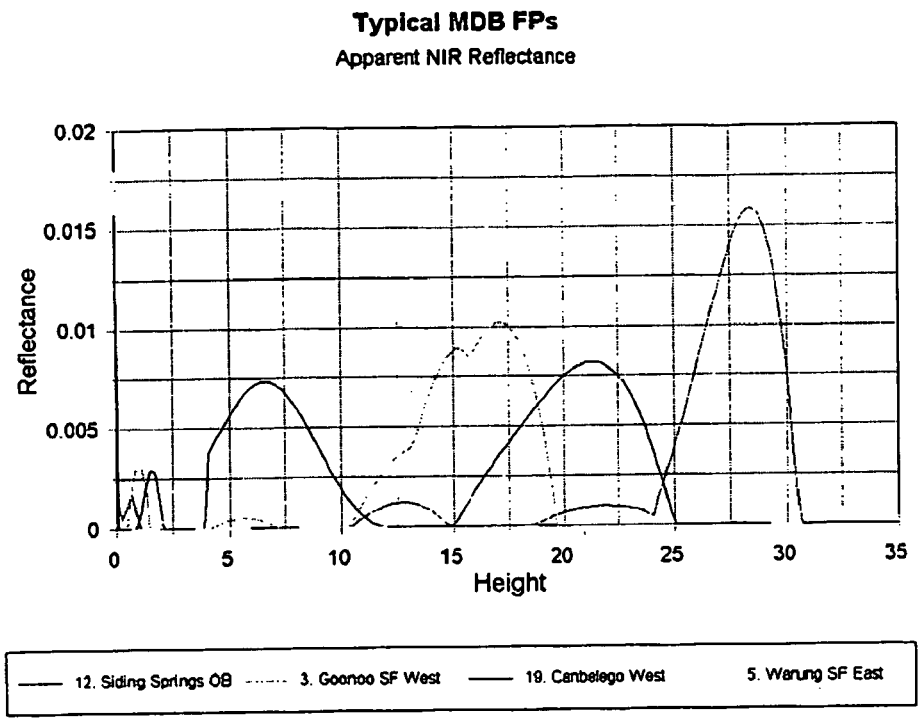
FIG 3.3: SNR model for SLICER Instrument
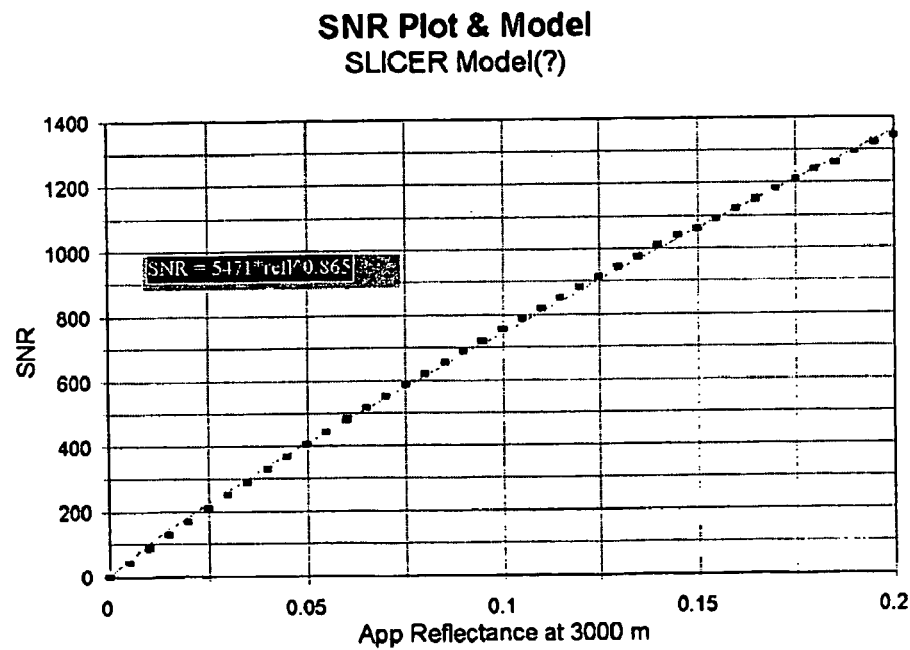

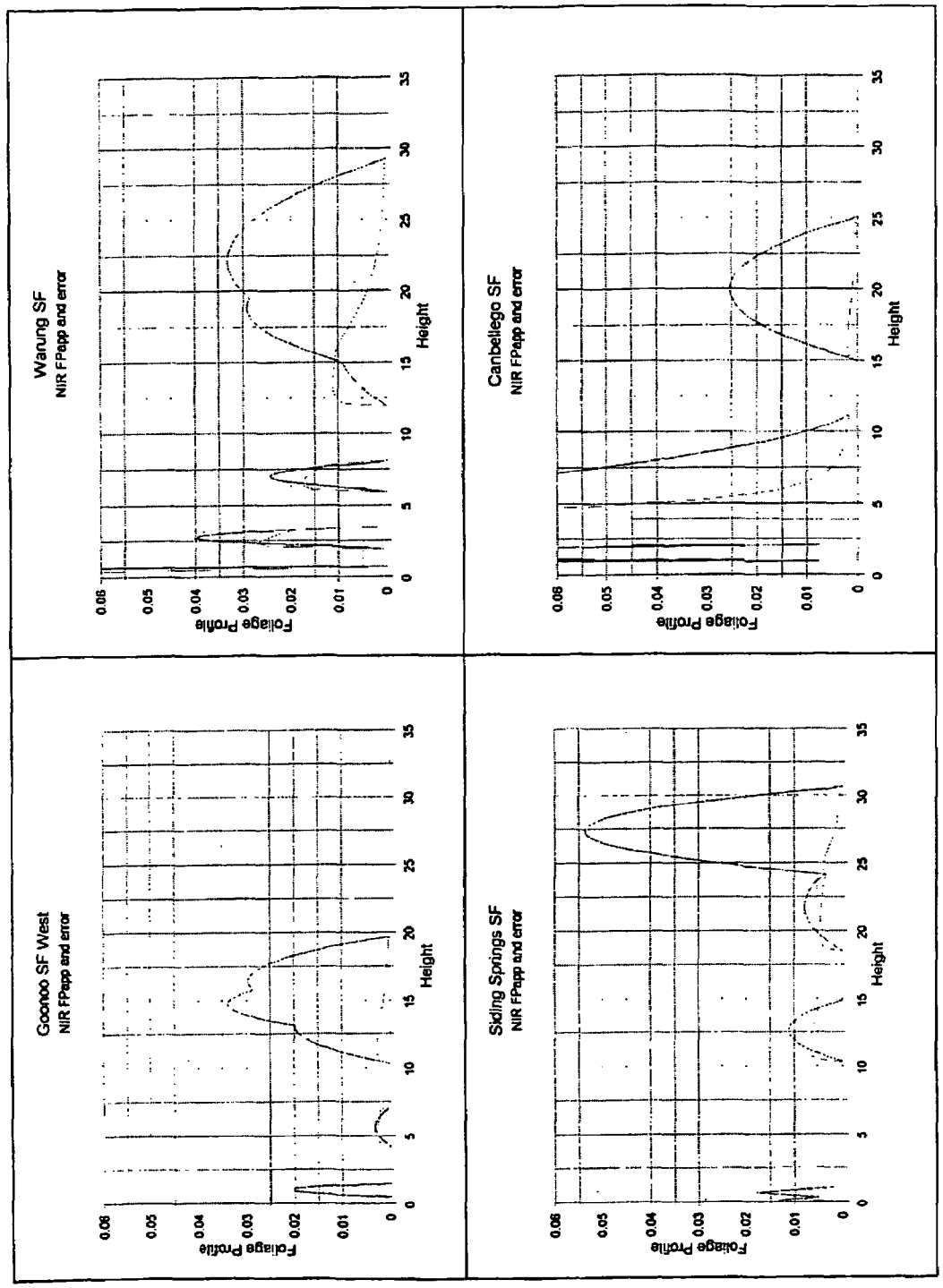
FIG 3.4: Error in Apparent Foliage Profile inversion

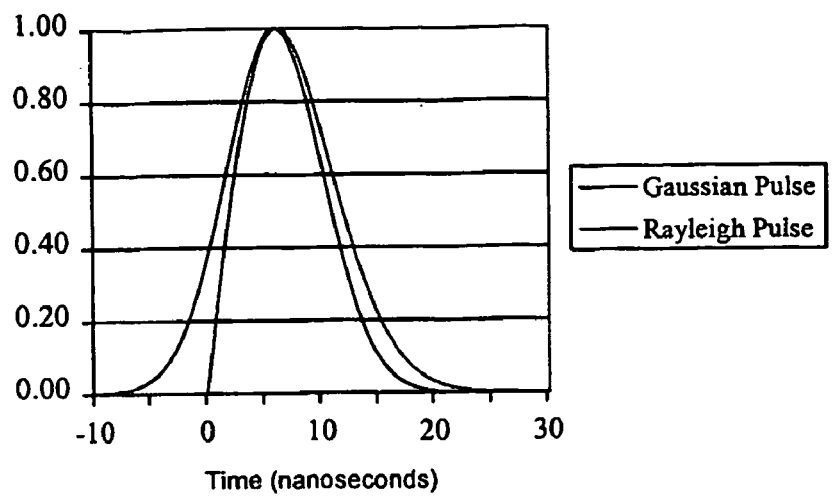
FIG 4.1: Comparison of Gaussian and Rayleigh Pulses
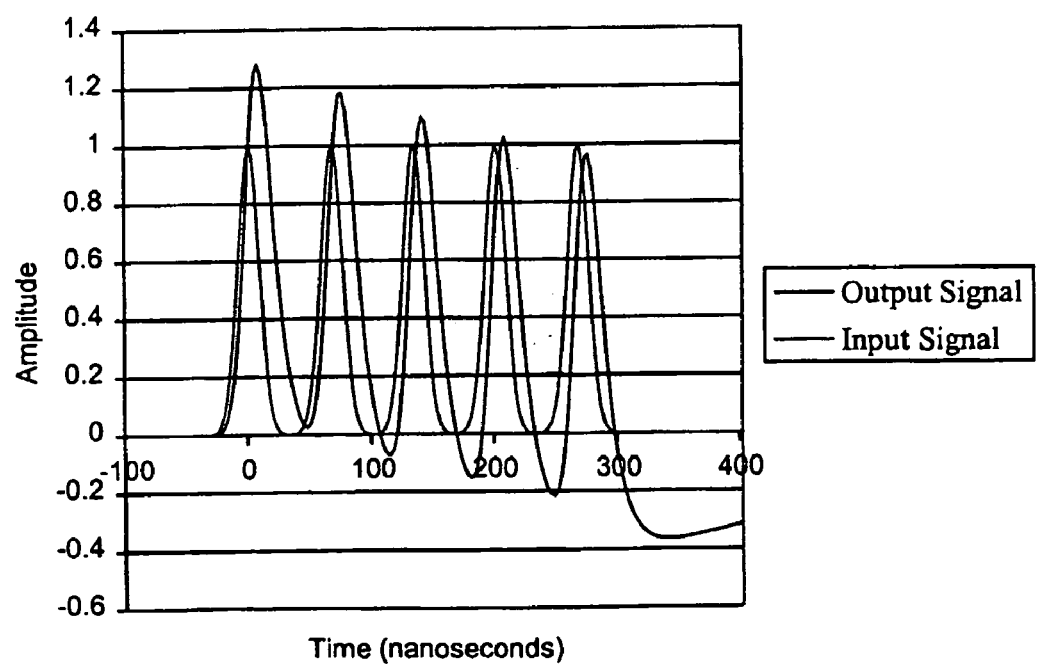
FIG 4.2: System response to a train of pulses

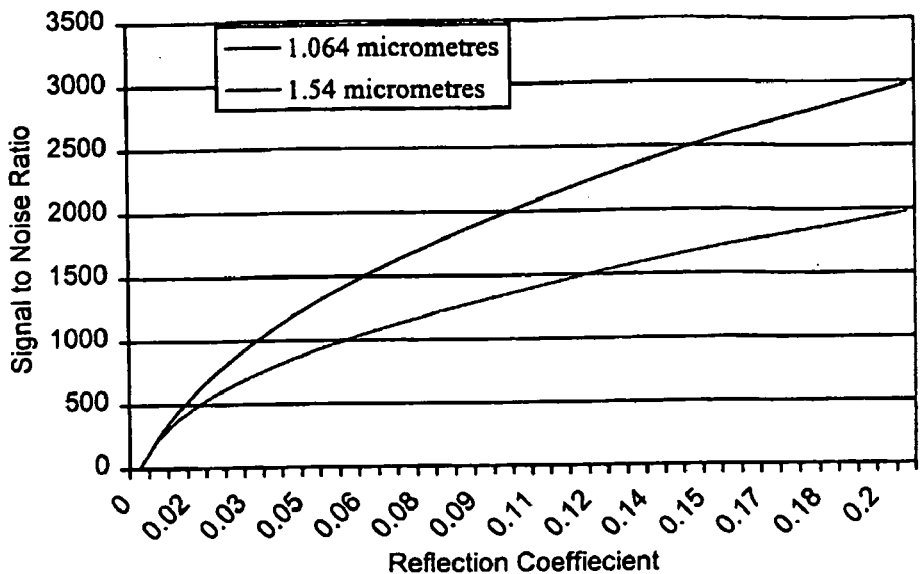
FIG 4.3: System SNR for 2 metre ground foot print and 80 MHz bandwidth
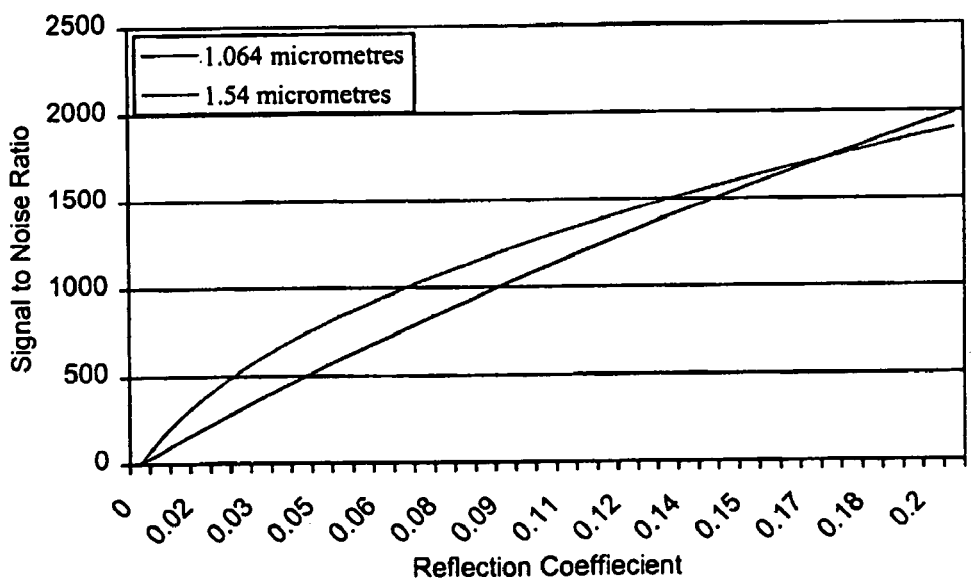
FIG 4.4: System SNR for 10 metre ground foot print and 80 MHz bandwidth

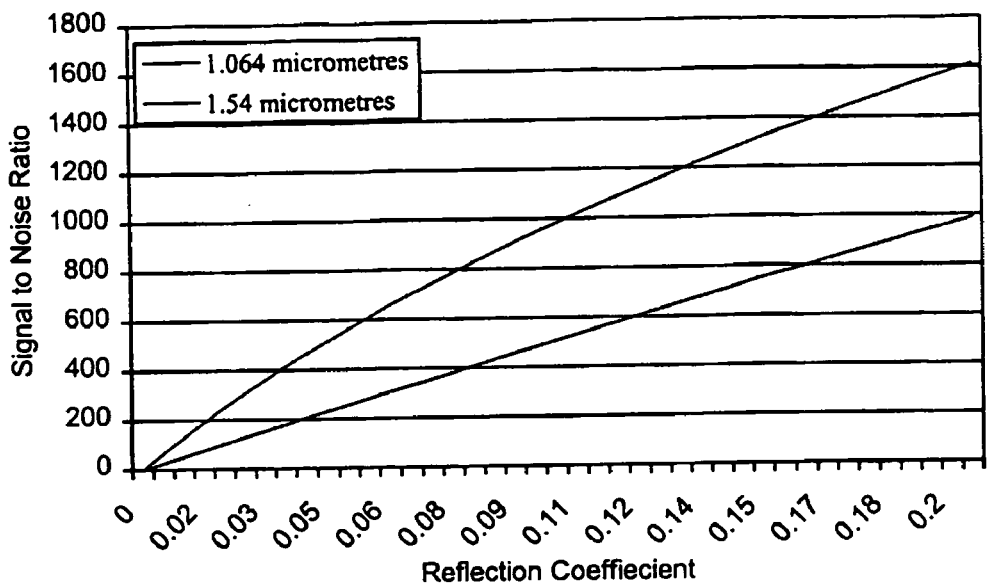
FIG 4.5: System SNR for 25 metre ground foot print and 80 MHz bandwidth
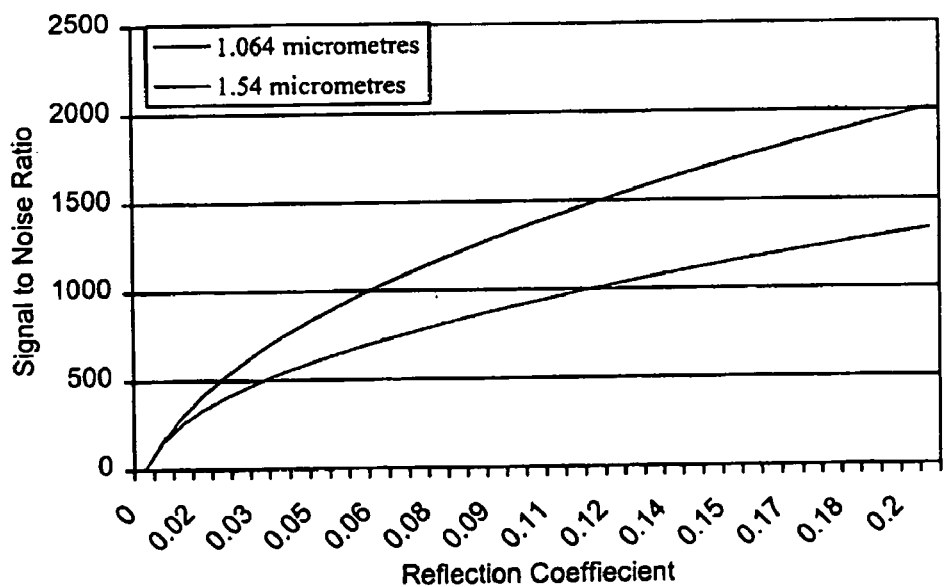
FIG 4.6: System SNR for 2 metre ground foot print and 175 MHz bandwidth

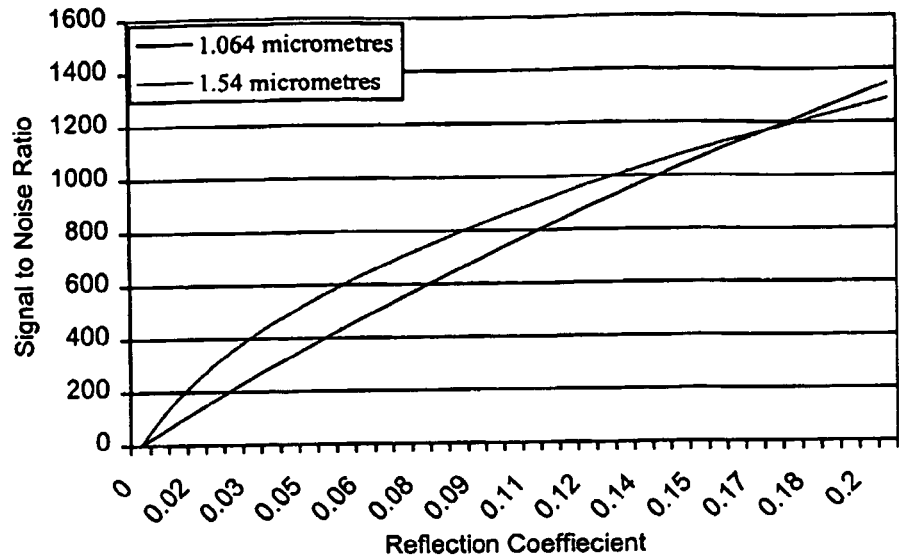
FIG 4.7: System SNR for 10 metre ground foot print and 175 MHz bandwidth
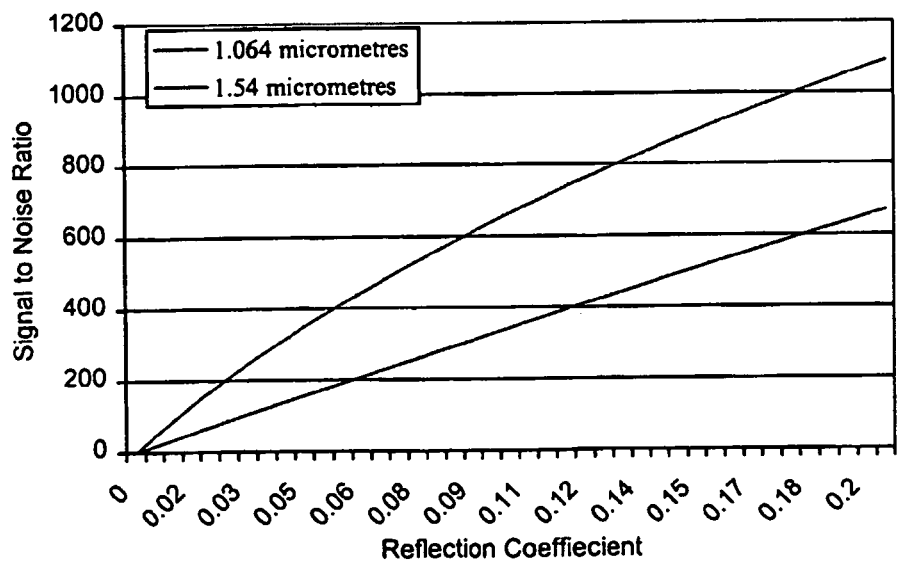
FIG 4.8: System SNR for 25 metre ground foot print and 175 MHz bandwidth

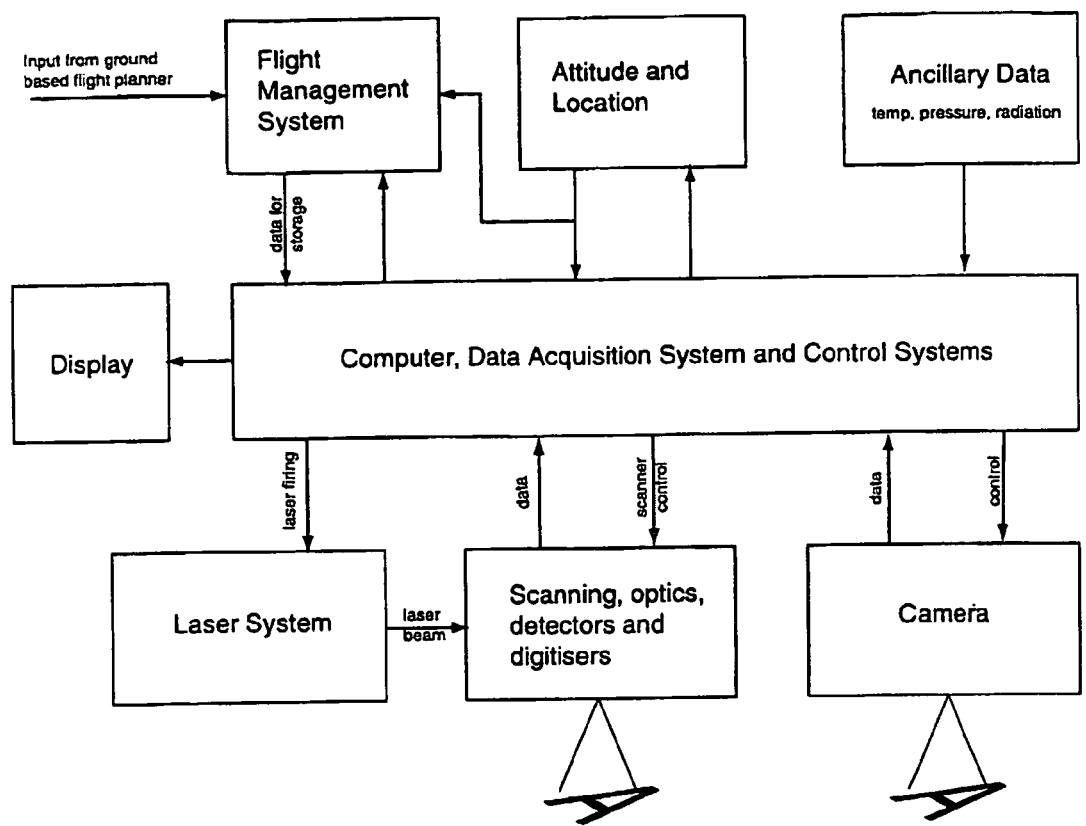
FIG 5: VSIS Block Diagram

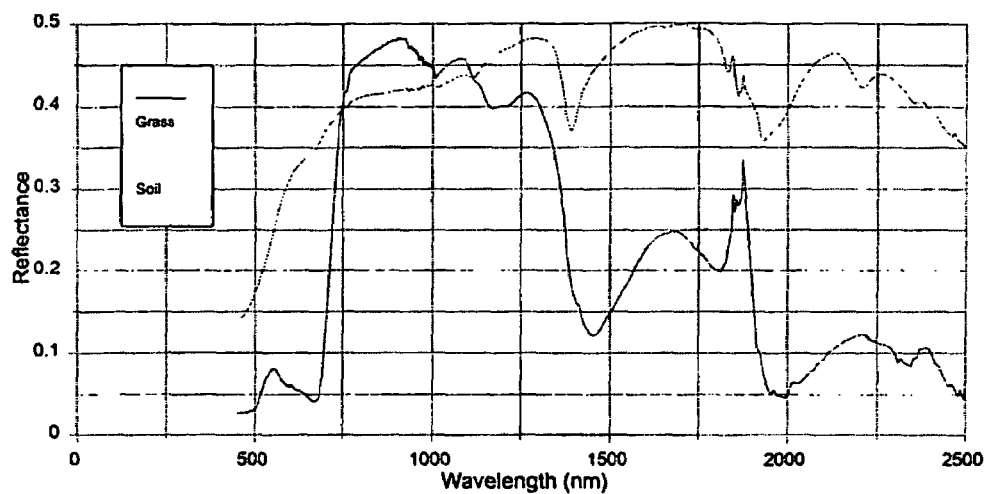
FIG 7.1
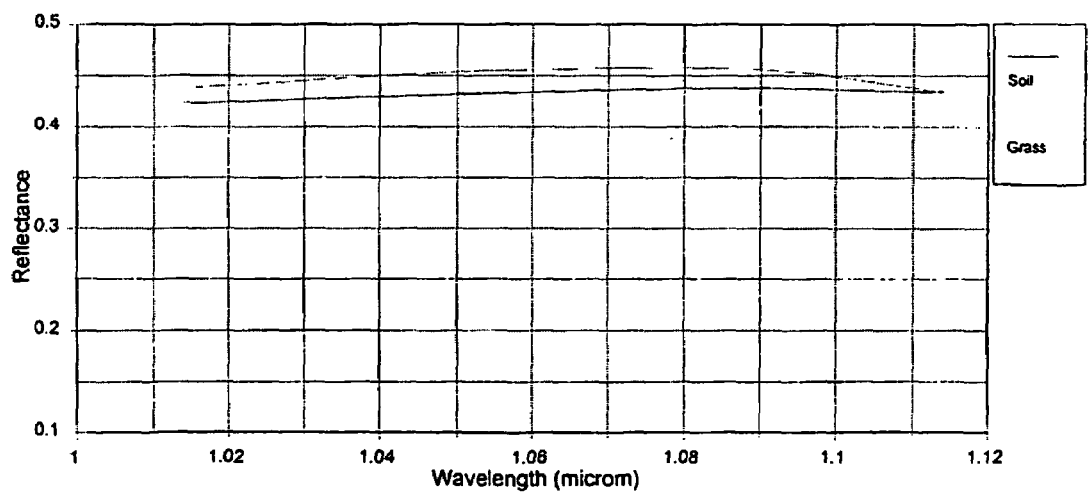
FIG 7.2

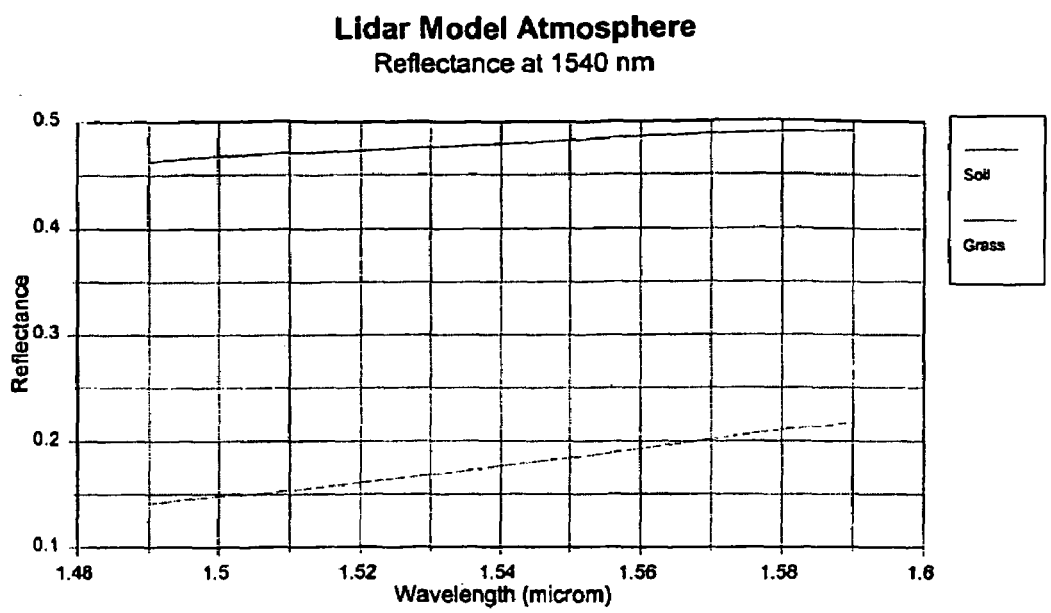
FIG 7.3
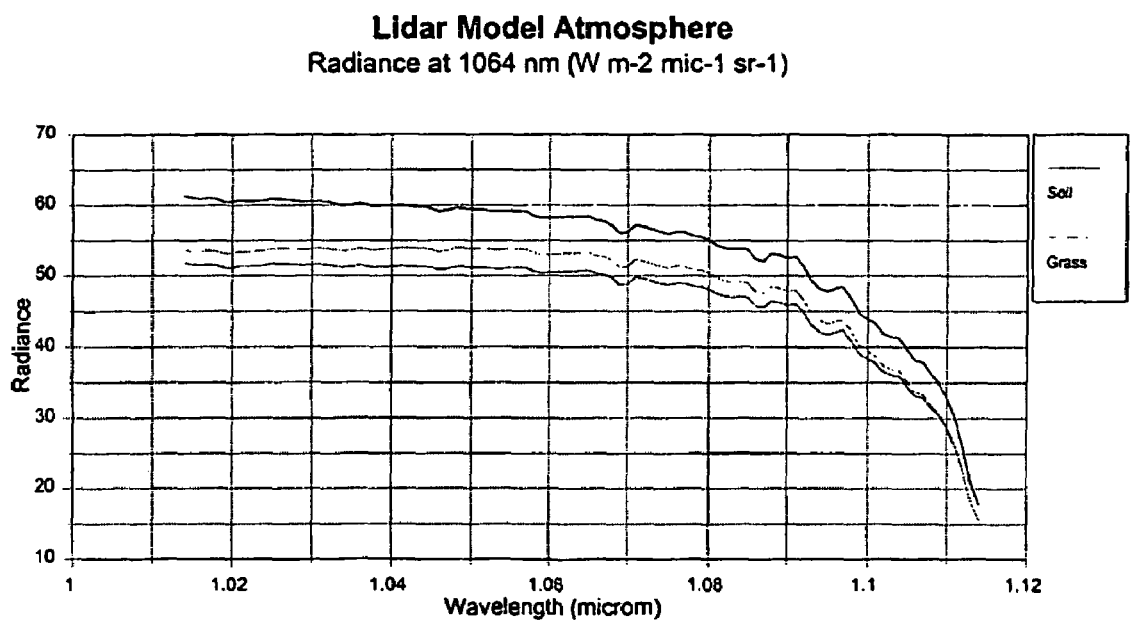
FIG 7.4

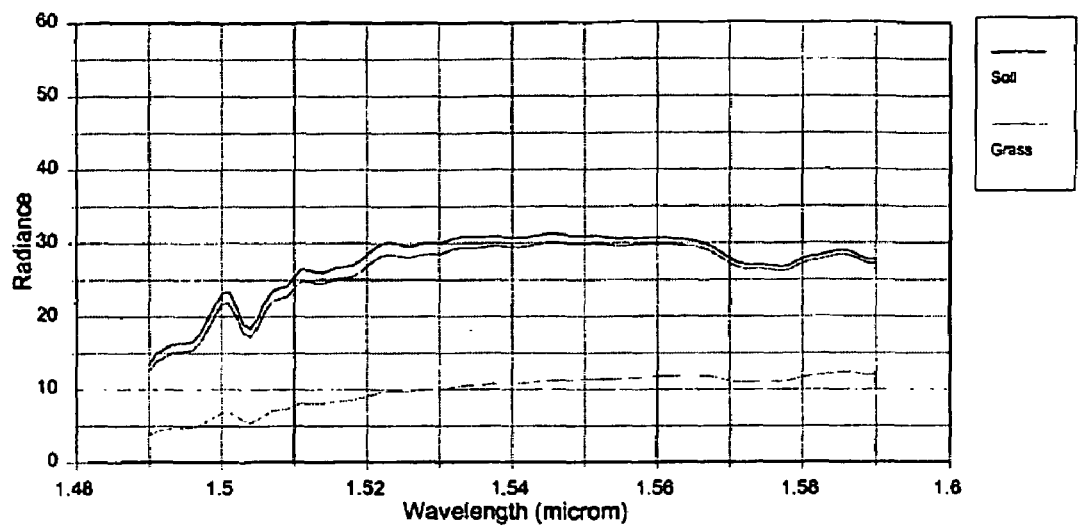
FIG 7.5
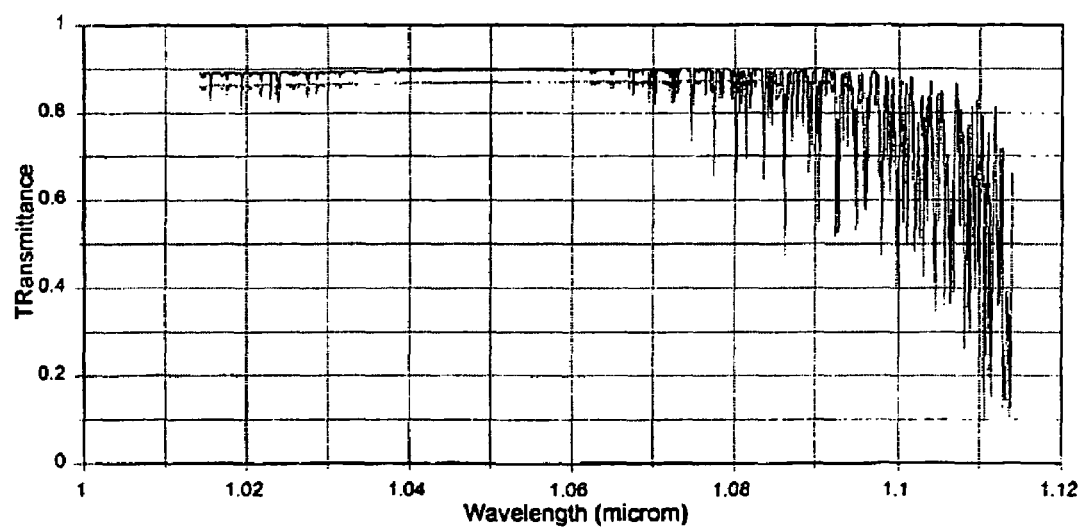
FIG 7.6

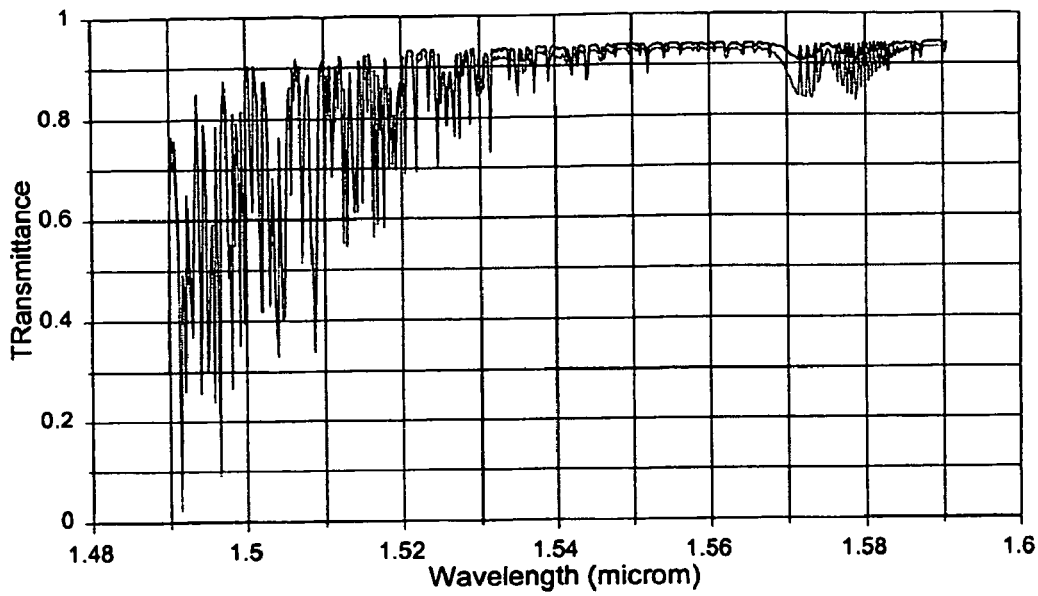
FIG 7.7
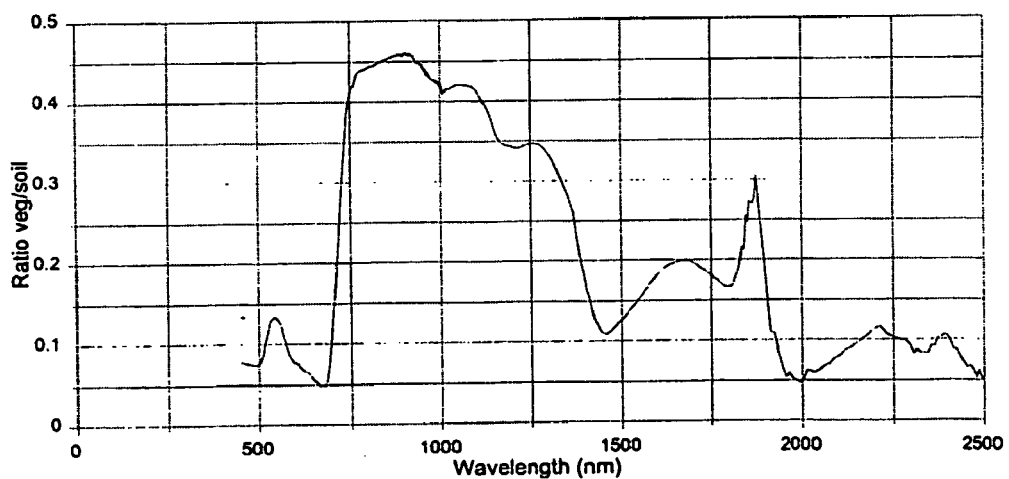
FIG 7.8

LIDAR SYSTEM AND METHOD

TECHNICAL FIELD

This invention relates to a lidar system and method.

The invention has particular application to a system for and method of determining the spatial statistics of fragmented and spatially variably dispersed objects in a transmissive medium by recording a lidar pulse return.

The invention in its various aspects utilises a range of new and inventive Lidar based hardware, software and methods and has particular but not exclusive application to measuring the spatial structure and cover of vegetation canopies, allowing measurement and monitoring of the canopy biomass as inferred from phytoelement volumes and areas.

BACKGROUND OF INVENTION

Systems and methods for measuring the biomass of vegetation canopies are known and used in a range of applications including environmental management and practice, forestry inventory and operations and, increasingly, in the monitoring of forest condition and growth under a number of international agreements including the Montreal and Kyoto Protocols.

Airborne Terrain Lidars are known as is their potential for use in "vegetation canopy mapping" due to the presence of returns from trees when these Lidar systems have been used in terrestrial and topographical mapping.

Airborne and spaceborne Lidar systems for measuring the statistics of forested areas are also known.

SUMMARY OF INVENTION

The present invention in its various aspects aims to provide an alternative to known systems for and methods of determining spatial statistics of fragmented and spatially variably dispersed objects in a transmissive medium by recording a lidar pulse return. In particular the present invention in its various aspects aims to provide an alternative to known systems for and methods of assessing vegetation canopies.

The various aspects of the present invention are the subject of several copending patent applications as subsequently listed and whilst reference should be had to each of these, the specifications of each contain significant portions in common.

The various aspects of the present invention are the subject of these several copending applications as follows:

First Patent Application

This application relates to a ground based forest survey system and method variously utilising multi-angle sounding, controlled, variable beam width and shape and recording the return waveform with calibration to provide apparent reflectance as a function of range for each choice of angle and beam size and shape. The specification also refers to the following aspects of the invention:

Controlling and utilising beam size and ranging in combination with degree of angle flexibility in scanning to resolve the "blind spot" effect of clumping of foliage.

Utilising degree of angle flexibility, beam size and shape and ranging separately or in combination to resolve the "blind spot" effect of object orientation and angle distributions.

Controlling and utilising beam size with ranging plus the combination of high rate sampling of return pulse intensity, small pulse width and suitable Signal to Noise Ratio (SNR) to resolve the "blind spot effect" of the trade-off between scatterer density and reflectivity.

Second Patent Application

This application relates to the combination of ground based interpretations from the first patent application above, with airborne data to provide large area information from the airborne system not available from the airborne system alone. The specification also refers to combined ground and airborne systems both of which use Lidar technology to variously provide one, some or all of the following:

Obtain signals with high Signal to Noise Ratio (SNR) from vegetation at depth in canopies;

Sound with variable beam width and shape, and

Scan in multiple directions and varying scan patterns;

and optionally, one or more of:

Capture and store data at RF rate;

Measure calibrated outgoing pulse intensity;

Measure calibrated intensity of return trace to nanosecond sampling;

Provide accurate range to target by pulse deconvolution;

Process data in situ.

Third Patent Application

This application relates to methods and systems for the interpretation of the various data from the methods and systems outlined in the first and second applications above to provide forest products over large areas utilising one some or all of the following inventive methods or algorithms:

Calculation and use of apparent reflectance;

Combination of the convolved differential equation in $P_{gap}$ and advanced geometric probability models;

Advanced deconvolution algorithms to sharpen data and remove the ground effect and measure effects of rough terrain on the ground pulse using calibrated pulse model;

Multi-layer interpretation by modelling;

Determination of actual foliage profile with ground based system and extended to the airborne system;

Separation of foliage amount and angle distribution profiles in ground-based system data for interpretation of airborne system data;

Determination and use of foliage variance profile for clumping measurement;

Use of Steiner's Theorem, weighted dilation and Geometric Probability to measure tree and canopy size and shape information (eg Diameter at Breast height (DBH), basal area, height, timber volume, size distributions, Leaf Area Index (LAI), crown length ratio etc);

Stratification of forests based on ground-based system calibration of airborne system data using layering, foliage angles and allometric relations based on the ground data.

This present application is the first application listed above. The co-pending applications are numbered . . . and . . . respectively.

This invention in one aspect resides broadly in a ground-based method of determining the spatial statistics of fragmented and spatially variably dispersed objects in a transmissive medium, said method including:

generating a plurality of pulsed beams of laser energy, said beams having selectively variable width and shape;

selectively varying the width and shape of said beams directing said beams toward the dispersed objects;

measuring the time and/or phase and intensity of signals returned by the dispersed objects, and calculating the apparent reflectance of the dispersed objects as a function of the range of the dispersed objects for each beam width and beam shape.

As used herein the expression "apparent reflectance" means, for a given or standard target or object, the reflectance of the standard target that would return the same intensity from the same range as the measured return signals.

It is preferred that the method includes calibrating an instrument in accordance with the apparent reflectance calculated.

In another aspect this invention resides broadly in a ground-based system for determining the spatial statistics of fragmented and spatially variably dispersed objects in a transmissive medium, said system including:

Lidar means for generating a plurality of pulsed beams of laser energy having selectively variable width and shape, for selectively varying the width and shape of said beams, and for directing said beams toward the dispersed objects;

measuring means for measuring the time and/or phase and the intensity of signals returned by the dispersed objects, and calculating means for calculating the apparent reflectance of the dispersed objects as a function of the range of the dispersed objects for each beam width and beam shape;

whereby the system is calibrated in accordance with the apparent reflectance calculated.

It is preferred that the method and system each survey a forest and measure the spatial structure and cover of vegetation canopies in the forest.

It is also preferred that the method and system each survey an individual measure tree and derive statistical information relating thereto.

In one preferred embodiment the method of surveying a forest includes taking into account the occlusion effects of clumping of foliage by the controlled variation of beam size, range and angle of scanning.

In another preferred embodiment the method of surveying a forest includes taking into account the effects of object orientation and/or the angle of distribution of foliage by the controlled variation of beam size and/or shape and/or range and/or angle of scanning.

In another preferred embodiment the method of surveying a forest includes taking into account the trade-off between scatterer density and reflectivity by the controlled variation of beam size and range, and by utilising a high sampling rate of return pulse intensity, a small pulse width and a suitable Signal to Noise Ratio.

DESCRIPTION OF PREFERRED EMBODIMENT OF INVENTION

In broad terms the present invention provides a tool that provides information on the range to a distributed group of scattering elements in a specific direction, the intensity of the return signals (which relate to scatterer reflectivity and amount) and the way the intensity/time information changes with Lidar beam size and shape as well as its direction and position. The spatial relationships and calibrated signals form a spatial data set that may be analysed for information on size, shape, porosity or gappiness, density and spacing of elements (such as leaves, stems, trunks, trees, shrubs and grasses) in forest canopies.

As used herein the expression "beam" includes both rays and beams in the sense that a beam is bundle of rays. Furthermore it will be appreciated that variable size and shape of a beam can be provided by optics (spreading and shaping into a continuous dispersed beam) or by using a "bundle" of shots that are bunched into different shapes or sizes.

Before discussing the preferred embodiments of the invention which is the subject of this application in detail, a description of Lidar systems and canopy mapping will be provided to better assist an understanding of the invention.

A Lidar (an acronym for Light/Laser Radar or Light/Laser Detection And Ranging) is an instrument in which a beam of Laser energy in the visible light or similar spectral region (such as the near infrared region) is transmitted in a specified direction and the time (or phase) and intensity of any return signals from the pulse are used to measure distance to and amount of scatterers in the direction of the beam. In pulsed Lidar, a pulse of laser energy which is of finite width but peaked, and which is called a "shot", is sent out and the time of return of signals is measured to obtain range to a scattering event.

Terrain Lidars or Laser altimeters measure topography and generate digital terrain images. These instruments use a high spatial density of small footprint laser pulses, or "shots", to enable each shot to penetrate gaps In canopies without attenuation to create a sufficient number and power of returns from the ground to sense terrain height under many levels of cover. While it is feasible for a very high density of small footprint returns to be spatially aggregated to derive information about vegetation, the processing issues involved, the high spatial variance, the effects of reflectance "speckle" and the lack of calibration in most current systems has made this difficult. The costs of covering large areas with such a system suggest that terrain Lidars do not provide a practical approach to regional vegetation mapping.

The major limitations of the terrain Lidar technology occur in areas with significant forest cover where the overstorey diffuses the return signals resulting in high variance and ambiguous ground reflections. Current airborne terrain Lidar systems time the first and last significant return of an outgoing pulse. The Lidar beams are usually very narrow to achieve greatest penetration through existing holes in the canopy or other aboveground obstructions and return a signal from the ground of sufficient power to be detected above a threshold. Intensity is rarely measured (other than its being above the threshold) as the existence of a scattering event and its range is the main aspect of the data.

The basic strategy employed in terrain lidars is the principle that if there are a number of scattering elements above the ground then the probability that a narrow beam will miss them and hit the ground depends on the "gap probability function" for the surface cover. Normally, this gap probability has very high spatial variance. Hence, if the surface is covered by a very dense set of narrow beam Lidar pulses, a few will generally penetrate the gaps and return individually strong signals to detect the position of the ground. Hopefully, enough will return to infer the position of the underlying surface. Since the beam cannot have zero width, parts of any Lidar beam may be scattered above the surface by different elements. Most terrain Lidars therefore measure first and last significant return.

The approach of using very high shot density and capitalising on high spatial variance to get a small but individually intense set of returns from a background characterises terrain Lidars. If the beam is broadened then the relative intensity of the ground signal reduces in relation to the cover but the spatial variance and its causes (the canopy structure) become more controlled and useable in the signal. This control defines the difference between terrain and canopy Lidars. The exploitation of a variable beam width can be harnessed as a powerful tool to measure vegetation canopies.

In known airborne and spaceborne Lidar systems for Canopy mapping the return power of the laser pulse is measured by digitising the whole of the return and using a relatively large footprint (such as 10–25 metres) so that signals from all reachable elements of the canopy profile are recorded in a single return trace. The time of the returns is a measure of the target ranges, and the strength of the returns is an indicator of the target scattering cross section and reflectivity. By combining the digitising of the return with a larger, but variable, beam footprint and a scanning laser it is possible to cover the kinds of area needed for regional vegetation survey and retrieve canopy information that has been unobtainable by any other form of remote sensing.

There are also some basic uncertainties in the intensity of returns of Lidar data that underlie significant differences between the engineering specification and build of Lidar systems that only sense range and those seeking to measure advanced canopy structural information. In the former, range is obtained by time to peak of the pulse, with intensity and pulse width not being so important. For all Lidars, this range to target is independent of the calibration of the intensity and is a most significant data product.

However, if intensity of the returns is also important to the analysis, the instrument is preferably calibrated so that the data can be resolved into units such as "apparent reflectance", ie the reflectance of a standard target that would return the same intensity from the same range.

Even when the data are calibrated, such calibrated intensity data can have a high level of uncertainty in regions of distributed scatterers in that a few scatterers having high reflectivity or with scattering surfaces aligned to the beam direction will give a similar return to many scatterers with low reflectivity or with effective area oblique to the direction of the beam. These effects may be summarised as three "blind spots" that mainly affect airborne canopy Lidar systems that make use of the intensity of the returns. These blind spots are:

The trade-off between scatterer density and reflectivity;
The effects of foliage angle distribution;
The effects of clumping of foliage.

In the first case, fewer reflective scatters have the same apparent reflectance as more lower reflectivity scatters. In the second case, if the Lidar shots are only in one direction (eg vertical) then vertical structures and horizontal structures will give very different results even if the amount of material is the same. In the third case, "clumping" creates occlusion and results in "hidden" biomass.

Analysis of the data preferably takes these "blind spots" into account and finds ways to resolve them. In one of its aspects the present invention proposes that relationships derived from an in-canopy ground-based Lidar can "calibrate" airborne and/or spaceborne Lidars to extend highly detailed structural information over wide areas.

In other aspects the present invention provides instruments and supporting systems constructed to achieve these data. In other aspects the invention also concerns how such data may be exploited and analysed to provide significant structural information about forests and woodlands.

The characteristics of the Lidar systems which provide data for the analysis are that they:
1. Obtain signals with high Signal to Noise Ratio (SNR) from vegetation at depth in canopies;
2. Measure intensity of return trace to nanosecond sampling;
3. Provide accurate range to target by pulse deconvolution;
4. Sound with variable beam width and shape;
5. Scan in multiple directions:
6. Capture and store data at radio-frequency (RF) rate.

Forest measurements provided by the present invention include:

Projected cross sectional area of canopy elements (eg leaves, stems and trunks) at a given distance in a given direction;

Size, shape and density of canopy elements in a volume;

Canopy element distribution in trees and shrubs of varying heights and layers;

The size of gaps and inter-element spacings at varying scales.

In now briefly considering remote sensing in general, it should be mentioned that as well as being used for ground survey and aerial photography, it is known to use remote sensing from airborne and spaceborne platforms to measure canopy type, condition, cover and structure. It is also known to derive structure from radar data of various forms and from various platforms.

More commonly, in the optical region, remote sensing has been used to map general vegetation type, species associations, current condition, photosynthetic activity and overall cover using spectral data. The recent developments of hyperspectral sensors for use from airborne platforms and the arrival of spaceborne high spectral resolution sensors will provide a general base mapping capability of this type. However, very little of the inherent structural information can be obtained from such data.

As far as direct structural measurements are concerned, there has been considerable interest in the relationships between the changes in surface radiance with sun and view angles (or Bi-Directional Reflectance Distribution Function—BRDF) and structure. It has been found that the canopy structure is a very strong determinant of the form and strength of the BRDF of land surfaces. In fact, most wide-angle data sets—such as airborne scanners, pointing sensors from space and wide view sensors from the air or space—need some knowledge of the BRDF to provide consistent data for subsequent interpretation. However, while BRDF in some cases has yielded important structural information (such as some ratios of vertical to horizontal foliage distributions) the Inversion problem has remained very difficult to resolve.

The present invention, in one aspect, proposes to resolve the extended gap probability function $P_{gap}(z, \mu_v)$ for a number of ranges (z), a number of view angles ($\mu_v$) and its second order function $P_{gap}(z_i, \mu_i, z_v, \mu_v)$ for incident and view ranges and directions and at a number of scales (ie sampling patch size or structuring element size).

In other words gap probability is determined as a function of view angle and range and at a variety of scales as measured by the solid angle of the "structuring element" or "sieve". To determine range and $P_{gap}$ as a function of range it is proposed to use Lidar technology and its data.

The Laser signal returned from various levels of a canopy will depend on the range resolved gap probability function. The return from the earth's surface will depend on the total cover and the timing of first canopy return signals will indicate the height of the upper stratum. The shot-to-shot variation in these data will be a function of the variance in tree sizes and the degree of clustering of foliage into crowns and clumps. However, with current systems the full benefits of these data have not been realised. One problem is that data taken to date have rarely been calibrated (ie accounting for energy and reflectance) and another has been the lack of account for horizontal structure in the interpretations. In addition, current airborne Lidar systems do not scan at large angles to the vertical. This leaves some significant uncertainties in the actual structure of the vegetation being mapped.

Turning now to the equipment and systems aspects it will be seen that the Lidar systems of the present invention are one or both of two main kinds. One type, called here "ECHIDNA™", is situated on the ground and gives full digitisation of the return pulse for a variety of view angles and beam sizes and shapes in the upper hemisphere and can scan "almucantar" or constant zenith angle scans. It may optionally include multi-frequency and poarisation data. The other is an airborne system, called here "VSIS" or Vegetation Structure Imaging System. As discussed here, VSIS operates to scan and digitise the full return pulse as a function of view angle near to vertical from the air and normally includes a strong ground return and may optionally include multi-frequency and polarisation data.

Airborne System:

In accordance with the various aspects of the present invention it is preferred that the airborne scanning Lidar system (referred to as VSIS) and supporting hardware and software is taken to have, inter alia, the following capabilities:

Map cover/height at spot sizes between 5 and 25 metres.
Capacity to calculate and map vertical foliage profiles in separable 0.3 metre bins
Provide accurate DEM (range to ground) data for lower investment landscapes
Able to co register multi-spectral images for ortho-images and interpretation
Has accurate geo-location to within 0.5 of the laser spot FWHM (90% of the time)
SNR needs to be high enough to map Australian understorey biomass (SNR of at least 1000:1 for 0.1 apparent reflectance target at 3000 m flying height)
The system generally needs to scan quite wide swaths (eg 2–4 km) for reconnaissance work.

Ground Based System

In accordance with the various aspects of the present invention it is preferred that ground based, portable Lidar scanning system (referred to as ECHIDNA™) for forest mapping is taken to have, inter alia, the following capabilities:

Scan "almucantar" constant zeniths (e.g. zero and 32.5° elevation).
Scan (spiral) equal solid angle scans of the upper hemisphere avoiding near-sun disk in daytime and minimise background (sky) radiance.
Allow accurate wedge and other shaped lidar beams at selected angles between about 1 and 5 degrees
Allow smaller spread beams with circular intensity of about 8 mrad to 2 degrees.
Have SNR to discriminate signals to 100s of metres in Australian forests and modelled by obtaining at least 1000:1 SNR for 0.1 apparent reflectance for 500 metres horizontally.
System to be portable and able to be elevated above thick under-storey
Location by GPS and attitude data required.

VSIS and ECHIDNA™ are terms used by the applicant to conveniently refer to their airborne system and ground based system respectively. When used throughout this specification they are to be understood to have these general meanings rather than referring to specific products or systems.

There now follows a more detailed description of the preferred embodiments of the invention the subject of this present application. A more comprehensive description of the invention in all its various aspects and which is the subject of all the above copending applications will be included in the specification before the claims.

As discussed above, for all Lidars the range to target is independent of the calibration of intensity of returns. If intensity is important to the analysis, as is the case in Lidars seeking to provide advanced measurement of canopy structure, the instrument should be able to be calibrated so that data can be resolved into units such as "apparent reflectance", that is the reflectance of a standard target that would return the same intensity from the same range.

Even when calibrated, such calibrated intensity data can have a high level of uncertainty in regions of distributed scatterers in that a few scatterers having high reflectivity or with scattering surfaces aligned to the beam direction will give a similar return to many scatterers with low reflectivity or with effective area oblique to the direction of the beam. These effects may be summarised as three "blind spots" that mainly affect airborne canopy Lidar systems that make use of the intensity of the returns. They are:

The trade-off between scatterer density and reflectivity;
The effects of foliage angle distribution;
The effects of clumping of foliage.

In the invention the subject of this present application, analysis of the data takes these blind spots into account and finds ways to generate data and use methods to resolve them. It is also proposed that relationships derived from an in-canopy ground-based Lidar can "calibrate" airborne and/or spaceborne Lidars to extend highly detailed structural information over wide areas.

In general terms, a ground based, portable Lidar scanning system for forest mapping in accordance with a preferred embodiment of the present invention will meet a number of preferred criteria including:

Scan "almucantar" constant zeniths (e.g. zero and 32.5° elevation).
Scan (spiral) equal solid angle scans of the upper hemisphere avoiding near-sun disk in daytime and minimise background (sky) radiance.
Allow accurate wedge lidar beams at selected angles between 1 and 5 degrees
Allow smaller spread beams with circular intensity of 8 mrad to 2 degrees.
Have SNR to discriminate signals to 100s of metres in Australian forests and modelled by obtaining 1000:1 SNR for 0.1 apparent reflectance for 500 metres horizontally.
System must be portable and be able to be elevated above thick under-storey
Location by GPS and attitude data required Turning now to FIG. 5, which illustrates both ground-based and airborne systems, the airborne system differs from the (ground based) ECHIDNA™ mainly in its extra Flight Management System and Camera blocks. The ECHIDNA™ hardware system is a combination of the components linked as shown in FIG. 6. It has different scanning modes, will not have a flight planning block and need not include the camera system, although one (digital hemispherical) is preferred. A detailed explanation and description of the system can be found in section 5.2 of the detailed description which follows.

In controlling and utilising beam size and ranging in combination with degree of angle flexibility in scanning to resolve the "blind spot" effect of clumping of foliage, the present invention utilises the Lidar system characteristic of scanning in multiple directions. The ECHIDNA™ scanning system is flexible and scans over a full hemisphere.

Software includes control signals for the laser firing, control and feedback for the scanning mechanism. Several modes are required including:
'almucantar' or constant zenith angle azimuthal scan
spiral scan
non-scanning mode
background detection mode It is known that some types of forest have understorey of up to 2 metres in height and hence the ECHIDNA™ head preferably is able to be extended clear of such understorey and collect data of the surrounding vegetation. The scanning system has accurate positioning information to allow 3D plots of the scanned area to be produced.

In utilising degree of angle flexibility, beam size and shape and ranging separately or in combination to resolve the "blind spot" effect of object orientation and angle distributions, the present invention utilises the Lidar system characteristics of sounding with variable beam Width and shape and scanning in multiple directions.

If the Lidar is ground-based it is possible to sound the canopy using both multi-angles and varying beam size and shape. Multi-angle laser systems have been used to measure total canopy gap (like a hemispherical photograph) but the ECHIDNA™ instrument being considered here digitises the full return pulse, scans flexibly in the hemisphere and in "almucantar" scans, and (significantly) sounds with variable beam width and shape. The ability of such an "ECHIDNA™" system to characterise the canopy angle distribution separately from foliage profile is very high and is much greater than an airborne system. A combination of both facilitates detailed local characterisation as well as regional extrapolation.

Even for a random canopy of foliage elements the foliage profile obtained from an airborne system is not the desired foliage profile but rather a projective foliage profile which depends on the foliage angle distribution and the pointing direction of the Lidar beam.

For a random leaf canopy, this can be modelled as follows. If $\bar{a}_L$ is the mean one sided area of a leaf $$LAI(z) = \int_0^z \lambda(z')\bar{a}_L(z')dz'$$
$$= \int_0^z F(z')dz'$$
$$L(z) = \int_0^z \lambda(z')\bar{a}(z', \mu_v)dz'$$
$$= \int_0^z l(z')dz'$$

The resolution of this uncertainty in the application of the model must be through the use of other knowledge or the use of multiple angles for Lidar sounding. The ECHIDNA™ system uses multi-angle Lidar sounding and provides a very powerful extension of the methods used in the analysis of hemispherical photography through the addition of range data and the use of varying beam size and shape.

The ECHIDNA™ initially has two primary beam patterns, a circular pattern for range and digitisation measurements and a second rectangular pattern for equivalent relaskop measurements and measurement of anisotropy. Specially designed optics adapt to either beam pattern using the same laser.

In controlling and utilising beam size and shape with ranging plus the combination of high rate sampling of return pulse intensity, small pulse width and suitable Signal to Noise Ratio (SNR) to resolve the "blind spot effect" of the trade-off between scatterer density and reflectivity, the present invention utilises the Lidar system characteristics of measuring intensity of return trace to nanosecond sampling, sounding with variable beam width and shape and capturing and storing data at radio-frequency (RF) rate.

The calibration issue is to determine C(R) which may depend on R—especially in the near range if the signal source and receiver geometry is not (for example) coincident.

By making some approximations it is possible to show that the RMS error for the inverted apparent foliage profile has the form:

$$\text{RMS}_l(r) = \frac{\rho_{app}(r)}{\rho_v P_{gap}(r) \text{SNR}}$$

A set of models for Australian land covers is subsequently presented and their Lidar returns simulated. A number of SNR models for typical instruments have been used to plot these measures of performance and define the needs for an effective instrument to map the lower layers of Australian forests.

The total noise signal is a function of the electrical bandwidth of the detector. The electrical bandwidth is usually limited at high frequencies and low frequencies to create a band pass system. System performance depends on the choice of system bandwidth.

A more detailed discussion of the calculation of Signal to Noise Ratio may be found in section 4.4.4 of the detailed description which follows.

The invention the subject of this present application will be seen as having a number of advantages over known systems and methods of assessing a vegetation canopy. These include:

Replaces subjective, operator-based plot-sampling techniques with an objective, repeatable and certifiable measurement option for the forestry industry.

Reduces the cost and complexity of data acquisition and processing of other known lidar systems.

Acts as a "sieve" to identify and measure the complex objects of a forest survey, for example, tree trunks tree crowns and canopy foliage.

Provides unique solutions to the problems of "blind spots" in known airborne lidar systems associated with: foliage clumping, object orientation and angle distributions, and the trade-off between scatterer density, object size and reflectivity.

Overcomes the difficulty and high cost of known aerial photography systems of measuring the smaller, less dominant trees and shrubs.

Can combine a wide range of forestry information (such as basal area) and ecological information (such as leaf area) in a single sounding system.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

There now follows a detailed description of the invention in all its various aspects and which is the subject of all the above mentioned copending applications.

DESCRIPTION OF DRAWINGS

In order that this invention in all its various aspects may be more easily understood and put into practical effect, reference will now be made to the accompanying drawings which illustrate preferred embodiments of the various aspects of the invention, wherein:

FIGS. 1.1 to 1.11 are graphs/plots/diagrams illustrating various aspects of the use of canopy Lidar data for cover and structure measurements in accordance the present invention;

FIGS. 2.1 to 2.11 are graphs/plots/diagrams illustrating various aspects of the use of raw Lidar data to describe vegetation canopies by enhancement of airborne data in accordance with the present invention;

FIGS. 3.1 to 3.4 are graphs/plots/diagrams illustrating canopy Lidar simulations of some Australian open forests in accordance with the present invention:

FIGS. 4.1 to 4.8 are graphs/plots/diagrams illustrating various aspects of SNR modelling in accordance with the present invention;

FIG. 5 is a block diagram illustrating the main components of both the airborne and ground based Lidar systems in accordance with the present invention;

DESCRIPTION OF METHODS AND ALGORITHMS

Figure 6:
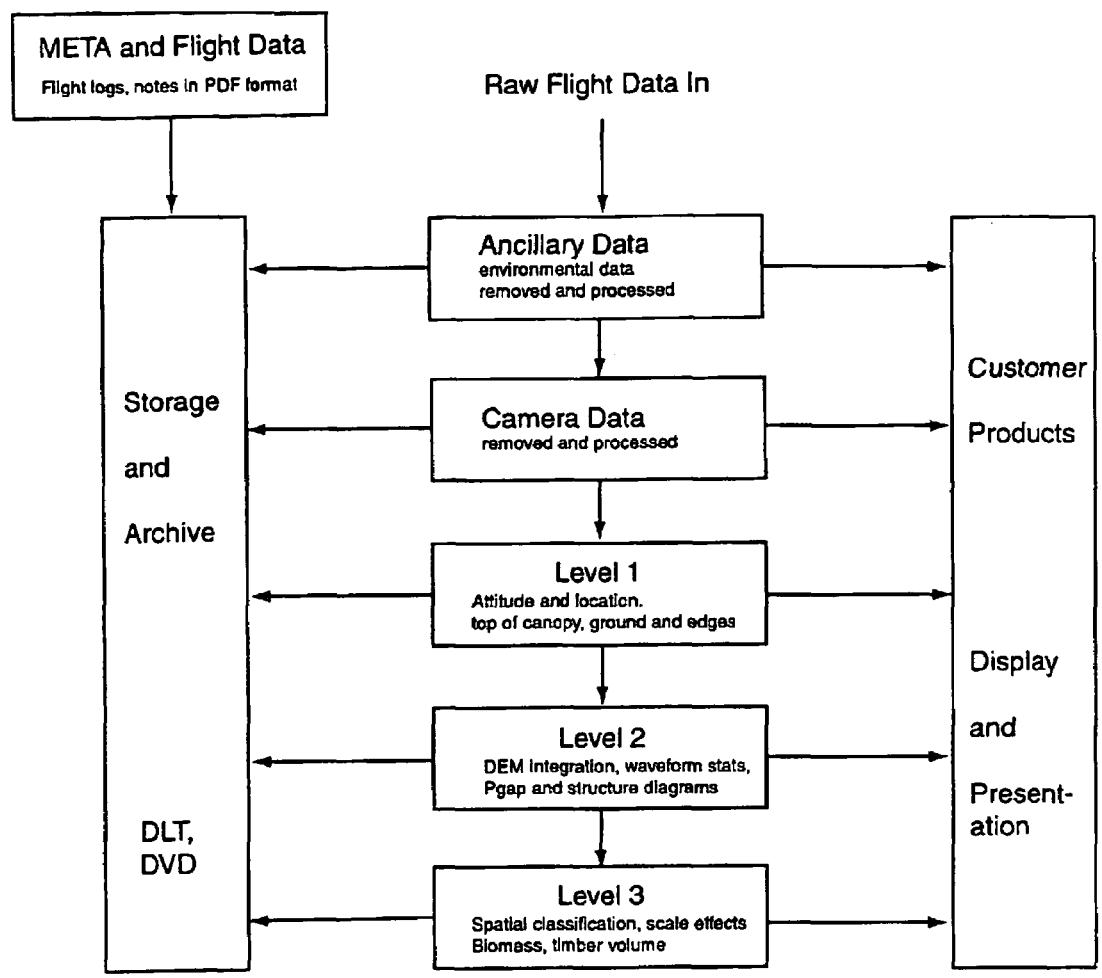
FIG. 6 is a block diagram illustrating software engineering for the airborne and ground based Lidar systems in accordance with the present invention, and FIGS. 7.1 to 7.8 are graphs/plots/diagrams illustrating the explanation of atmospheric parameters and reflectances as discussed in Appendix A4.

1. Using Canopy Lidar Data for Cover and Structure Measurements 1.1 Models for Lidar Returns & Implications for Canopy Mapping To derive vegetation profiles and other structural information from canopies, the directional gap probability with range function $P_{gap}(z, \theta_v)$ provides an effective base of data for vertical canopy profiles of foliage density and angular variation. The variance associated with this function through the second order function $P_{gap}(z_i, \mu_i, z_v, \mu_v)$ also provides data which are currently unexploited in vegetation canopy analysis—including current Lidar based data.

How these relate to the physical data recorded by the sensor is the subject of the following sections. We use a calibrated digitised trace and develop the appropriate statistics. Data will also be augmented by optical remote sensing data. Collocated spectral data are assumed to provide some vegetation type and association Information—at least for the upper and mid-stratum and provide a crosscheck on foliage and background reflectances and overall cover fraction. It is assumed one of the spectral channels is the same as the Laser.

1.1.1 Basic Lidar/Target Reflection—Time Based Equation

If a lambertian plane target is placed normal to the laser beam at distance R from the laser source, which is large enough so that part of the beam does not fall off the target then the Lidar equation for the response (E') to an impulse signal ($\delta(0)=\delta_0$; $\delta(s)=0$ $s\neq 0$) at times would be:

$$E'(s) = t_A^2 \rho \frac{C}{R^2} \delta(s - 2R/c) + e(s)$$

where:

$\rho$ is the target reflectivity;
$t_A$ is atmospheric transmittance for the path between the Lidar and target;
C is an amalgamation of receiver optics efficiency, receiver telescope area, quantum efficiency etc.;
e(s) is assumed small and represents background of atmospheric backscatter, natural light etc.

An Expression for C is:

$$C = \eta t_0 A_R$$

Where:
$t_0$ is receiver optics throughput;
$A_R$ is effective receiver telescope area (which can depend on distance to the target),
$\eta$ is detector quantum efficiency
C could also be used to absorb any consistent difference in behaviour of the sender/receiver beam optics from a $1/r^2$ relationship (which assumes the Lidar beam is narrow and the reflected beam is diffused and collected by a telescope with FOV narrower than the diffusion) model above.

The result of the Lidar sending out a finite width pulse shape is to effectively "smear" this impulse pulse in range (actually in time) as a convolution with the pulse shape (h(s)):

$$E(s)=h(s)*E'(s)$$

So, the "spike" pulse at the target range becomes a finite pulse over an apparent range when time is converted to an apparent range as r=cs/2. With this conversion, measured signal E(r) will come from "in front of" and "behind" the actual target in apparent range.

For example, the effect of the pulse convolution can be determined from analysing the fully digitised signal from a pulse return off a standard target. Tests were done with an atmospheric Lidar with reflectance from solid targets producing a very consistent representation of the convolution kernel in this case. It is shown in FIG. 1.1 along with an analytical approximation to the pulse by the Rayleigh kernel:

$$h(s)=a(s-s_0)_+ e^{-b(s-s_0)^2}$$

a Gaussian kernel:

$$h(s)=a\, e^{-b(s-s_0)^2}$$

and a modified Rayleigh kernel:

$$h(s)=a(s-s_0)_+^c e^{-b(s-s_0)^2}$$

which provides a good fit to the average pulse during this experiment.

As shown in FIG. 1.1, the modified Rayleigh model is a good one for the pulse but does not explain the effects in the pulse trail. The Gaussian is also a good model in this case—again it does not explain the tail. A stable Gaussian pulse with no effects in the trailing area of the pulse would be an ideal feature of a canopy Lidar.

The time measure in Lidars is normally taken relative to the emergence of the peak power of the pulse out of the instrument and peak power will be denoted $E_0$

1.1.2 Calibration and Signal to Noise

The basic calibrated remote sensing problem is to measure range R to target and reflectance ρ. If the pulse has a narrow, sharp peak and targets are well separated the task is relatively easy in the range (R) case. But, while more difficult, ρ is still valuable and worth pursuing.

The calibration issue is to determine C(R) which may depend on R—especially in the near range if the signal source and receiver geometry is not (for example) coincident. There have been many theoretical and practical studies to describe this geometric form factor. In many atmospheric Lidars it is only at ranges above about 100 to 300 metres where the factor C settles down. For example, a known atmospheric Lidar has an overlap function k(R) (where C(R)=C k(R)) as shown in FIG. 1.2.

This function is created by the fact that the receive telescope and send optics are not aligned. For atmospheric sounding it is not a problem as 100 m is not significant for the overlap function to stabilise at 1.0. However, for a ground based canopy Lidar this would be too far and source/receiver alignment must be closer. Even then, there will be a near range effect that must be characterised or removed by engineering. However, experiment has demonstrated how both k(R) and C can be determined for such a system.

Obtaining an expression for C(R) as well as modelling $t_A$ and e(s) allows the data to be converted to a form called the "apparent reflectance". This is defined (in terms of apparent range) as:

$$\rho_{app}(r) = \frac{r^2}{C(r)} \frac{E(r) - e}{E_0 t_A}$$

For a narrow pulse or deconvolved pulse this is the reflectance of a lambertian target perpendicular to the laser shot that returns the same pulse power as is measured at that range. The handling of pulse width effects will be considered later.

Signal to noise is an important measure of the instrument capacity and performance. The primary sources of noise in the Lidar signal arise from various sources. Among them are:

1. Quantum noise in the photon limited pulse signal
2. Background radiation
3. Micro-turbulence (mainly water vapour) in the atmosphere
4. Dark current noise in the instrument
5. Thermal noise in the instrument (eg Johnson, Nyquist)

The role of noise due to quantum statistics and photon limited shots as well as the micro-turbulence in the atmosphere are particular characteristics of these types of measurement.

One aim of any instrument design phase is to estimate the instrument Signal to Noise Ratio (SNR) as a function of signal and system component characteristics so that an equation of a form such as:

$$SNR = (O + G*S)^{1/2}$$

or $$SNR = O + G*S^n$$

for offset O and gain G can be defined based on selection of system components (including amplifiers and optical systems).

The SNR for a given range can be computed if the apparent reflectance is known or modelled. This provides the means to develop SNR based design studies for the canopies we will be mapping. An example of such a study is presented in Section 3.3. The objective at this point is to model the apparent reflectance and this will be discussed below.

1.1.3 Large Foliage Element Canopy Model

Canopies attenuate the signal above the background surface and scatter lidar data back into the receiver optics. In a large element plant canopy, if a signal (photon) survives through gaps to a foliage element, the return signal can also retrace the path and so reach the detector. That is, the Lidar is sounding in the retro-reflection or hotspot point.

More generally, the situation we are modelling is that of a transmissive medium filled by dispersed scattering objects. The transmission of the medium is assumed to be high—such as the atmosphere on most occasions and the objects may not be opaque but may also be assemblages of smaller objects, linked and with different scattering properties. An example is a tree which is an assemblage of branches, stems and leaves but where the leaves are often clumped into "modules" within the general area called the tree "crown".

In such a system, the transmission of a ray is governed by the Gap Probability Function, $P_{gap}(z, \mu)$, which is the probability that the ray will travel to range z in direction $\mu$ without contact with an object. It is also known as the length distribution function for rays in the direction $\mu$ that do not intersect an object.

In these systems suitably configured ground and airborne Lidars can sense this function as well as the second order function $P_{gap}(z_1, \mu_1, z_2, \mu_2)$ which is the probability that rays in directions $\mu_1$ and $\mu_2$ and ranges $z_1$ and $z_2$ will not intersect an object. The estimation of the second order function can be done by using "rays" of various sizes and shapes and ranging in many directions $\mu$.

A laser pulse can be sent in one direction ($\mu_1$) and received at a separate location and from another direction ($\mu_2$). Such a beam will have travelled through gaps in the field of objects to a point that is specified by $\mu_1$ and $\mu_2$ and the travel time to and from the location at which it has been scattered by an object. The beam will have returned to the receiver again through gaps in the assemblages of objects. While this general "bi-static" case is a potential tool for analysis, the specific system considered here will be one where the outgoing pulse and the return beam are aligned—the "bore-sighted" Lidar case. Since this operates in the "hotspot" region where all points of objects reachable from the source are also "viewable" by the sensors through the same gaps it follows that $P_{gap}(z, \mu, z, \mu) = P_{gap}(z, \mu)$.

In this case, the relationship between the Lidar system measurements and the gap functions is through the "Law of the first Contact". This is the probability that the first contact with an object occurs at distance z and can be written:

$$P_{FC}(z, \mu) = -\frac{dP_{gap}(z, \mu)}{dz}$$

This is basically the intercepting area of scatterers at range z that are reachable from the source.

Writing the equation in terms of distance (range) rather than time, and assuming the calibration factor discussed above (C(r)) is known, if $P_{gap}(r)$ is the probability of no collisions from zero to range r then a simple model of the apparent reflectance of the canopy at range r can be developed:

$$\rho_{app}(r) = \frac{r^2}{C(r)} \frac{E(r)-e}{t_A^2 E_0}$$
$$= \rho_v P_{FC}(r)$$
$$= -\rho_v \frac{dP_{gap}}{dr}(r)$$

where:

$\rho_v$ is the "effective" hotspot reflectance of foliage elements in the direction of the Lidar (integrated over foliage angle distribution) and may include object orientation and specular effects from foliage facets normal to the beam.

The signal back from the ground will be:

$$\rho_{app}(h) = \rho_g P_{gap}(h)$$

This assumes there is little or no forward scatter or the individual foliage elements are not very highly transmitting. Multiple scattering may cause time delayed signals and signals back from "under the ground". In most cases and in most bands they are not anticipated to be very large.

FIG. 1.3 shows a set of five return signals obtained from a NASA SLICER sounding over a Boreal forest site. The pulse width is very dear in the ground returns to the right and the attenuation of the signal in the canopy (after rise to a peak return) is also well illustrated.

The large object model for the Lidar scattering is based on the fact that the derivative of the logarithm of the gap probability function (or Law of First Contact) gives a measure of the density of scattering of the surviving radiation. Note again that the reflectance is in the retro-reflection or hotspot point. Even for lambertian leaves, the effective cross-section of the foliage elements needs to be computed—especially for the ECHIDNA™ where the angular soundings are important to the modelling.

Another way to write the equation is to define a gap attenuation coefficient (or Apparent Foliage Profile):

$$l(r) = -\frac{1}{P_{gap}(r)} \frac{dP_{gap}(r)}{dr}$$
$$= -\frac{d\text{Log}P_{gap}(r)}{dr}$$

The solution for canopy information proceeds as follows:

$$\rho_{app}(r) = -\rho_v \frac{dP_{gap}(r)}{dr}$$
$$H(r) = \int_0^r \rho_{app}(r')dr'$$
$$= -\rho_v \int_0^r \frac{dP_{gap}(r')}{dr'} dr'$$
$$= \rho_v(1 - P_{gap}(r))$$
$$= \rho_v Cover(r)$$

The function H(r) can be computed from the data as a cumulative factor. But, it is known that:

$$\rho_{app}(h) = \rho_g P_{gap}(h)$$
$$= \rho_g\left(1 - \frac{1}{\rho_v}H(h)\right)$$

which provides a consistency relationship for the reflectances and foliage profile. That is:

$$\rho_{app}(h) = \rho_g - \frac{\rho_g}{\rho_v} H(h)$$

To solve this for the gap profile, it is usually assumed that the ratio of the (presumed constant) foliage and ground reflectances is known. For sloping ground the ground reflectance is assumed to be modulated by the cosine of the slope angle. The ground reflectance is then given by the above equation and hence both reflectances are given from the data. With this assumption, $\rho_g$ can be computed and hence also $\rho_v$.

Note that from this follows that:

$$Cover(r) = \frac{1}{\rho_v} H(r)$$
$$= \frac{H(r)}{H(h) + \frac{\rho_v}{\rho_g} \rho_{app}(h)}$$

so that Cover at any depth can be mapped as can tree height from the start of the foliage returns. Hence, the canopy structure diagram plot can be developed for an area.

For the canopy profile:

$$P_{gap}(r) = 1 - \frac{1}{\rho_v} H(r)$$
$$= 1 - \frac{H(r)}{H(h) + \frac{\rho_v}{\rho_g} \rho_{app}(h)}$$

which is easily computed from the data.

The corresponding gap probabilities for the Lidar data taken by an experimental US system (SLICER) are shown in FIG. 1.4.

The projected Apparent Foliage Profile can now be obtained by using the relationship:

$$l(r) = -\frac{1}{P_{gap}(r)} \frac{dP_{gap}(r)}{dr}$$
$$= -\frac{d\text{Log}P_{gap}(r)}{dr}$$
$$= \frac{\rho_{app}(r)}{\rho_v - H(r)}$$

However, this can potentially become unstable in low SNR cases where the signal being returned is small and $P_{gap}$ has become small due to attenuation by foliage above the point. This must be handled in a satisfactory way by regularisation.

Nevertheless, the provision of the gap profile $P_{gap}(r)$ (see FIG. 1.5) is a major outcome and may be used in further canopy modelling as described below.

It can be shown (see Appendix 1) that provided the calibration model in the region where canopy and ground data are represented can be represented as:

$$C(r) = \frac{\tilde{C}}{r^2}$$

where $\tilde{C}$ is constant, and if it is assumed the data are normalised by the outgoing pulse intensity in the units of the data collection (this means measuring the pulse power), then the solution may again be obtained by applying the same method d the reflectance ratios are known and there is a ground return. Therefore the solution is obviously quite practical in most situations. In fact, since for up to 50 metre canopies and 2000 metre flying height, the variation due to normalising by $r^2$ is small it is often neglected as well—as are background radiation and atmospheric transmission. This is in marked contrast to other cases (such as atmospheric Lidar modelling) where the targets are spread over a very wide range.

The quantity "cover(r)" presented here has also been called the FHP or Foliage Height Profile. However, as derived in this form it, and the apparent foliage profile, are able to be derived and modelled for general canopies rather than just random leaf canopies.

1.2 Implementation of the Models 1.2.1 Vertically Layered Random Foliage Model

A simple model for gap probability is the vertically layered random foliage model. In this case, the foliage profile is simply the Foliage Area Density (total one sided area of foliage per unit volume) denoted F(r) and the canopy is assumed to extend uniformly in horizontal directions.

In this case let l(r) be the projected cross sectional area of scatterer per unit volume at range r assumed randomly and independently distributed.

Basically, $$l(r) = \lambda(r) \bar{a}(\mu_v)$$

where:
$\lambda(r)$ is the density of scatters at range r and
$\bar{a}(\mu_v)$ is the mean cross-sectional foliage area for the incidence and view angle $\mu_v$ (which is nadir view in this case)

Alternately, $$l(r) = G(\mu_v) F(r)/\mu_v$$

where G is the Ross G-function.

If foliage elements are assumed to be very small so that occlusion can be neglected, we can simply write:

$$P_{gap}(r) = e^{-\int_0^r l(s) ds}$$

$$\rho_{app}(r) = -\rho_v \frac{dP_{gap}}{dr}$$

$$= \rho_v l(r) e^{-\int_0^r l(s) ds}$$

$$\rho_{app}(h) = \rho_g e^{-\int_0^h l(s) ds}$$

If L(r) is defined as the cumulative projective cross sectional area:

$$L(r) = \int_0^r l(s) ds$$

then:

$$P_{gap}(r) = e^{-L(r)}$$

$$\rho_{app}(r) = \rho_v l(r) e^{-L(r)}$$

$$\rho_{app}(h) = \rho_g e^{-L(h)}$$

In this case, the canopy gap attenuation coefficient or Foliage projected Profile is just the incremental leaf area.

Note that:

$$-\text{Log } Cover(r) = -\text{Log}(1 - P_{gap}(r))$$

$$= L(r)$$

In a practical case, the foliage will not be assumed distributed to a point but perhaps in a finite layer. If $L_i$ is the cumulative effective cross sectional area to layer i:

$$L_i = \sum_{j=i_{min}}^{i} l_j$$

then the equations become:

$$\rho_{app,i} = \rho_v (1 - e^{-l_i}) e^{-L_{i-1}}$$

$$H'_i = \sum_{j=1}^{i} \rho_{app,j} = \rho_v (1 - e^{-L_i})$$

$$\rho_{app,h} = \rho_g e^{-L_h}$$

Note if there are N layers there is a consistency relationship as before:

$$H'_N = \rho_v (1 - e^{-L_N})$$

$$= \rho_v \left(1 - \frac{1}{\rho_g} \rho_{app,h}\right)$$

So that, as before, if the reflectance ratio is assumed or known, the data can be inverted to get $P_{gap}(r)$ and foliage profile. The issues of pulse deconvolution and regularisation of the foliage profile estimate will be addressed later.

The horizontally random model has the property that the actual projected Foliage Profile is the same as the Apparent Foliage Profile. However, horizontal gaps and clustering into crowns and foliage clumps affect both the variance profile between different shots and also the relationship between actual and apparent foliage profile. This will be discussed in more detail later.

1.2.2 Beam Divergence and Scaling Issues

So far, the time resolution of the Lidar pulse has been considered but not the beam divergence or spot size. Obviously, the bigger the beam divergence the larger the spot size on the ground and the more horizontal canopy averaging that will take place.

The large object model for the Lidar scattering is based on the fact that the derivative of the gap probability function (or Law of First Contact) gives a measure of the density of scattering of the surviving radiation.

In a canopy Lidar, the beam is also spread over a finite footprint. This corresponds to a bundle or cone of "rays" spreading out over a range of angles from the source point. Each of the rays may penetrate the canopy to a different depth and return energy from that point. The effect of this broader beam is thus to create a Lidar "waveform" of returns spread over a number of points of time.

The basic equation based on the first hit probability provides an expected distribution of returns. A single "ray"

of near zero width will have a single return which is a drawing according to the Law of the First Contact. Over a finite beam each ray can be thought of as a sample from this distribution allowing the measured first contacts to provide an estimate for the expected return distribution over time as modelled above. To measure this distribution, the system needs to record the Lidar return intensity over time at a high enough density to resolve the returns.

There is a significant interplay between the beam width and the time structure of the returns. A single ray will have a single return from the first hit. Even a finite beam will normally have a single return if the objects are large. For example, even a very broad beam will have a single return (spread in time only by the outgoing pulse spread) from a wall perpendicular to the beam.

The time spread of returns is in fact a function of the object sizes and shapes and dispersion as well as the "opacity" of the objects. Objects which are solid will give narrow returns and objects which are assemblages of smaller objects will give dispersed returns in which the "clustering" indicates the object itself. Making use of this response is an opportunity in canopy Lidars.

Mathematically, the relationship will depend on the second order (correlation) functions for any range z:

$$h_z(\delta\mu)=P_{gap}(z, \mu_0, z, \mu_0+\delta\mu)$$

where $\mu_0$ is the direction of the ray at the centre of the beam and $\delta\mu$ traverses the beam and also on the way at "scales".

For example, if the objects are large relative to the beam size with comparable between-object separations, then the waveform will have separated clusters of returns corresponding to these objects. The spread within the clusters will depend on the within-object structure but will often be dispersed. If the objects are small relative to the beam size then the returns will be multiple (or near continuous) and be spread in time in relation to the local density of the objects. An example of the first is tree crowns filled with leaves being sensed by a canopy Lidar and an example of the second is an atmospheric sounding Lidar where the objects (atmospheric particles) are always small relative even to a very narrow beam.

In terrain Lidars, the beam is small so that for many canopies there will be relatively few returns from a single shot. However, the density of coverage needed if the beam is small even relative to leaves and twigs is very high and if the beam is broadened many more time dispersed returns from the canopy will mask the terrain signal.

The time spread of the outgoing pulse, the beam width and the sampling rate of the recorder all need to be carefully modelled to allow the derivation of the canopy structural information or even to effectively measure terrain in the presence of an overstorey. This interaction between the beam width and the structure of the system being sounded is not only a means for averaging the first-hit probabilities but is also information that canopy Lidars have the potential to obtain and exploit.

1.2.3 Pulse Width and Deconvolution

If the background were a flat, lambertian surface then the return signal from it would mirror the shape and width of the Lidar pulse. The width of a Lidar pulse varies with instrument and the FWHM (Full Width Half Maximum) determines the range resolution of the instrument. That is, the lidar has difficulty in resolving targets separated by less than the range equivalent of the FWHM. With the VSIS of the present invention this range is one half a metre or a pulse width of about 3 nanoseconds. The digitising of this signal can be down to one half a nanosecond.

The width and shape of the return signal from the ground can be modified significantly by micro-relief and also by slope. The slope effect is larger for a bigger spot size, which is another reason that small spot sizes are favoured for DTM mapping Lidars. For example, if the slope angle is $\theta$ and the spot size is d metres, the width of the pulse will be increased by:

$$w'=w+d\ \text{Tan}\ \theta$$

That is, if d is 25 m a slope of 1:10 will increase the width significantly.

FIG. 1.6 shows a set of ground returns from SLICER data. It is known that the SLICER pulse shape is not very stable—however, there is a significant shape consistency in these plots which also include a Rayleigh as a model for the pulse shape plus an "asymmetric" Gaussian:

By "deconvolution" is meant the inverse of the "convolution" of the signal that would be acquired by a very sharp pulse with the waveform of the actual pulse. Deconvolution can be carried out in the frequency domain by Fourier transform or the time domain by least squares.

That is, if the zero time is taken as the peak of the Laser pulse, the signal (after removal of background noise) can be modelled as:

$$P(r)=h(r)*S(r)$$

where:

h(r) is the pulse shape function and

P(r) is the actual measured return power.

For example, it has been seen that for the Lidar used for initial experiments a modified Rayleigh model for h was reasonable of the form:

$$h(s)=a(s-s_0)_+^c e^{-b(s-s_0)^2}$$

The solution can use fourier or time domain approaches. Time domain is favoured here as the digitising step and length limit the fundamental frequency and Nyquist for the discrete fourier representation of the data and hence the finite pulse is heavily aliased. Also, the transformed pulse will be small in the high frequency part of the spectrum and the deconvolution will be unstable unless some regularising is applied.

The "quadrature" approach to the time domain version finds a filter such that to a good approximation:

$$P_i = [h*S](r_i) \approx \sum_{j=-k}^{k} h_k S(r_{i+j})$$

where $r_i$ is the i'th sample range.

If it is enforced that the actual signal S is zero above the canopy and below the ground then this can be written as a set of equations which may be solved for S.

$$HS=P$$

$$S=H^{-1}P$$

The solution for S is also not free of noise and the reasons are actually much the same as in the fourier domain. So, some regularizing can be applied.

One method of regularisation is to only estimate a convolved S with the new convolution function having a much smaller width (eg 1 nanosecond rather than 10 nanoseconds). This acts to filter out very high frequency effects and will stabilise the solution. If this convolution is written as K this means estimating KS so that:

$$KHK^{-1}(KS) = KP$$

$$(KS) = (KHK^{-1})^{-1}(KP)$$

where the operation of K on P acts as a prefilter for high frequency noise.

A major advantage of the time domain approach is in the finite representation of h and the control over the quadrature approximation to the convolution. More control over the regularisation is also possible. For example, to regularise the above solution may require:

$$L(KS) = \|(KHK^{-1})(KS) - (KP)\|$$

to be small and some regularisation such as KS or some derivative of KS to be small.

There are a number of time domain approaches to developing the filter weights $\{h_k\}$ and solving the equations. In its general form, the inverse convolution (or de-convolution) problem is to estimate a function s(t) from an observed function p(t) satisfying:

$$p(t) = \int_{-\infty}^{\infty} \phi(t'-t)s(t')dt' + \epsilon(t)$$

where $\phi(t)$ is an analytically known function—the Lidar pulse in this case, and $\epsilon(t)$ is the noise.

An approach that has been used to good effect is to use interpolation functions such as splines with regularisation.

Let s(t) be approximated by an interpolating spline for a set of time points (the spline knots, $\{t_i|i=1, n\}$) and represented by its Cardinal series of functions $M_j(t)$ satisfying:

$$M_j(t_i) = \delta_{ij}$$

It follows that s(t) can be represented as:

$$\tilde{s}(t) = \sum_{j=1}^{n} s_j M_j(t)$$

$$\tilde{\varphi}_j(t) = \int_{-\infty}^{\infty} \varphi(t' - t) M_j(t') dt'$$

Let then the result is the least squares solution to a problem that can be regularised by using a reduced number of spline knots or by a smoothing function of the form:

$$\tilde{p}(t_k) = \sum_{j=1}^{n} \tilde{\varphi}_j(t_k) s_j + \varepsilon_k$$

$$= \sum_{j=1}^{n} h_{kj} s_j + \varepsilon_k$$

The main elements here are the analytical convolution, the imposition of zero returns outside the estimated bounds of the top of canopy and ground plus regularisation. However, the weights ($h_{kj}$) may not be positive and there can be high frequency effects to remove by post filtering. Careful and adaptive regularisation based on noise statistics is used.

1.2.4 Design and Specification of Lidar Systems by SNR Modelling

As noted above, calibrated Lidar systems can be converted to "apparent reflectance" or the reflectance a flat standard (lambertian) target at the given range would have to produce the same return signal. Similarly, the models described above can be defined and discussed in terms of the apparent reflectance as well.

The apparent reflectance for a range of different land covers or modelled land covers and forests can provide a means to specify and design the Lidar systems needed for airborne or ground based measurement and mapping. The airborne system will be discussed here.

As described previously, an instrument can be characterised by testing or modelling in terms of its ratio of signal level to noise, or Signal to Noise Ratio (SNR). Both the noise and the SNR depend on the signal level so that for a given power across the receive telescope field of view there will be an SNR value and by division of the signal level by the SNR there will be an RMS noise level computable as well.

For an aircraft flying at a given altitude at a given time of day with specified atmosphere there will be well defined atmospheric transmittance and background radiance so that the signal arriving for the range to the canopy will depend only on the apparent reflectance level and (hence) there will be an SNR value for each value of apparent reflectance at that range.

It follows then that if the flying time, height and atmosphere are specified and a model for SNR as a function of apparent reflectance is given (modelled) such as by:

$$SNR = a + b \rho_{app}^n$$

then for every model canopy it is also possible to plot SNA and RMS noise as a function of height above the ground.

This provides a useful analysis of our capacity to resolve layers in the canopy—especially in the presence of dense overstoreys.

However, it is not providing a direct analysis of the resolvability of the information In the canopy. To do this, use is made of the model for the inversion to apparent foliage profile:

$$l(r) = -\frac{1}{P_{gap}(r)} \frac{dP_{gap}(r)}{dr}$$

$$= \frac{\rho_{app}(r)}{\rho_v - H(r)}$$

By making some approximations it is possible to show that the RMS error for the inverted apparent foliage profile has the form:

$$RMS_l(r) = \frac{\rho_{app}(r)}{\rho_v P_{gap}(r) SNR}$$

A set of models for Australian land covers will subsequently be presented and their Lidar returns simulated. A number of SNR models for typical instruments have been used to plot these measures of performance and define the needs for an effective Instrument to map the lower layers of Australian forests.

1.3 Advanced Products—Indices, Layers and Spatial Variance

The models and methods described above represent a base set of products for mapping vegetation canopies from airborne Lidars.

However, as discussed in previous sections, there are many factors that an airborne Lidar is "blind" to in the canopy. These include foliage angle distributions, the clumping of foliage into crowns and the relationships that exist between stem and foliage. Inference of these, or of important canopy parameters despite these, can be done where the forest system shows high levels of correlation between vertical (apparent) foliage profiles and the significant parameters. The relationships that are developed are similar to allometric relations used by foresters. Alternatively, advanced modelling may be used to unravel some of these factors.

1.3.1 Canopy Indices

Indices can be developed based on Lidar waveforms, gap probability curves or apparent foliage profiles. In a known example of such indices, an index related to bird species diversity is developed. If $l_i$ is the apparent foliage in the i'th layer then:

$$p_i = \frac{l_i}{\sum_{j=1}^{N} l_j} = \frac{l_i}{L}$$

The foliage height diversity (FHD) index was defined as:

$$FHD = -\sum_{i=1}^{N} p_i \text{Log} p_i$$

The foliage profile is divided into three layers, 0–2', 2–25' and over 25'. A relationship for the study area exists between the index and bird species diversity (BSD) defined similarly on the distribution of birds among a large number of species. (In fact, it was found that BSD=2×FHD fitted the data well).

In effect, this is expressing the idea that a single tree layer will only attract a few species whereas a multi-layer canopy will attract many. This may come about as different species make use of the different layers. Whatever its ecological significance, however, it does express an important fact about the diversity of the structure. It fits well with the general structural categories of the NVIS (National Vegetation inventory System).

A quantity called "quadratic mean canopy height" (QMCH) is known and defined as:

$$QMCH = \left( \sum_{i}^{\max h} p_i h_i^2 \right)^{1/2}$$

where $p_i$ is as before except that here the foliage "bins" are 1 m thick and the $h_i$ are the mid-points of the layers. Maximum, mean and median canopy heights are defined in a similar way relative to the fractions of apparent foliage at different levels of the profile.

Another known index has been derived as the median height above the ground in the Lidar waveform (including the ground return). Obviously, the lower the cover the lower the index. In some ways, this index is related to height multiplied by cover which again is often well correlated with height times basal area—or timber volume. However, there is obviously considerable complexity integrated into the index as well.

The derivation and utility of indices will develop as data increases and experience grows. Nevertheless, an interpretation of the data in terms of modelling and inversion is attractive and the options we have for such products will be examined subsequently.

1.3.2 Recognising and Mapping Canopy Layers

The provision of samples of the gap probability and initial (possibly regularised) foliage profiles can be seen as an initial step in data interpretation. Interpreting the data as a random and independent layered canopy with the foliage profile as the measure of its vertical LAI distribution is clearly inadequate in the real world of discontinuous canopies and mixed trees and shrubs as they occur in most Australian native vegetation covers.

In a clumped canopy, attenuation between crowns will be low and within crowns high. As a result, the Apparent Foliage Profile will usually be lower in foliage density than the actual profile due to foliage being "hidden" at depth in the crowns. So, it is preferred to retrieve from the data the crown and clumping properties of the canopies to estimate the foliage correctly.

Another consequence of canopy heterogeneity is the variance of the data which arises from the clumping of foliage into crowns and trees into clumps. This means groups of Lidar shots must be combined to provide an interpretation. But aggregated data also tends to remove the distinctions between a vertically layered canopy and a more realistic model with tree crowns and layering by trees rather than by foliage. Hence, the combined use of spatial variation and individual vertical shots seems to provide the best strategy in heterogeneous canopies.

An empirical approach to the definition of layers and their extraction from the Lidar data is to aggregate shots from apparently homogeneous areas (as defined by other forms of remote sensing, such as a simultaneously obtained multi-spectral image) and fit functions describing each layer. The layers could then be fitted to each shot to get local variation in layer intensity.

One such function is the Weibull distribution. For a single layer of maximum height H, and moving to height above the ground (z) rather than range, this function models the cumulative foliage profile as:

$$L(z) = a(1 - e^{-b(1-z/H)^c}) \quad 0 \leq z \leq H$$

$$P_{gap}(z) = e^{-L(z)}$$

which can model a single profile of l(z) with a single peak by exact differentiation:

$$l(z) = \frac{abc}{H}(1 - z/H)^{c-1} e^{-b(1-z/H)^c}$$

By choosing a number of layers, this group of functions can model most profiles—but after one or two it usually becomes ill posed to fit these functions. For example if there are N layers:

$$0 \leq H_1 \leq H_2 \leq \ldots \leq H_N = H$$

then the model can be written (where $t_+ = 0$ if $t \leq 0$):

$$L(z) = a\left(1 - \sum_{i=1}^{N} q_i e^{-b_i(H_i - z)^{c_i}}\right)$$

$$q_i \geq 0 \quad \sum_{i=1}^{N} q_i = 1$$

The recognition of layers obviously needs some care and involves mixed linear and nonlinear modelling. However, applying this method to aggregated data over an area or stand to establish an effective two or three layer description like the Carnahan or NVIS structural model can lead to an initial overall description of the canopy into major stands and layers which can be interpreted locally as a second step.

That is, a and the $q_i$ values can be inverted for single profiles with constraints that they are non-negative. These can then be used to interpret layer cover. This is possible because the Weibull distribution has a useful interpretation in terms of the work we have described in previous sections. Considering a single layer and looking at $P_{gap}(0)$ for the Weibull distribution it is seen that:

$$P_{gap}(0) = e^{-a(1-e^{-b})}$$

Then:

$$a = \lambda \bar{A} = CAD$$

$$CC = 1 - e^{-CAD} = 1 - e^{-a}$$

$$b = G(1)L_W$$

$$CF = 1 - e^{-b}$$

where CAD is Crown Area Density, CC is Crown Cover and $G(1)$ and $L_W$ are discussed in the Appendix 2.

That is, the data can be interpreted in terms of both crown cover and projected foliage cover. Advantageous information products such as layer height and layer average height are derived from the models thus fined.

For example, using the same data set as in the previous examples, stable gap profiles can often be obtained by averaging over SLICER shots as seen in FIG. 1.7:

There is a considerable variation between these lines in terms of both layering and cover. However, to illustrate the method only the overall lumped average profile is fined.

FIG. 1.8 shows the results of fitting three Weibull functions to the data:

The profile labelled "Pg_m1" is a single Weibull model fitted to the upper canopy. Clearly it does not provide a good model for the understorey.

FIG. 1.9 shows the Weibull functions involved which approximate the accumulated foliage profile $L(z)$:

The three components are shown plus the single Weibull function optimised to the upper canopy. The small near-ground component is assumed to be an artefact of the profile not being well corrected for the influence of the ground pulse by deconvolution.

FIG. 1.10 shows the resulting apparent foliage profiles.

The curve labelled FP_m2 is the combined model excluding the small near-ground component thought to be an artefact of the ground pulse. The curve labelled FP_m1 is the optimised to upper canopy single Weibull model.

Clearly, the model fits well. Two more components (one small density of emergent trees and another mid-canopy layer) can be added. These are present in the current data set due to the aggregation of quite different shots. In practice, data from similar spatial areas (Lidar estimated stands) will be used to establish the layering.

Using the above associations between the Weibull model and the traditional structural information results in the following Table:

|     | CAD   | CC(%) | CF(%) | H     | L(0)  | PFC(%) |
| --- | ----- | ----- | ----- | ----- | ----- | ------ |
| L1  | 0.747 | 52.6  | 99.9  | 12.39 | 0.742 | 53.3   |
| L2  | 6.72  | 99.9  | 4.7   | 5.21  | 0.313 | 26.5   |
| L3  | 20.19 | 100   | 0.1   | 1.99  | 0.027 | 2.0    |
| L1' | 0.696 | 50.1  | 99.8  | 12.42 | 0.695 | 50.0   |

It seems that the interpretation for the major layer (L1 or L1') is sound but for the other two (L2 and L3) the PFC would be a main output with a and b being relatively unstable. L3 is most likely not vegetation. Note, however, that this approach does not provide any Information on crown size and density and other methods must also be used to obtain them.

The estimation of discontinuous properties, such as crown size, layering, height statistics, relative abundances of growth form and cover by layer and tree type is obviously a much more significant effort than the provision of structure diagrams and apparent foliage profiles. However stand properties such as gappiness, dumping and crown sizes by layer are achievable for regional areas in accordance with the invention. In particular, the data provides statistics of clustering and gappiness as a function of height. This Is very strong data for image variance studies. The relationship between variance as a function of height as well as foliage density as a function of height is particularly valuable information.

1.3.3 Use of Gap Models for Discontinuous Crown Canoples

Either as a second step following layer recognition, or directly from the data, a more detailed crown based model may be provided by either simple Boolean models or the Li $P_{gap}$ model. It can take into account the clustering of foliage into crowns and variation of tree heights. However, it is based on a very simple canopy structure and this model must be extended and enhanced to be able to describe gap probabilities characteristic of the types of discontinuous canopies common in Australia. At this time there are two main gap models being used with Lidar data. A brief description of these follows.

1.3.3.1 Simplified Whole Layer Gap Made

A simple gap model can be based on a layered canopy as measured in the field using the Walker and Hopkins description of a canopy. In this simple model it is assumed that a test ray will hit at most one crown in any layer and that the layers can be treated independently. This is reasonable for woodlands and open forests and near vertical view angles but not for dense, tall canopies at oblique look angles.

For simplicity, suppose that there is just one layer of trees above the ground and that the density of tree "centres" projected on the background is $\lambda_C$. Also, assume the tree crowns are so dense that they are effectively opaque and that the mean projected area of a crown on the background from direction $\mu$ is $A(\mu)$. Then for the whole canopy:

$$P_{gap}(\mu) = e^{-\lambda_C A(\mu)}$$

Where:

$$A(\mu) = A/\mu'$$

Where A is the vertically projected crown area and:

$$\mu' = \cos\theta'$$

$$\operatorname{Tan}\theta' = \operatorname{Tan}\left(\frac{T}{D}\operatorname{Tan}^{-1}\theta\right)$$

with T as crown Thickness and D as crown Diameter.

This shows that for such a canopy, it is not the leaf angle distribution that is deciding the gap probability but the crown shape. (T/D). Obviously, however, crowns are generally open and "filled" with leaves rather than opaque. The simple extension used was to write:

$$P_{gap}(\mu) = e^{-\lambda_C A(\mu)(1 - e^{-\lambda_L A_L(\mu)})}$$

where $\lambda_L$ is projected density of leaves in a single crown and $A_L$ is the mean projected area of a leaf on a horizontal surface from the direction $\mu$.

Another way of writing this model is:

$$P_{gap}(\mu) = e^{-\lambda_C A(\mu)(1 - P_{gap,W}(\mu))}$$

where $P_{gap,W}(\mu)$ is the probability of a gap in a crown in the direction. This extends the vertical view results derived before. If the crown is modelled as a volume filled with leaves with volume density of leaf area F we could write as an approximation:

$$P_{gap,W}(\mu) = e^{-G(\mu)F\bar{s}(\mu)}$$

where G is the Ross function and $\bar{s}(\mu)$ is the mean distance through a crown in the direction $\mu$.

More correctly (but more difficult to derive) is:

$$P_{gap,W}(\mu) = \int_{Crown} e^{-G(\mu)Fs(\mu)} p(\mu,s) ds$$

where $p(\mu, s)$ is the distribution function for lengths through a crown in the direction $\mu$. Expressions for this mean are derived for the vertical view in Appendix 2.

This simple model of leaf filled crowns as opaque crowns with "holes" in them illustrates how the gap probability is a function of the clustering into crowns, the shape of the crowns and the amount and angle distribution of the leaves in the crowns. This may be extended to multiple layers of independent trees and coincides with the previously discussed model for PFC when the view is vertical.

As the model was proposed, however, it only provides an approximate model for a ground based hemispherical photograph or total gap Lidar and does not provide $P_{gap}$ as a function of position (ie range) in the canopy (unless it is by major layer). Its main limitation is its assumption that only one crown at most is intercepted and applies to the whole canopy—or only to a canopy by layers. A better approximation is known, which takes overlapping crowns into account as well as crown projected area.

However, to obtain the completely general probability function it is necessary to model the length of a path to a certain depth in the canopy from a specific direction that will be within crowns. This is known and provides an effective model for a single layer of trees of constant size but varying heights.

1.3.3.2 Generalised Gap Model

In the extended model referred to above, the canopy is assumed to be described as an assemblage of randomly distributed tree crowns with spheroidal shape having horizontal crown radius r and vertical crown radius b and centred between heights $h_1$ and $h_2$ as the lower and upper bounds of crown centres above the ground. The crown count volume density $\lambda_v$ is equal to:

$$\lambda_v = \frac{\lambda}{h_2 - h_1}$$

where $\lambda$ is the stem count density.

Within the crowns there is supposed to be a random distribution of foliage so that the gap probability is separated into two effects depending on the between crown gaps and the within crown gaps. That is, a test ray will penetrate to a given depth either by not hitting a crown volume or else by hitting at least one crown but passing through the within crown gaps.

For a Boolean model (crown centres distributed as the Poisson distribution) the between crown gap probability can be written:

$$P(n=0|h, \theta_v) = e^{-\lambda_v V_r}$$

where:
n=0 indicates that the number of crowns "hit" is zero
h is the depth to which the ray penetrates
$\theta_v$ is the view zenith angle or zenith angle of the test ray and
$V_r$ is the beam projected cylinder volume with radius r from the top of the canopy to h The within crown gap probability is complex as the path length through crowns is random and may be through or into more than one crown. It the length of path in crowns is denoted s and the within crown attenuation is modelled as a Boolean model:

$$P(s) = e^{-\tau(\theta_v)s}$$

where:

$$\tau(\theta_v) = k(\theta_v)F_a$$

where:
$k(\theta_v)$ is the leaf area projection factor for view angle $\theta_v$ and
$F_a$ is the foliage volume density.

The within crown gap probability can be written in terms of path length and attenuation as:

$$P(n>0|h, \theta_v) = \int_0^\infty P(s|h, \theta_v) e^{-\tau(\theta_v)s} ds$$

It follows that for this special case of a crown and foliage model an approximation to the gap probability function may be made. This may be used in the analysis of hemispherical photography or the penetration of sunlight or the effects of canopy structure on albedo—as well as in the interpretation of Lidar data.

There is a range of extensions to this model. One is to divide the canopy into layers as has been done in the mapping of Australian vegetation and the second is to consider the trees and shrubs in the layers (or the middle layer at least) to be one of a number of morphological types. A third extension may be to allow the crown sizes to be random as well. With these in place—at least the first two—a complete model for gap probability which is compatible with the Australian structural description of vegetation is available which better summarises the data obtained by the field work discussed above.

1.3.4 Shot Variance as a Function of Range and Spot Size

From shot to shot there will be natural variation as well as noise. It is possible to explain some of the natural variation and its relationship to the spot size using a Boolean model of Appendix 3 and the methods referred to above. This variation may also be used to derive advanced canopy parameters.

The estimated gap probability function can be used to provide the probability of gap between and hitting of foliage in a thick "slice" at range r. Adopting the notation of the Appendix 3, the proportion of pore or gap in a slice at range r can be written:

$$q(r) = e^{-l(r)}$$

and $1-q(r)$ is the projected proportion of foliage in the slice scattering the light back to the instrument.

In a canopy of trees and shrubs the foliage will be clumped into crowns so that for any given shot the "slice" will consist of disk like clumps of foliage. The proportion of foliage therefore intersected by the Lidar spot will vary and be a function of the tree density, crown sizes and the spot size.

The models relating to these variations are known. For the same average amount of foliage, the clumping into a few large crowns per unit area will generate higher variance than if the foliage were randomly dispersed or clumped into a large number of small clusters.

Of course, the variance for slices at different levels will not be independent. Hence, the vertical and horizontal spatial correlation (or variogram) and the variance it induces in Lidar data provide a strong indicator of the clumping effects of trees and shrubs in the various layers.

In the example below the effect of spatial averaging is presented assuming it is explained solely by the variance induced by the clumping. The use of spatial variance to estimate the clumping factor and hence to correct for the differences between actual and apparent foliage profile provides advanced products.

Thus an invention aspect in the processing described here is in its use of the changing data that is collected by flexible and varying beam width instruments. The larger beam width of the canopy Lidar is not just about averaging or reducing spatial variance. The change that occurs with varying beam size and shape provides information and in hardware parallels the fundamental operations of mathematical morphology outlined in the Appendix 3.

1.3.5 Limiting Case: Interpreting the Terrain Lidar Data

In the limit of very small spot size the variance in both vertical and horizontal directions will be very high. However, this variance is eagerly sought in the case of the terrain lidar which is used to map terrain elevation where as many shots hitting the ground as possible are used to plot the trace of the land surface and create a Digital Terrain Model (DTM).

Terrain Lidars generally have a small spot size and pulse at very high rates to get a very high density of narrow beam samples over a given patch of ground. To obtain the high density, such instruments are often flown on helicopters with accurate GPS and INS systems to locate the spots on the earth's surface. Generally, terrain Lidars record the first and last significant return without calibration. The range can be estimated from the peak of the return since individual returns are generally separated and discrete.

The terrain surface is measured by estimating the "envelope" under the last significant returns, eliminating anomalous values and then interpolating the data to a DTM. Alternatively, a "prior" estimate of the DTM may be used to eliminate anomalous data and home in on an accurate surface model. In the vertically oriented and open canopies of Australian Eucalypts it is a reasonable expectation that many ground returns will be available and an accurate DTM can be estimated, even under quite dense forest canopies in terms of crown cover.

Many of the first returns of the terrain Lidars operated in forests are scattering events from canopy elements. This has led to the investigation of the data for the purpose of canopy measurements. If canopy cover, height and structure can be inferred from terrain Lidar data it could well add value to surveys that are primarily aimed at creating DTMs.

Altimeter data of this kind have significant disadvantages for vegetation mapping. Among these are:

The high spatial variance in horizontal and vertical extents;

Range walk and other instrumental effects;

Lack of calibration of the data:

Speckle effects due to specular facets;

High data volumes to process per hectare covered.

Speckle, for example, is created by small reflecting facets that act as Fresnel reflectors and provide apparently high energy returns from a low density of scatters. Such effects in understorey create very difficult decisions for interpolation of the DTM. Also serious, is the burden of processing the large volumes of data per hectare in order to map quite small areas for vegetation information.

One means to interpret and use such data was reported in which the return pulses over a local region are convolved with a simple model of return intensity and summed. It was found that the resulting "pseudo-waveforms" were very similar to those obtained by the larger footprint LVIS data in the same region. However, this may have been due to the area considered and it seemed that the foliage profiles the different data sets would give rise to would vary more than the modelled waveforms.

An alternative method of interpreting these data for vegetation height, cover and structure goes back to the original methods. It must, however, be preceded by some pre-processing of the DTM. Specifically, it is assumed the following processing has been done:

Ground returns (usually from last return) identified;

DTM interpolated to every point;

Baseline shifted for ground level at zero height.

In this case, the first return data can be separated into those shots that come from canopy elements and those that come from the ground. The ratio of ground returns of the first return to the total shots is an estimate of the total canopy gap fraction—however, it is a biased estimate.

Estimation proceeds by choosing a set of resampling points, creating a window or plot around the central point of the sort of size which might be used for a canopy Lidar and finding all shots falling in the window. An estimate (assuming the shots provide independent data) for the gap probability through the foliage above the point z in the canopy is obtained as:

$$\tilde{P}_{gap}(z) = 1 - \frac{\#\{\text{canopy returns} \geq z\}}{N}$$

Quantiles for this distribution have been used for 20 by 20 metre patch sizes to estimate mean height over patches of the same size. Canopy models suggest a correction for the observed bias between Lidar quantiles and observed mean height.

Given the level of noise and speckle in the data, the estimated gap probability is best modelled to provide stable results. This can be done in a number of ways—such as by the Weibull distribution where:

$$P_{gap}(z) = e^{-L(z)}$$

with $$L(z) = a\left(1 - e^{-b(1-z/H)^c}\right) \quad 0 \leq z \leq H$$
$$= \int_z^H l(z')dz'$$

In this case, the estimated H is the height, $(1-P_{gap}(0))$ is the cover and $l(z)$ provides an initial estimate of the foliage profile for the data within the moving window. Other distributions (such as the triangular distribution) may be used and it is important to use a simple parametric model due to the limited degrees of freedom in these data.

A number of such models, both parametric and non-parametric have been estimated as well as the statistical estimation of parameters In this type of modelling. One of the models used was the Weibull and it was found to retrieve the canopy height distribution very well. Such approaches are practised in areas where altimeter data are taken for DTM mapping. However, if vegetation information is the prime objective of the survey it is likely that this level of processing—like the density of data—will come with too high a cost.

There are various ways to regularise such estimations (such as by choice of variable transformations) which are not discussed. Cost effective and operational regional canopy mapping is achieved with a preferred aspect of the invention by many variable spot sizes, obtaining calibrated data and digitising the complete returns.

1.4 Multi-View Models for the Ground Based ECHIDNA™ Lidar 1.4.1 Multi-Angle Effects and Models for an ECHIDNA™

If the Lidar is ground based it is possible to sound the canopy using both multi-angles and varying beam size and shape. Multi-angle laser systems have been used to measure total canopy gap (like a hemispherical photograph) but the ECHIDNA™ instrument being considered here is assumed to digitise the full return pulse, scan flexibly in the hemisphere and in "almucantar" scans and (significantly) to sound with variable beam width and shape. Obviously the ability of such an "ECHIDNA™" system to characterise the canopy angle distribution separately from foliage profile is very high and much greater than an airborne system. For this reason, the development of both an ECHIDNA™ and an airborne Lidar system provides tools for detailed local characterisation as well as regional extrapolation.

Even for a random canopy of foliage elements the foliage profile obtained from an airborne system is not the preferred foliage profile but rather a projective foliage profile which depends on the foliage angle distribution and the pointing direction of the Lidar beam.

For a leaf canopy, this can be modelled as follows. If $\bar{a}_L$ is the mean one sided area of a leaf:

$$LAI(z) = \int_0^z \lambda(z')\bar{a}_L(z')dz'$$
$$= \int_0^z F(z')dz'$$
$$L(z) = \int_0^z \lambda(z')\bar{a}(z', \mu_v)dz'$$
$$= \int_0^z l(z')dz'$$
$$= \int_0^z G(z', \mu_v)F(z')/\mu_v dz'$$

Hence, $LAI(z)$ could be inferred from the ground, air or space by knowing $G(z, \mu_v)$ since:

$$LAI(z) = \int_0^z \mu_v l(z')/G(z', \mu_v)dz'$$

The resolution of the uncertainty must be through the use of other knowledge or the use of multiple angles for Lidar sounding that provides ways to measure $G(z, \mu)$. The use of multi-angle Lidar sounding is the basis for the ECHIDNA™ and provides a very powerful extension of the methods used in the analysis of hemispherical photography enabling such information to be derived.

As discussed before, the probability of a gap from the ground to height z (vertically above the ground) in the direction $\mu_v$ for this random case is simply given as:

$$P_{gap}(z, \mu_v) = e^{-\int_h^z G(z', \mu_v)\lambda(z')\bar{a}_L dz'/\mu_v}$$
$$= e^{-\int_h^z G(z', \mu_v)F(z')dz'/\mu_v}$$

where:
   $G(z, \mu_v)$ is the mean cross-sectional area (or Ross Function) and
   $\mu_v$ is used here as the cosine of the zenith angle The ECHIDNA™, with proper choice of beam width, knowledge of the foliage reflectances and a scanning strategy can provide samples for the function $P_{gap}(z, \mu_v)$ for a range of look angles and over a set of ranges. Taking logarithms:

$$-\mu_v \text{Log}(P_{gap}(z, \mu_v)) = h(z, \mu_v)$$
$$= \int_0^z G(z', \mu_v)F(z')dz'$$

Then:

$$\frac{\partial h(z, \mu_v)}{\partial z} = G(z, \mu_v)F(z)$$

which, for sufficient look angles $\mu_v$ normalising conditions on G, and regularisation allows the estimation of G and F for each level.

$$-\mu_v \text{Log}(P_{gap}(z, \mu_v)) = h(z, \mu_v)$$

$$= \int_0^z G(z', \mu_v) F(z') dz'$$

As described previously, for a canopy of randomly distributed foliage elements, the relationship between the Ross G-function and the foliage angle distribution at any level in the canopy is:

$$G(\mu_v) = \int_0^1 K(\mu_v, \mu) g(\mu) d\mu$$

where:
$g(\mu)$ is the foliage angle distribution function assuming azimuthal independence and symmetry and $K(\mu_v, \mu)$ is a Kernel function which can be mathematically defined.

Methods are available to solve this rather ill-posed equation. With effective regularisation, the (apparent) vertical canopy profile and foliage angles can be derived from ECHIDNA™ data for one site or the composition of data from a number of sites.

An Almucantar scan near an elevation angle of 32.5° (or zenith angle of 57.5°, or Tan $\theta_v = \pi/2$) allows F(z) to be derived virtually independently of the angle distributions. A more empirical estimate is an elevation of 31.25° (or zenith of 58.75°). It is also possible to design the hemisphere scan for the ECHIDNA™ to include this Almucantar and a spiral sampling to maximally invert the angle distribution as a function of height in the canopy.

A particularly important property derivable from the combination of foliage profile and angle profile is the point (and its existence) where the canopy moves from foliage to vertical stem and trunk. This provides an estimate for the mean crown length ratio at a site.

1.4.2 Horizontal Scans for the ECHIDNA™

In its horizontal scanning mode, an ECHIDNA™ can derive more of the traditional forestry data.

1. Tree Density

If the ECHIDNA™ scans horizontally and records trees (using variable beam widths and software recognition) then the cumulative plot of number of trees against distance will provide both density and a check on the validity of the assumed random distribution of trees. These data improve with number of plots.

Strictly, if the number of trees that can be sounded within a distance r of a random point are counted and (for better results) aggregated over a number of sites in a stand then, using Steiner's Theorem, the data provide unbiased estimates of:

$$n(r) = \lambda \bar{A} + \lambda \bar{U} r + \lambda \pi r^2$$

where:
$\lambda$ is the tree density
$\lambda \bar{A}$ is the Basal Area; and
$\bar{U}$ is the mean circumference of the trees.

For trees with disk-like cross sections we could write:

$$\lambda \bar{A} = BA = \lambda \frac{\pi}{4} \overline{DBH^2}$$

$$\bar{U} = \pi \overline{DBH}$$

and the difference between the mean DBH and mean square DBH provides an estimate of the variance of the tree DBH and hence the size distribution.

Plotting the data as a function of r should (if the underlying distribution is close to Poisson) result in a quadratic relationship and estimates for the coefficients (to obtain basal area, density and DBH) could be obtained by regression.

Despite the promise in this approach, it is not likely to be very stable by itself. For small values of r the sampling variance will be high and it is better to use this in the asymptote for larger values of r to get a stand estimate for the tree density than to use it for basal area and DBH. However, using it in combination with the data described below provides a distinct opportunity to obtain the main forest parameters of density, size, size distribution and basal area.

2. Attenuation

Using a broader beam width and the same principles as for canopy sounding from either the air or within the canopy, the gap probability can be derived. If there are no obvious boundaries, this may be averaged over all directions. It can be shown for a forest with well defined trunks and little understorey at the height being scanned:

$$P_{gap}(z) = e^{-\lambda \bar{U}_z}$$

$$= e^{-\lambda \pi \overline{DBH}_z}$$

Hence, knowing density from the previous data provides mean DBH and knowing $\lambda \bar{U}$ helps to make the estimation of BA from 1. above more stable as well.

3. Basal Area

Using similar principles to the Relaskop (Steiner's Theorem and the Boolean Model, see Appendix 3), if a scan with a very precisely defined angular wedge with angle ω correctly identifies the "in" trees ($N_\omega$) trees for which the trunk fills the wedge) then the number of "in" trees provides the basal area where:

$$BA = BAF_\omega N_\omega$$

$$= \lambda \bar{A}_c$$

$$= \lambda \frac{\pi}{4} \overline{DBH^2}$$

In principle, the difference between mean DBH obtained previously and mean square DBH obtained here can provide an estimate of variance of DBH.

As with the Relaskop, the assumption of Poisson distribution of trees can be tested and (d accepted) allows direct inference of timber volume. The assumption of a lognormal distribution for the DBH means it can be fully characterised by these methods. This allows estimation of timber volumes and densities for trees above a given DBH. However, unlike a Relaskop, the provision of ranges to "in" trees and the use of these data as a function of a "sieve" of Lidar pulses of differing size and shape (ω) has opened up the information on both density distribution and size distribution from the same data set.

Use of these three types of measurement is likely to provide better data than any one. Note that, in particular, if the mean and variance of Log(DBH) and density are solved for simultaneously at the same time as density for these three measurement sets both for each plot and for pooled plots in areas assumed to be the same stand then very stable estimates should ensue.

1.4.3 ECHIDNA™ as a "Calibration" for VSIS or other Lidar Systems

As mentioned previously there are underlying "blind spots" in systems that range but have limited view angles or sounding strategies. These were summarised as:

The trade-off between scatterer density and reflectivity;
The effects of foliage angle distribution;
The effects of clumping of foliage.

The sections above provide evidence that forest layering, clumping, foliage angle distributions and even reflectivities are all accessible and resolvable by an ECHIDNA™ at a fixed site but become less resolvable with airborne and spaceborne Lidars (including terrain and canopy Lidars) or with sensors such as VisNIR and hyperspectral sensors.

Foresters often use the strong correlations that exist in local and specific areas of forests to estimate (for example) timber volume from spatially distributed measurements of (say) basal area. In the same way, it is proposed that information obtained by the ECHIDNA™ provides the means to unravel the blind spots of (say) an airborne Lidar survey by assuming general age classes, types and factors such as Ross G-functions for the crowns are consistent by varying throughout the specific region.

Specifically, the steps would follow in a similar way to:
1. Use staged and stratified sampling methods to select number and placement of measurement plots;
2. Infer stem, canopy and foliage properties by layer at measurement plots using ground based Lidar and algorithms described here;
3. Infer profile information accessible from the airborne or spaceborne systems by modelling with the models described here;
4. Establish form and strength of allometric relations between ground information (eg volume or biomass) and profile information (eg profile statistics, cover and height);
5. Apply to airborne or spaceborne data in areas of similar profile "type" to sites of the measurement plots.

This combination provides scaling and a high level of measurement capability to the advantages of airborne and spaceborne platforms. Without such "calibration" these systems are much more limited in their interpretations and assessments. The same effect will apply to more traditional remote sensing—such a Landsat, Spot or hyperspectral data. Knowing the structure and the underlying structural parameters can lead to better interpretation. The reason for this is that they all sense the light climate as an indication of the structure and condition of the canopy. But it is only when structure is known that condition becomes easily interpreted.

In forestry applications, the gain can be as great. The correlations between stem and canopy measurements are already used to simplify survey and timber resource assessment. This approach provides a new tool and potentially many more options for such resource estimation.

The integrated use of the ECHIDNA™ with airborne systems like VSIS (or other airborne systems) and even with spaceborne systems is one important aspect of the present invention, along with its use as a stand-alone tool for detailed forest measurement.

1.4.4 Sounding Individual Trees

Often, statistical information is desired on an individual measure tree. Lidar rangefinders have been operationally used for such data for some years. However, there is new information from the use of variable beam width and shape systems like ECHIDNA™ to scan single trees and obtain statistics on the vertical and horizontal sizes, stem densities, trunk/crown relationships and other single tree information.

The models of Appendix 2 may be used to derive crown factor from vertical data or extended to include angular variation for more detailed statistics and the hierarchical nature of the within-crown variation may be used to design effective beam sizes to obtain spread time traces allowing this information to be derived from one or more soundings of a tree.

1.5 Conclusions

The generation of a structure diagram for areas of vegetation and the generation of gap frequency functions for landscapes is feasible as long as the angular effects and spatial variation can be taken into account. The invention thus relates in some aspects to a multi-angle ground based instrument (the ECHIDNA™) and its combination with an airborne instrument with the characteristics described for VSIS which uses calibrations obtained by the ECHIDNA™ to map large areas to achieve canopy and biomass mapping.

The practical development of these instruments maximises SNR and takes careful account of pulse width and lidar footprint in the design of the systems. The signal processing establishes how feasible it is to deconvolve the signal and separate the ground return from the foliage returns. The ground return contains very significant information on micro-relief expressed in the broadening of the Lidar pulse. However, this makes it harder to recognise and separate the ground return. Slope effects add to this processing complexity.

Nevertheless, a system based on these principles and including both a ground based multi-angle and airborne scanning system will have a significant role in regional vegetation mapping. A research-based system would also offer the potential to develop polarisation, multi-frequency and advanced processing techniques (such as a greater range of image spatial variation and gap analyses) within its base framework of canopy structure maps.

2. Demonstration of Airborne Canopy Lidar Description of Vegetation

What follows is a demonstration of how raw lidar data can be processed to describe vegetation canopies. This demonstration is based on raw data from a NASA experimental instrument (SLICER) as interpreted by the algorithms described above. While it does not have all the characteristics listed in the general specification of the assumed VSIS system, SLICER is able to illustrate the basic algorithms. The SLICER instrument was flown over several sites between 1994 and 1997. The data used here are from flights over the BOREAS study area in Canada during 1997.

2.1 Extracting the Vegetation Signal

The raw data returned by the Lidar is the relative intensity of light reflected as a function of time after the outgoing pulse. By translating time into range, the relative height at which the reflections occurred is derived. Once the ground pulse has been identified, the reflected waveform can be interpreted in terms of height above ground. This is shown in FIG. 2.1. The background noise level has been estimated and subtracted from the data shown. The narrow pulse centred on zero is the reflection from the ground. The asymmetry of this pulse is due to the shape of the outgoing laser pulse. This was designed to have a rapid rise time and asymptotic decay and can be modelled as a Rayleigh distribution as described above.

The ground return pulse must be removed in order for the vegetation return to be studied. This can be done by fitting a pulse of the expected shape and subtracting this from the waveform. FIG. 2.2 shows the same waveform with an asymmetric Gaussian subtracted to remove the ground return pulse.

FIG. 2.3 shows the reflected light over a single spot of about 8 m in diameter. The first return above noise level tells us the highest point in the canopy within this circular area (about 13 m above ground). The shape of this waveform suggests a concentration of foliage (needles and branches) around 10 m and an understorey of 2–3 m in height. This is a plausible result for a coniferous forest.

The spot size of the SLICER instrument is similar to the crown size of the trees, so considerable variation in the shape of returns from shot to shot can be expected. If trees are clumped i.e. there are groups of trees and gaps between the groups, there will be some areas where the only reflection comes from small plants (such as grasses) and the ground. Also, it is to be expected that the return profile would be quite different for broad leafed canopies (such as eucalypts) which have both different shaped leaves and canopies.

2.2 Interpreting the Lidar Profile

For each Lidar shot, the fractional cover (the fraction of the vertical view that is occluded by foliage) over the area of that spot is derived. This is calculated as the cumulative sum of returns to each height, divided by the total reflection from foliage and ground. The ground return must be scaled by the relative reflectances of the ground and vegetation. Fractional cover is plotted in FIG. 2.3 against height in the canopy.

This plot shows a fractional cover of 0.82 over the spot sampled by this Lidar shot. Looking up from the ground, only 18% of the sky would be visible in vertical view. The shape of this plot tells something about the shape of the trees. About 60% of the cover lies below 10 m, so the top part of the trees must be sparse as cone-shaped coniferous trees are. Also, there is very little contribution to the cover below 2 m, so the understorey is also sparse.

Fractional cover leads to gap probability. This is simply 1.0-tractional cover and so represents the fraction of sky visible when looking up through the canopy from different heights. Gap probability is plotted in FIG. 2.4 and shown as the L-R rising line, with the L-R declining line being fractional cover as shown in FIG. 2.3.

Gap probability ($P_{gap}$) at different heights through the canopy leads to the apparent foliage profile, or foliage area per unit area at each height through the canopy. This is the vertically projected foliage profile which in the random model differs from the actual foliage profile by the angle projection function and in the general case differs further in the presence of clumping.

The actual foliage profile depends on the distribution of the foliage elements (leaves, branches etc) in space. The calculations have therefore assumed a random foliage distribution, which is an acceptable but not accurate description of the distribution of foliage elements in real trees. The resulting apparent foliage profile ($FP_{app}$) is shown in FIG. 2.5.

2.3 Horizontal Extension of the Vertical Description

The above analysis shows the main steps in processing Lidar data from a single shot. The small spot size of the SLICER instrument relative to tree size results in significant shot to shot variation. To understand the whole area sampled, it is useful to summarise the results as a series of histograms and scatter plots. Examples from three contrasting sites will now be illustrated.

The first, a young Jack Pine site is an immature plantation. The second, an old Jack Pine plantation consists of mature trees, but with little understorey, while the third, an old Aspen has a tall canopy and an understorey.

The contrast between these sites is very clear in the histograms of canopy height illustrated in FIG. 2.6. The majority of the young Jack Pine site has canopy heights of 3–8 m with a minor population of taller trees. The histogram for the old Jack Pine site reveals two distributions. The dominant one is centred around 12–14 m and there is another minor peak at 2–4 m. This indicates the proportion of clearings with regrowth or low understorey plants, the minor peak, relative to the taller forest canopy. The old Aspen site has one population of tall trees.

The distribution of fractional cover sampled (see FIG. 2.7) is also bi-modal for both Jack Pine sites, showing a significant proportion of spots with fractional cover less than 0.1 (10%). The old Aspen site has very few areas of low cover with most lidar spots recording cover greater than 0.7 (70%). Areas of low cover in the older sites may be cleared areas or gaps within the canopy, perhaps associated with treefalls. This issue can be quantified by using a Lidar with a variable spot size. It must be recognised that the area of the Lidar pulse/shot determines the accuracy and spatial coherence of all subsequently derived variables and a spot size is chosen appropriate for the purpose for which data are being collected.

A common way to display canopy structure data is a structure diagram, which is a plot of canopy height against cover as seen in FIG. 2.8. Again, two populations are seen in the Jack Pine sites and one main population with some scatter for the Aspen site. The variation within the canopy population could indicate local growing conditions or the disturbance history.

The main (young) population in the Young Jack Pine site is found to lie in a linear formation in the structure diagram of growing trees where cover is proportional to height. This may suggests a range of site quality or emerging age class is present at the site. In this young population, a stand height curve is an effective forestry tool enabling height to be predicted from basal area or DBH. In this plot, a distinct, taller population is also present which is likely to be a section of older growth Jack Pine adjacent to the area of young trees.

The Old Jack Pine site has a range of covers and heights as well as some cleared and regrowing areas that match the linear structure of the Young Jack Pine. The central area may be a third stratum in this area. The Old Aspen is a mature stand with apparently few large gaps allowing regeneration. However, this is speculation and the main feature of these plots is the powerful stratification it provides of forest types.

The spatial data provided by the scanner also allows these data to be presented and visualised in a variety of ways. For example, the transects corresponding to the previous structure diagrams can be presented in FIG. 2.9 which displays ground topography (lower mesh) shaded according to projective foliage cover with tree height shown by the overlaid upper mesh. The image of the old Jack Pine site was generated from a single transact, while data from several intersecting transects have been combined and interpolated to generate the other two images.

These images help to resolve some issues of spatial distribution. The canopy height surface at the young Jack Pine site reveals that the population of taller trees is a distinct stand adjoining the younger plantation. The old Jack Pine site shows an area of low cover and low canopy height at one end of the transect while the canopy height at the old Aspen site is more uniform over the whole sample area.

2.4 Variance and Spot Size

As discussed previously the variance in measured or derived parameters is a function of plot (or in the case of Lidar, spot) size. This has been investigated with the SLICER data by first sampling the shots with views closest to vertical and then aggregating these by averaging over nine spots in a 3×3 configuration. The structure diagrams of FIG. 2.10 show the aggregated data corresponding to a sample size of approximately 30 m square.

The Jack Pine sites still show two separate populations, demonstrating that the minor population is distributed in coherent areas of at least 30 m² within the sites (as shown above in the 3-dimensional images). The low cover spots from the old Aspen site are not present in the aggregated data, so they may be gaps, possibly due to isolated tree falls.

The way that the variance of cover changes with the spot size can be modelled in known manner as described in Jupp et al. (1988) and with the assumption that the cover within a spot varies as a Beta distribution with the mean and variance computed using the disk models of the reference. For the old Jack Pine site, it may be shown that if the spot size were 25 metres then the spots would be allocated to the M3 Carnahan code in most cases. It is likely that Australian forests will be even more variable due to larger crown sizes and crown openness. The derivation of the crown sizes or leaf clumping from the second order statistics used as a function of range (and not just in terms of the total cover as discussed above) can thus proceed.

FIG. 2.11 shows the relationship between the actual and modelled distributions of cover for the old Jack Pine site for an assumed crown size of 3 m. The plot estimating the effect of a 25 m spot size illustrates that most of the site is M3.

2.5 Conclusion

The results presented here demonstrate some of the possibilities of Lidar to measure forest characteristics. The capacity to sample foliage elements vertically through the canopy, is demonstrated as a significant Improvement on most other remote sensing technologies. The Lidar measurements have also been used to produce broad scale statistics of the forest and the importance of spot size and variation in the mean values of cover and height in characterising the forest has been demonstrated.

3. Canopy Lidar Simulations of Some Australian Open Forests 3.1 Murray Darling Basin Transect A Transect of data has been described which traverses the Murray Darling Basin. The sites of the transect were measured in the field using the Walker/Hopkins Type and Stratum method and Foliage Profiles ($FP_{act}$) were constructed based on these data. In addition, independent Site estimates of LAI were made by a different method (the module counting method). Among these sites were a diverse range of covers and layered structures that are typical of open forests but certainly much richer than the broad classifications of the Carnahan categories suggest. Four of these were chosen to illustrate the simulation studies that have been made to ensure that hardware selected for VSIS and ECHIDNA™ can map Australian forests.

TABLE 3.1

| Site | Height (m) | Width (m) | Depth (m) | Shape | CC % | Crown Factor | Stratum | Carnahan Class/FAI |
|---|---|---|---|---|---|---|---|---|
| 3. Goonoo SF West | 19.70 | 6.89 | 6.56 | O | 23.9 | 55.0 | U | eM3Z 1.05 |
|  | 15.75 | 4.56 | 5.40 | O | 13.2 | 55.0 | M |  |
|  | 7.10 | 1.30 | 2.89 | O | 1.30 | 50.0 | M |  |
|  | 1.50 | 1.00 | 1.00 | O | 3.00 | 50.0 | L |  |
| 5. Warung SF East | 29.25 | 13.62 | 14.25 | O | 58.0 | 55.0 | U | eM2G 1.55 |
|  | 19.50 | 6.75 | 7.50 | O | 8.70 | 55.0 | M |  |
|  | 8.00 | 2.00 | 2.00 | O | 7.00 | 50.0 | M |  |
|  | 3.50 | 1.50 | 1.50 | O | 12.0 | 40.0 | M |  |
|  | 0.50 | 0.00 | 0.00 | G | 50.0 | 0.00 | L |  |
| 12. Siding Springs OB | 30.60 | 6.85 | 6.50 | O | 42.9 | 55.0 | U | eM3Z 1.03 |
|  | 25.00 | 5.00 | 6.50 | O | 6.1 | 55.0 | M |  |
|  | 14.80 | 2.60 | 4.40 | O | 7.0 | 50.0 | M |  |
|  | 1.00 | 0.80 | 0.80 | O | 3.0 | 40.0 | M |  |
|  | 0.30 | 0.00 | 0.00 | G | 1.0 | 0.0 | L |  |
| 19. Canbelego West | 25.00 | 13.00 | 10.00 | O | 50.0 | 40.0 | U | eM1wpL 3.62 |
|  | 12.00 | 4.00 | 8.00 | A | 55.0 | 60.0 | M |  |
|  | 2.00 | 1.00 | 1.00 | O | 30.0 | 45.0 | L |  |

Table 3.1 lists the previously derived canopy data that is based on the Walker/Hopkins description for four of the sites. It also lists the Carnahan code for the site obtained from the general map of Australia provided by Auslig.

3.2 Foliage Profiles

At the time it was written, the Foliage Profile program did not provide total FAI for sites so that they were recomputed for the purposes of this invention using the field-observed CF to estimate foliage density as described in Appendix 3.

The information obtained from the sites is illustrated in the actual foliage profiles (FIG. 3.1) and selected photographs of the sites in the following pages. The total FAI accumulated over the profile is listed in Table 1.

From the foliage profiles and photographs the most obvious features of the sites are:

1. Goonoo State Forest West is a site with a main Eucalyptus layer of trees and not much in the lower part of the canopy.
2. Warung State Forest East has a generally sparse but tall and large crown size upper layer over a dense near-ground shrub layer and a high density of grass on the forest floor.

3. Sidings Springs Obs has a tall upper story of Eucalypts over a less developed understorey.
4. Canbelego West has a sparse upper Eucalyptus canopy over a very dense understorey of callitrus (conifers).

3.3 Apparent Reflectances & Inversion Error

The FAI and $FP_{act}$ information can be used to provide initial tests of the design criteria for the canopy Lidar. First, using the models described here the simulated Lidar returns from each of these sites can be computed as apparent reflectances. The process may be "inverted" as well to give apparent foliage profile from the simulated Lidar data. The apparent reflectances are shown in FIG. 3.2.

For a given instrument SNR model, the SNR as a function of height can be computed from the apparent reflectance as can the expected error in the inversion to the apparent canopy profile. The models may thus be used to investigate how well understorey layers of selected canopies can be inverted from the data. For example, the following plot of SNR as a function of apparent reflectance is taken for an approximation to the SLICER instrument. The SNR was modelled (see FIG. 3.3) for convenience as:

$$SNR = 5471 \times \rho_{app}^{0.865}$$

If the plots of apparent reflectance and this SNR model are combined it is possible to estimate the error at each level and plot the 2 SD variation of the inverted apparent foliage profile as described and derived previously. This is shown in FIG. 3.4.

Clearly, the 2SD level of variation in the inverted apparent foliage profiles is not able to accurately retrieve the understorey biomass in these cases. This means an actual VSIS will need a much higher power or seek other methods to increase SNR. The design criterion for VSIS has been set at 1000:1 at a 0.1 apparent reflectance and 3000 metres flying height. The example was obviously not at this level.

In accordance with this invention it is possible to model and simulate Lidar returns for any Australian forest type where such data are available. Spot size and pulse width can also be varied and variance from spot to spot computed. The last is used in operations to assess whether a region is homogeneous structurally.

DESCRIPTION OF SYSTEMS AND EQUIPMENT

4. Lidar System Measurement Model and Analysis 4.1 Introduction

A realised Vegetation Structure Imaging System (VSIS) which is suitably configured for vegetation canopy analysis consists of a laser transmitter (laser oscillator/amplifier, collimating optics and beam steering optics), laser receiver (collecting optics, detector and signal conditioning circuits), data acquisition system and ancillary instrumentation to support operation as an airborne laser altimeter and surface lidar for mapping the structure of vegetation.

Both VSIS and ECHIDNA™, record the strength of the laser reflection at different times from a multitude of surfaces and will estimate the structure of those surfaces from the return signal. This is fundamentally different to the terrain lidar problem of detecting the peak of a pulse in noise.

The performance criteria for conventional (pulsed) laser ranging systems are generally associated with the maximum range that can be measured and the minimum number of false range measurements which will occur for operation under a specified set of conditions. The performance criteria for vegetation mapping lidar are more complex. The vegetation mapping lidar measures and records the strength of the collected laser energy as well as the time of flight of the laser energy for an extended period. The strength of the signal generated by the collected energy provides a measure of the structure of the vegetation and the time of flight provides an estimate of the range to the surface from which the energy was reflected.

Since the reflected energy collected by the VSIS receiver is distributed over an extended period of time, typically of the order of 500 nanoseconds to 800 nanoseconds, the ratio of the signal to noise and its variation over this period must be determined as part of the system design.

4.2 The LIDAR Apparatus Measurement Equation

The analysis of the performance of a laser ranging system presented here is based on the laser radar range equation. The range equation expresses the fraction of the transmitted energy returned to the receiver photodetector as a function of a number of system parameters and environmental influences. The fraction of the transmitted energy returned depends on the divergence of the transmitted beam, the attenuation of the propagation medium, the effective cross section of the target, the efficiency of the optical system and the receiver collection area.

The general equation for the received power at the photodetector is:

$$\Phi_R = \Phi_T \cdot \tau_t \cdot \tau_a(R, Rv, \lambda) \cdot \frac{K}{\frac{\pi \cdot \theta_t^2}{4} \cdot R^2} \cdot \frac{\Gamma}{4 \cdot \pi \cdot R^2} \cdot \tau_a(R, Rv, \lambda) \cdot A_c \cdot \tau_r + \Phi_B$$

where:

$\Phi_T$ is the energy output at the laser oscillator exit aperture $\tau_t$ optical transmission of the laser output optics—beam collimator etc $\tau_a(R,Rv,\lambda)$ is the atmospheric transmission through a distance R at wavelength $\lambda$ for visibility of Rv (in kilometres)

K is the laser beam profile function $\theta_t$ is the beam width of the transmitter beam R is the distance from the laser transmitter (and receiver) to the reflecting object $\Gamma$ is the optical cross section of the reflecting object $A_c$ is the area of the collecting aperture of the receiver optics.

$\tau_r$ optical transmission of the laser receiver optics $\Phi_B$ is the background radiation field that contributes to the measured signal.

When the reflecting object completely fills the transmitter beam the model can be simplified by further assuming that the reflecting object is a single Lambertian reflector at range R with an effective hemispherical reflectivity $\rho$ we obtain:

$$\Phi_R = \Phi_T \cdot \tau_t \cdot \tau_a(R, Rv, \lambda)^2 \cdot \frac{\rho}{\pi} \cdot \frac{A_c}{R^2} \cdot \tau_r + \Phi_B$$

Collecting terms, this equation can be simplified as:

$$\Phi_R = \Phi_T \frac{C}{R^2} \tau_a^2 \rho + \Phi_B$$

In the more general case, if we define the "Apparent Reflectance" at range R as the ratio of background corrected measured power observed at range R to that a lambertian standard target at range R would provide ($\Phi_S$) times the standard target reflectance ($\rho_S$) we get:

$$\rho_{app} = \rho_S \frac{\Phi_R - \Phi_B}{\Phi_S - \Phi_B}$$

$$= \frac{\Phi_R - \Phi_B}{\Phi_T C \tau_a^2} R^2$$

Since this quantity is realisable from the data (with some ancillary model for the atmosphere) as well as modelled it can be used as a basis for calibration, data normalisation and system modelling.

In particular, a trace over a vegetated land surface can be modelled in terms of apparent reflectance. Over a fully recorded Lidar trace, the apparent reflectance from the atmosphere will be small (due only to backscatter), in the canopy it will vary, eventually reducing as the signal attenuates and there may be a large apparent reflectance at the range corresponding to the ground surface.

By working in terms of apparent reflectance, the canopy modelling and simulation described above can be used for system design by specifying the degree to which an apparent reflectance at depth in a canopy can be discriminated against system and environmental noise. The range is conveniently chosen as the range to the surface. The sources of the noise are described in the following sections.

4.3 System Operational Characteristics 4.3.1 Pulse Shape

The laser power output is a function of time. The pulse shape of a laser is often assumed to be Gaussian, however a Gaussian pulse is not a realistic model for the temporal profile of a laser pulse since it is not physically realisable. The Rayleigh pulse shape is a sharp leading edge rising to the peak followed by a slower (asymptotic) decrease in energy after the peak. For many lasers, a Rayleigh distribution may be a sufficiently accurate model of the pulse shape. It has been used as the model for the SLICER laser.

For a given temporal pulse length specified as the full width half maximum (FWHM) of the pulse length, the effective bandwidth of a Rayleigh pulse is greater than that of a Gaussian pulse due to the sharper leading edge of the Rayleigh pulse for a given FWHM pulse length. The effect of restricted bandwidth in the processing electronics will be to introduce range measurement errors, particularly if the specification of the bandwidth requirements is based on the assumption of a Gaussian pulse shape in the time domain.

4.3.2 Laser Repetition Rate And Power Requirements

Laser oscillators are relatively 'inefficient' and control of thermal effects in the laser oscillator is typically one of the major design challenges for laser engineers when working with high power lasers. Many laser designs are therefore optimised for a single repetition rate with a fixed or at least relatively stable pulse energy. Some commercial systems offer 'variable' repetition rates however in some cases the variation is achieved by operating the laser oscillator at a fixed rate and dumping the unwanted laser pulses.

4.3.3 Operating Wavelength

Some gain in performance may be made by selecting a laser wavelength with optimum atmospheric transmission or with vegetation 'reflection' characteristics which improve system performance. However, the generation of a specific operating wavelength may impose severe design constraints on the system. Generation of a wavelength shifted slightly from the normal operating wavelength of a laser is normally achieved using nonlinear optical shifting. Tuning a wavelength off its fundamental operating wavelength, if it can be achieved, may lead to unstable operation which can only be overcome by expensive design modifications. However if an oscillator/OPO configuration is used to generate a wavelength substantially shifted from the laser oscillator (eg 1.54 µm generated from 1.064 µm) the cost of shifting the operating wavelength over a small range may be relatively small since the major cost has been already absorbed in building the oscillator/OPO system. Eye safety is a major design factor which affects the choice of wavelength. The 1540 nm wavelength is most likely to achieve an eye safe ECHIDNA™. The VSIS can operate at either wavelength from this perspective.

4.3.4 Spatial Non-Uniformity

The energy in the laser pulse is distributed non-uniformly across the spatial extent of the transmitter beam width. The beam divergence, beam diameter and energy distribution are governed by the transverse oscillation modes of the laser. The distribution of energy in the laser beam which is usually the design target is the lowest order mode, the $TEM_{i00}$ mode, which has a Gaussian intensity distribution with its maximum on the beam axis.

The existence of spatial non-uniformity in the distribution of the energy in the laser transmitter output means that analysis of the return signal to determine the vertical structure of the vegetation from which the laser energy was reflected will incorporate algorithms to allow for the spatial non-uniformity. This requires that the distribution of energy be stable and known.

An alternative approach would be to design a transmitter with a uniform output beam distribution. This has been achieved for low power lasers using holographic lenses. The peak energy density for the VSIS laser will result in optical power density in the oscillator cavity of the order of 200 MW cm$^{-2}$ to 500 MW cm$^{-2}$ with output power density being an order of magnitude less than this.

4.4 Signal to Noise Ratio (SNR) Modelling 4.4.1 Atmospheric Transmission

The transmission of radiation through the atmosphere results in a loss of signal strength due to absorption and scattering. These effects are incorporated explicitly in the ranging equation. Estimation of the effects of atmospheric transmission on system signal to noise ratio requires a model for atmospheric transmission which can be readily incorporated in the ranging equation.

Laser emission is narrow band radiation therefore the use of a broadband transmission model is not applicable. The computer program HITRAN provides accurate estimates of transmission at high spectral resolution and can be used for a variety of path lengths and atmospheric conditions. absorption lines. As illustrated in Appendix 4, these are more prevalent near to the 1540 nm system than the 1064 nm system. For the purposes of this SNR analysis, the above general values have been used.

4.4.2 Sources of Noise

The ability to detect and process the laser energy reflected from an object is ultimately limited by noise. The performance of laser ranging systems which utilise the measurement of the time of flight from the transmitter to the reflecting object and back to the receiver of a short pulse of laser energy has been analysed by many workers. The performance of these systems is limited by the ability to reliably detect the electrical signal generated by the reflected energy in the presence of the noise generated by the background and the laser ranging system itself.

4.4.2.1 Shot Noise

For the VSIS the noise processes associated with the detection of photons are dominated by shot noise since the transmission of laser energy is a photon process and the reflected energy is detected using a photon detector. Thermal (Johnson) noise will also limit the performance of the system however in a well designed system it will generally be of less importance than the shot noise processes inherent in the transmission and detection of electromagnetic radiation.

Given a set of events distributed with Poisson statistics at times $t_i$, with average density $\lambda$ and a real function h(t) the sum $$s(t) = \sum_i h(t - t_i)$$

is a strict sense stationary process and is commonly known as shot noise. This is the output of a linear system with impulse response h(t) and input the sequence of Poisson impulses $$z(t) = \sum_i \delta(t - t_i)$$

The mean, $\eta_s$, and variance, $\sigma_s^2$, of the shot noise process s(t) are $$\eta_s = \lambda \cdot \int_{-\infty}^{\infty} h(t) \cdot dt \text{ and } \sigma_s^2 = \lambda \cdot \int_{-\infty}^{\infty} h(t)^2 \cdot dt$$

The power spectral density of a shot noise process can then be determined from the process characteristics. Using Campbell's theorem, if a randomly occurring event is repeated with average rate of occurrence N and impulse response h(t) the noise power spectral density of the process is $$p(f) = 2 \cdot N \cdot \left| \int_0^{\infty} h(t) \cdot e^{j\omega t} \cdot dt \right|^2 \quad (1)$$

For photons the impulse response is simply $$\frac{h \cdot c}{\lambda} \cdot \delta(t - t_i)$$

where $t_i$ is the time of arrival of the ith photon.

Therefore, if the rate of arrival of energy at the receiver and the noise power is known, the spectral density of the electrical signal produced by the detector can be determined from the responsivity of the detector.

4.4.2.2 Signal Noise

The quantum nature of radiation results in statistical fluctuations, photon noise, in the signal generated by a detector in a laser ranging system. If the performance of the detector is such that the dominant noise sources are the signal and background radiation the system is considered to be background noise limited. The signal noise can be considered to be comprised of:

photon noise associated with laser energy reflected from the object of interest—signal photon noise, photon noise associated with energy from other sources, eg the sun, reflected from the object of interest—background photon noise, photon noise associated with energy emitted by the object of interest and speckle noise.

The spectral bandwidth of the receiver optics will be of the order of 10 nanometres and the temperature of the vegetation/ground will be of the order of 300 K. The noise power spectral density of the photon noise associated with the energy emitted by a black body at 300K in a 10 nanometre waveband is of the order of $10^{-4}$ pW Hz$^{-0.5}$ m$^{-2}$ at 1.064 µm. This is substantially less than the noise power spectral density of the sunlight reflected from the ground or vegetation and is less than the effective noise power spectral density of the detector. The noise power spectral density of the photon noise associated with the energy emitted by the vegetation or ground will be ignored.

4.4.2.2.1 Signal Photon Noise

Using Equation 1 above the signal noise can be estimated using the range equation and the detector responsivity. To simplify the interpretation the laser pulse is assumed to have uniform energy distribution in time over the 'length' of the pulse as defined by the full width half maximum length. The average signal current and signal noise component are then easily calculated.

4.4.2.2.2 Background Photon Noise

The background signal observed by the VSIS consists of reflected illumination and emission from the objects in the laser receiver field of view and from scattering of sunlight within the atmosphere. The reflected illumination arises from direct solar illumination and the albedo of the sky. The background signal includes a noise signal inherent in the quantum nature of the radiation collected. To estimate the noise signal the effective radiance of the ground (background) included in the system foot print must be determined.

An initial estimate based on the solar illumination at the top of the earth's atmosphere was used. This is approximately 25% greater than the irradiance at sea level for one atmospheric mass however since it does not include the sky albedo it provides a useful order of magnitude calculation for the solar component of the background signal.

Using the solar irradiance data at the top of the earth atmosphere and applying a correction for transmission through one atmospheric mass the apparent radiance of the ground with a reflectivity of 0.5 when viewed using a 10 nanometre spectral filter is approximately 5 W m$^{-2}$ at 1.064 µm and 2 W m$^{-2}$ at 1.54 µm. A more accurate model including sky albedo gives the apparent radiance at 1.064 µm as 6 W m$^{-2}$ and at 1.54 µm as 3 W m$^{-2}$.

The amount of background radiation collected by the receiver is a function of the apparent radiance of the ground, the foot print on the ground of the receiver field of view and the collecting area of the receiver optics.

$$\phi_{solar} = \frac{\pi \cdot (receiver\_fov \cdot height\_AGL)^2}{4} \cdot \frac{solar\_irradiance \cdot reflectivity}{\pi} \cdot \tau_a \cdot \Omega$$

where $\Omega$ is the solid angle subtended by the receiver collecting aperture at a range equal to the lidar altitude. For a beam diameter of 10 metres on the ground, a flying altitude of 3 km and a receiver field of view of twice the transmitter diameter the solar background signal, $\Phi_{solar}$, at 1.064 μm is 0.67 μW and at 1.54 μm it is 0.32 μW.

4.4.2.2.3 Speckle Noise

Speckle arises from the reflection of coherent illumination of a diffuse surface. The random distribution of scatterers in the surface results in interference at the observation plane. If the receiver aperture is smaller than the mean transverse dimension of the speckle lobes (regions of constructive interference) the apparent target cross section fluctuates rapidly. In RF radar systems the phenomenon is known as fading. For the VSIS system speckle will impose an additional noise signal on the receiver output.

4.4.2.3. System Noise

In addition to noise arising from the signal and background radiation, the ranging system is, itself, a source of noise. The primary system noise sources are:

detector noise and laser noise

For many applications detector noise is the dominant system noise mechanism. It is assumed that the laser noise is small and it will not be considered in this analysis.

4.4.2.4 Detector Noise

Two detectors have been considered for this application in order to provide a comparison between operation at 1.064 μm and 1.54 μm. Both detectors are avalanche photodiodes and are operated in the linear mode. The 1.064 μm detector is the EG&G C90355E as used in the SLICER system. This has a responsivity at 1.064 μm of 34 A/W. The 1.54 μm detector is the EG&G C30645E. This has a responsivity at 1.54 μm of 9.4 A/W.

The EG&G C90355E has a specified noise current of 1.1 pA Hz$^{-0.5}$ and the EG&G C30645E has a specified noise current of 1.1 pA Hz$^{-0.5}$.

The EG&G C90355E has a specified dark current of 100 nA with an associated noise current of 0.18 pA Hz$^{-0.5}$ and the EG&G C30645E has a specified dark current of 75 nA with an associated noise current of 0.155 pA Hz$^{-0.5}$.

In some conventional pulsed ranging systems avalanche photodiodes may be operated in the Geiger mode, however this is a nonlinear mode and is not considered here.

4.4.3 Bandwidth Effects

The total noise signal is a function of the electrical bandwidth of the detector. The electrical bandwidth is usually limited at high frequencies and low frequencies to create a band pass system. The choice of system bandwidth heavily influences system performance.

The low frequency limit is applied in order to eliminate drift due to noise sources such as 1/f noise which may be a major problem with some electronic circuits. However if the low frequency bandwidth limit is too 'high' the bandwidth limitation distorts any signal with a substantial DC component such as the signals likely to be encountered in the operation of the VSIS. The distortion caused is manifested as a decay or 'droop' in the amplitude of any extended signal such as that received from vegetation. Unless this is well controlled, the accuracy of canopy measurements for such a system will be compromised.

The highest possible bandwidth is required to minimise timing errors arising from phase delays in the signal. However, a large bandwidth will increase the noise from all sources and may compromise the overall system performance.

The possible effects of limited system bandwidth are illustrated in the following FIGs. FIG. 4.1 illustrates a Rayleigh pulse and a Gaussian pulse having the same FWHM pulse length of 10 nanoseconds.

4.4.3.1 Pulse Rise Time and High Frequency Content

The rise time (10% to 90%) of the Rayleigh pulse is 4 nanoseconds whereas the rise time of the Gaussian pulse is 5.7 nanoseconds. This has a substantial impact on the effective bandwidth of the signals. The 3 dB bandwidth of the Gaussian pulse is 31 MHz and the 3 dB bandwidth of the Rayleigh pulse is 89 MHz. The assumption of a Gaussian envelope for the laser pulse in the temporal domain will lead to a loss of accuracy in spatial measurement by the Rayleigh pulse if the signal conditioning electronics (the detector and associated circuitry) bandwidth is specified in accordance with the bandwidth of the spectrum of a Gaussian pulse.

4.4.3.2 Signal Frequency Bandwidth

System design for the VSIS includes the specification of the optimum bandwidth for the detector signal conditioning circuitry. If the signal bandwidth is restricted, the 'fidelity' of the detector output signal will be destroyed and estimates of the vegetation structure will be corrupted. The noise component of the detector output signal increases with signal bandwidth therefore if the signal bandwidth is large the optimum system signal to noise ratio may not be achieved.

The output from the VSIS laser receiver detector consists of a train of overlapping pulses of varying amplitudes. The effect of AC coupling the detector signal (restricting the low pass frequency response) and limiting the high frequency response on the signal arising from a train of pulses is shown in FIG. 4.2.

In FIG. 4.2 the effects of limited signal conditioning bandwidth have been exaggerated by restricting the signal bandwidth in order to show clearly these effects. It can be seen that the DC level of the output signal is suppressed by the low frequency cutoff of the circuit and the high frequency cutoff introduces a phase delay in the output signal. The phase delay effectively imposes a systematic timing error.

These effects can be reduced by operating the system with the maximum possible signal bandwidth. However increasing the signal bandwidth carries the penalty of reduced signal to noise ratio.

The low frequency cutoff will be determined by the signal error which can be tolerated for a given depth of vegetation penetration. For example if a 5% error can be tolerated and the vegetation depth is 30 metres the maximum low frequency cutoff is that frequency which will produce a 5% droop in a step signal for a time delay of 200 nanoseconds, that is the two way time of flight for the transmitter signal when penetrating 30 metres of vegetation. The low pass cutoff frequency required to maintain this level of 'error' is less than 1 MHz.

The high frequency cutoff will be determined by the timing error which can be tolerated. Since this is a systematic error some compensation for the effects of the limited high frequency bandwidth may be implemented. The SLICER system used a laser with a 4 nanosecond pulse length (FWHM) and a detector bandwidth of 50 MHz and LVIS a 10 ns FWHM with a 90 MHz bandwidth. The 3 dB bandwidth of the Rayleigh pulse for the SLICER pulse length is approximately 200 MHz. This is a very high bandwidth however the manufacturer's specification for the rise time of the C30955E detector is 2 nanoseconds, equivalent to a bandwidth of 175 MHz. Since the detector signal is to be sampled at rates up to 1 gigasample per second and possibly 2 gigasamples per second a bandwidth of 175 MHz for the system is feasible.

4.4.4 Signal to Noise Ratio Calculations

The signal to noise ratio is typically estimated for a continuous signal such as a harmonic signal in a communications receiver or is calculated for a single pulse as in a radar receiver. Neither of these approaches is applicable to the VSIS where the signal is expected to be a complex waveform consisting of the signal from multiple reflections of the laser pulse. The waveform is expected to have a measurable amplitude for a period of the order of 200 nanoseconds.

In order to provide a consistent basis for comparison, the signal to noise ratio is calculated using the average signal current for a single laser pulse. The signal to noise ratio will be dominated by the signal noise current, the background noise current and the detector noise current. Since these are determined to some extent by the system bandwidth the laser power requirements and system SNR have been determined for two bandwidths, 80 MHz and 175 MHz (the detector bandwidth for 2 nanosecond rise time).

4.4.4.1 Analogue to Digital Conversion

The conversion from an analogue signal to digital data imposes a noise floor on the signal. Ideally the A/D conversion noise floor is $(2 \cdot \sqrt{3})^{-1}$ of the A/D converter resolution. If the A/D converter resolution is 8 bits (typical for A/D conversion at rates of the order of 1 to 2 gigasamples per second) and the input range is one volt the ideal noise signal due to A/D conversion would be 1.1 millivolts however this is rarely achieved in practice. Typically the A/D noise floor is one to two bits, for example the Maxim MAX108 8 bit converter (1.5 gigasamples per second) is specified with a SINAD of 47 dB which gives a signal to noise ratio (SNR) of 220:1. For many A/D converters a SINAD of 42 dB to 45 dB is more common which in this case would give a noise floor of 4 millivolts to 8 millivolts.

4.4.4.2 80 MHz Bandwidth

The laser pulse energy required to achieve a signal to noise ratio of 1000:1 for a 10 metre ground foot print with an effective hemispherical reflection coefficient of 0.1 and an operating height of 3000 metres for 23 kilometre visibility is estimated to be 0.66 mJ for 1.064 µm system and 0.5 mJ for a 1.54 µm system.

For the same conditions the laser pulse energy required to achieve a signal to noise ratio of 1000:1 for a 25 metre ground foot print is estimated to be 1.5 mJ for 1.064 µm system and 0.75 mJ for a 1.54 µm system. For a 2 metre ground foot print and the same conditions the laser pulse energy required to achieve a signal to noise ratio of 1000:1 is estimated to be 0.23 mJ for 1.064 µm system and 0.4 mJ for a 1.54 µm system.

These results are summarised in the following table.

TABLE 4.1

| | Laser output energy required for 1000:1 SNR and Reflection Coefficient of 0.1 | | |
|---|---|---|---|
| Wavelength | 2 m Foot print | 10 m Foot print | 25 m Foot print |
| 1.064 µm | 0.23 mJ | 0.66 mJ | 1.5 mJ |
| 1.54 µm | 0.4 mJ | 0.5 mJ | 0.75 mJ |

These results for a reflection coefficient of 0.01 are summarised in the following table.

TABLE 4.2

| | Laser output energy required for 1000:1 SNR and Reflection Coefficient of 0.01 | | |
|---|---|---|---|
| Wavelength | 2 m Foot print | 10 m Foot print | 25 m Foot print |
| 1.064 µm | 2.3 mJ | 6.6 m | 15.2 mJ |
| 1.54 µm | 4 mJ | 4.9 mJ | 7.7 mJ |

The variation of system SNR with the reflection coefficient for ground foot prints of 2 metres, 10 metres and 25 metres (diameter) and receiver fields of view of twice the transmitter beam width are shown in FIGS. 4.3, 4.4 and 4.5 (2 metres, 10 metres and 25 metres respectively) for a laser pulse energy of 0.75 mJ (for both wavelengths) and a system electrical bandwidth of 80 MHz. The detectors used are the EG&G C90355E (1.064 µm) and the EG&G C30645E (1.54 µm).

4.4.4.3 175 MHz Bandwidth

For an electrical bandwidth of 175 MHz the laser pulse energy required to achieve a signal to noise ratio of 1000:1 for a 10 metre ground foot print with an effective hemispherical reflection coefficient of 0.1 and an operating height of 3000 metres for 23 kilometre visibility is estimated to be 1.05 mJ for 1.064 µm system and 0.95 mJ for a 1.54 µm system.

For the same conditions the laser pulse energy required to achieve a signal to noise ratio of 1000:1 for a 25 metre ground foot print is estimated to be 2.3 mJ for 1.064 µm system and 1.3 mJ for a 1.54 µm system. For a 2 metre ground foot print and the same conditions the laser pulse energy required to achieve a signal to noise ratio of 1000:1 is estimated to be 0.43 mJ for 1.064 µm system and 0.85 mJ for a 1.54 µm system.

These results are summarised in the following table.

TABLE 4.3

| | Laser output energy required for 1000:1 SNR and Reflection Coefficient of 0.1 | | |
|---|---|---|---|
| Wavelength | 2 m Foot print | 10 m Foot print | 25 m Foot print |
| 1.064 µm | 0.43 mJ | 1.05 m | 2.3 mJ |
| 1.54 µm | 0.85 mJ | 0.95 mJ | 1.3 mJ |

The variation of system SNR with the reflection coefficient for ground foot prints of 2 metres, 10 metres and 25 metres (diameter) and receiver fields of view of twice the transmitter beam width are shown in FIGS. 4.6, 4.7 and 4.8 (2 metres, 10 metres and 25 metres respectively) for a laser pulse energy of 0.75 mJ (for both wavelengths) and a system electrical bandwidth of 175 MHz. As with the previous data, the detectors used are the EG&G C90355E (1.064 µm) and the EG&G C30645E (1.54 µm).

4.4.4.4 Variation with Ground Foot Print

As would be expected, the signal to noise ratio achievable with a given laser pulse energy increases substantially as the ground foot print decreases. For a smaller ground foot print more shots are required therefore the laser must operate at a higher repetition rate. The total laser output power required increases with the repetition rate however the peak power which must be transmitted through the system optics is reduced. The relationship between SNR and ground foot print is not linear because of the noise contributed by background radiation. The background current will increase as the square of the diameter of the ground foot print whereas the background noise current will increase (to a first approximation) linearly with the diameter of the ground foot print.

4.5 Summary for VSIS/ECHIDNA™ Specifications

The diameter of the receiver optical aperture has a marked effect on system performance. A receiver optical aperture diameter of 20 centimetres has been assumed. This is the same aperture as used in the SLICER system and in the LVIS system. A larger aperture could be used. However, since the cost of fabricating the receiver telescope increases (approximately) as the cube of the aperture diameter and associated costs such as installation and alignment also increase substantially as the collecting aperture increases, the gains in system performance from a larger aperture are likely to be offset by substantially increased costs. Increasing the receiver collecting aperture diameter also has a substantial effect on the design of the scanning system.

Similar factors apply to the specification of the laser transmitter collimator and beam expander optics. For the laser transmitter the relationship between beam diameter, beam divergence, collimator and beam expander parameters is complex and some of these parameters also affect the design of the scanning system. Discussions of these factors are included in the following specifications sections of this document.

4.5.1 Laser Transmitter

The design options for the laser transmitter are quite varied. However the operating altitude and the requirement to transmit enough energy with each pulse to penetrate vegetation and map the structure of the vegetation restrict these options. The high repetition rate required constrains the laser transmitter option to a diode pumped solid state laser. Based on the experience of NASA and the LADS Corporation a diode pumped Nd:YAG laser emitting pulses at 1.064 μm or frequency shifted pulses at 0.355 μm, 0.532 μm or 1.54 μm is a feasible design choice.

The total pulse energy and pulse length (FWHM) impose critical design objectives on the system. The analysis undertaken here has been performed using an assumed FWHM pulse length of 4 nanoseconds as used in the SLICER system. A pulse length of 4 nanoseconds provides temporal resolution of approximately 0.8 nanoseconds (half the effective pulse rise time) corresponding to spatial resolution of the order of 10 centimetres.

The laser repetition rate is based on a requirement to map an area of 100 kilometres² per hour of operation. The minimum repetition rate corresponds to the maximum beam divergence and pulse energy.

The pulse energy for the laser required for operation at 1.54 μm is relatively greater than that required for operation at 1.064 μm due to the lower responsivity of the InGaAs detector used at 1.54 μm.

| System Parameters | | | |
|---|---|---|---|
| Parameter | Specification | Units | Notes |
| Repetition Rate | 7,000 | Hz | Maximum |
|  | 44 | Hz | Minimum |
| Pulse length | 4 | Nanoseconds |  |
| Beam divergence | 8.33 | Milliradians | Maximum |
|  | 0.66 | Milliradians | Minimum |

4.5.2 Receiver and Wavelength Dependent Parameters
4.5.2.1 80 MHz Receiver Bandwidth

| Parameter | Specification | Units | Notes |
|---|---|---|---|
| 1.064 μM WAVELENGTH | | | |
| Pulse energy | 1.5 | mJ | Maximum |
|  | 0.23 | mJ | Minimum |
| Laser output power | 2.3 | W | 10 KHz pulse rate |
|  | 0.066 | W | 44 Hz pulse rate |
| 1.54 μM WAVELENGTH | | | |
| Pulse energy | 0.75 | mJ | Maximum |
|  | 0.4 | mJ | Minimum |
| Laser output power | 4.0 | W | 10 KHz pulse rate |
|  | 0.033 | W | 44 Hz pulse rate |

4.5.2.2 175 MHz Receiver Bandwidth

| Parameter | Specification | Units | Notes |
|---|---|---|---|
| 1.064 μM WAVELENGTH | | | |
| Pulse energy | 2.3 | mJ | Maximum |
|  | 0.43 | mJ | Minimum |
| Laser output power | 4.3 | W | 10 KHz pulse rate |
|  | 0.1 | W | 44 Hz pulse rate |
| 1.54 μM WAVELENGTH | | | |
| Pulse energy | 1.3 | mJ | Maximum |
|  | 0.85 | mJ | Minimum |
| Laser output power | 8.5 | W | 10 KHz pulse rate |
|  | 0.0575 | W | 44 Hz pulse rate |

4.5.3 Laser Receiver

The detector parameters listed here have been extracted from manufacturers specifications for commercially available detectors. The specifications do not imply that these are the optimum specifications for all detectors since this would require more detailed analysis of all the operating parameters for each detector. For example, for avalanche photodiodes the linear gain can be varied by adjusting the reverse bias across the diode however this affects the noise current through the generation of excess noise carriers. Variations in reverse bias may affect the recovery time of the photodiode with implications for the processing applied to the detector data.

| Parameter | Specification | Units | Notes |
|---|---|---|---|
| Collecting aperture | 20 | cm | Diameter |
| Rise time | 2 | nsec |  |
| Responsivity | 35 | A W$^{-1}$ | 1.064 μm |
|  | 10 | A W$^{-1}$ | 1.54 μm |

5. System Engineering Functional Design

This Section discusses the hardware requirements for VSIS and ECHIDNA™ in two separate sub-sections. Each section deals with hardware issues in five operational areas: Laser system and driver; Optics, scanning and digitising system; Supporting hardware; Analysis and presentation; and Testing and Integration. These five modules each have the same format, first identifying the needs of the system (specifications), then testing requirements and integration with the rest of the system.

The VSIS and ECHIDNA™ have a lot of basic similarity from a component view-point and the systems of both are discussed in terms of the block diagram in FIG. 5:

VSIS differs from the (ground based) ECHIDNA™ mainly in its extra Flight Management System and Camera blocks.

5.1 VSIS System Hardware

The VSIS hardware system is a combination of the components linked as shown in the block diagram and comprised of the following components:

5.1.1 Laser System & Driver
5.1.1.1 Module Description

This module describes the laser system which will consist of the following components;

- laser,
- laser power supply,
- laser cooling,
- laser control system, and
- other items directly associated with the laser.

The laser optics and scanning mechanism are described in the Optics, Scanning and Detector System and Drivers

5.1.1.2 Specifications
5.1.1.2.1 General

The laser system is a commercially available laser meeting the derived specifications noted previously.

The laser system will have a variable beam divergence to allow a spot size on the ground of between 2 and 25 metres at a nominal flying height of 10000 feet above terrain. In a suitable aircraft the spot size could be up to 50 m.

5.1.1.2.2 Laser

The laser output requires consistent and stable pulse shape and energy from shot to shot.

The critical areas of the laser system are the
- Wavelength
- Pulse shape
- Pulse width
- Power and signal to noise
- Laser power supply,
- Laser cooling
- Laser control

5.1.1.2.3 Wavelength

Two possible frequencies are considered based on fundamentals at 1064 nm and 1540 nm. The 1064 nm wavelength is a common choice and would be suitable for the VSIS airborne system. However, the 1540 nm wavelength has some advantages for the ECHIDNA™—especially in terms of eye-safety. However, the considerations of instrument performance and laser exposure limits may well conflict.

From the performance aspect, for canopy lidars, as for terrain lidars, it is best to minimise atmospheric absorption and scattering. As previously described, provided the actual laser wavelength is selected carefully there is little atmospheric scattering or absorption. For example, the Eaglescan terrain Lidar uses a wavelength of 1053 nm rather than 1064 nm. It can be shown that this is in a very clear atmospheric window. It is also possible to have very clear atmosphere at 1540 nm but a careful analysis of atmospheric absorption is needed due to the close proximity of deep and narrow water absorption lines.

Specialist commercial software can assist in the selection of the wavelength, eg HITRAN or the Ontar LidarPC, to keep the laser signal clear of atmospheric absorption lines.

The different laser materials considered are:

| | |
|---|---|
| Nd:YAG | 1064 nm |
| Nd:YLF | 1053 nm |

5.1.1.2.4 Pulse Shape

Pulse shape issues have been discussed previously. An ideal laser pulse would be a symmetric (eg Gaussian) pulse in the time dimension to reduce the bandwidth of the signal and allow better discrimination of closely spaced targets. However, an assymetric pulse such as the Rayleigh pulse is acceptable, provided it is stable and can be monitored.

The ground foot print would ideally have as near uniform power across it as possible but a well established distribution (such as Gaussian) is acceptable provided it is stable and well characterised. The laser will operate in the $TEM_{\infty}$ mode to ensure a smooth spatial beam pattern.

5.1.1.2.5 Pulse Rate and Width

The pulse repetition depends on the scanning options. For VSIS, there are a number of possible scanning options that serve the different objectives of the surveys. For the present time the options used for LVIS (an operational lidar system developed at NASA Goddard Space Flight Center) seem reasonable settings with slightly expanded limits described later.

The main objective of the scanning system is to cover regions at either a high spatial density and small spot size or lower spatial density with larger spot size. The mapping scales range roughly between 1:5,000 and 1:50,000. However, it may be satisfactory in many cases to "sample" (and thereby leave gaps between spots) rather than form complete images.

The system described here is designed for continuous sample imaging. That is, there will be little or no overlap or gaps between spots across scans or between scanlines. To achieve this, the laser needs a pulse rate up to a maximum of 15000 pulses per second to allow maximum coverage over the ground when the spot size is at its smallest. The lidar needs to have a pulse width of somewhere between 3 and 6 ns and be stable within 3% from shot to shot. The output intensity and pulse shape will be monitored to test consistency and allow calibration to apparent reflectance.

The outgoing pulse has a shape and intensity—measured by power or energy. As described above, the pulse shape is usually modelled as a specific form such as the Gaussian or Rayleigh shapes.

For accurate measurement the pulse should be stable in shape but possibly with energy varying. That is, if the peak energy were measured the pulse should be able to be reconstructed. A narrow and symmetric pulse is best in order to discriminate different scattering centres to a high precision.

In the systems of the present invention, data "sharpening" is planned by de-convolving the pulse from the return signal. This requires about 10 measurements to the FWHM of the pulse and pulses with FWHM of 3 to 6 ns will provide high accuracy in separating scattering centres. Thus digitisers with periods of about half a ns, or 2 Gs/s, are utilised.

Many existing lidar systems such as the CSIRO Atmospheric Research (CAR) atmospheric profiling Lidar and the US experimental airborne canopy lidar (SLICER) can be described well by the Rayleigh pulse with the CAR Lidar having very high shape stability and repeatability. A calibrated fraction of the total output energy will need to be measured if the pulse is very stable. Alternatively, the complete out going pulse may have be digitised, not just the FWHM levels.

The Enerquest terrain Lidar is reported to have a stable Gaussian pulse. A Gaussian pulse with FWHM between 3 and 6 ns, digitising to 0.5 ns and accurate monitoring of pulse power is the ideal solution for both the VSIS and ECHIDNA™ systems.

It is to be noted that the laser output is polarised. If the beam is reflected off a scanning mirror, the reflected energy is strongly dependent on the angle of incidence of the beam as well as the angle between the principle plane and the polarisation angle of the laser. This may differ substantially from the energy measured at some monitor in the transmitter chain. Therefore the laser requires stable polarisation.

5.1.2 Optics, Scanning and Digitising System

5.1.2.1 Module Description

To enable large tracts of ground to be covered, a scanning system is required. The rate of scan, pulse rate etc depend on the ground foot print size and the grid size for the collected data. A maximum pulse rate for the laser system is proposed of up to 15,000 per second. This module contains all the optics, scanning mechanism and the control circuits.

The requirements are for the pulse repetition rate to allow interaction between the aircraft flying height and forward speed to cover a selected grid pattern.

The optical system allows the laser pulse to be transmitted and the laser signal to be collected at the receiving telescope such that the effective laser spot is within the FOV. The wavelength and output power of the laser dictates the coatings on the mirror surfaces etc.

The components in this module are the following:

Transmit and receive optics

VSIS beam spread (which defines the foot print on the ground)

scan angle measurement of output pulse energy laser return signal conditioners, and return signal digitisers.

5.1.2.2 Specifications

5.1.2.2.1 Transmit and Receive Optics

The laser pulse has to be transmitted through a suitable optical telescope and the laser return signal received. The design takes into account the scanning mechanism of the laser.

5.1.2.2.2 VSIS Beam Spread or Beam Divergence

The beam spread is adjusted to allow variable foot print sizes on the ground. The beam divergence is in the range of 2–8 milliradians. For each mission a foot print size is chosen. The foot print varies from 2 to 25 metres while operating at a height of 3300 metres (10,000 feet) above terrain.

The measurement of scaling effects in mapping vegetation at various levels and for different purposes is improved by having a Lidar beam that has been spread to various degrees from a normal laser beam. Ideally, options are such that a 3 m spot size can be measured at 3000 m flying height (1 mr) and a spot size of 10 m can be realised at 1000 m (10 mr).

The Lidar spot size for the VSIS is a function of flying height and beam divergence. However, a significant issue for processing is the distribution of power across the spot. It would be ideal if this were uniform. However, failing this it is best if the distribution is stable and has a well established shape and FWHM.

The spot size and receive telescope size or pointing are obviously related and it is best if the beam is not spread too much to keep power requirements down to a reasonable level. A 10 m spot size option at 1000 m flying height requires careful analysis for instrument performance.

Combinations of height, speed, scan rate and sampling determine the scan line width, number of sample shots and the image properties of the data. These parameters are interdependent and all are variable.

5.1.2.2.3 Sample Output Pulse

A sample of the transmitted pulse is stored to enable consistent monitoring of the transmitted power and waveform shape.

5.1.2.2.4 Laser Return Signal Conditioners-Detectors

The laser return is processed by a photomultiplier or silicon detector (depending on the wavelength of the laser) to increase the signal levels before digitisation. The detector should be optimally coupled to the optics to capture the entire return signal.

5.1.2.2.5 Signal Digitisers

The return signal varies over a range of magnitudes both from pulse to pulse and over time in any one pulse.

The sampling rate is currently set to be 2 Gs/s as this is the current limit of existing boards. The digitising needs to be 1/10 of the FWHM of the laser pulse ie 0.5 ns for a 5 ns pulsq width. The ideal solution is to have digitisation at greater than 3 Gs/s to enable all of the return signal to be deconvolved.

Software support includes modules to control the laser firing, provide control and feedback for the scanning mechanism and control and digitise the return signal. This software resides in the on board computer.

The data is stored for later analysis and use. A time gate is set for data recording based on the current height above the terrain. However, data recording before and after the main surface interactions is continued to be monitored and corrected for the background radiance bias and noise floor.

5.1.2.2.6 Scan Angle

The operational scan angle is variable up to +/−15 degrees from nadir for good data recovery. A system can be designed to allow up to +/−30 degrees for research purposes.

5.1.2.2.7 Accuracy of Pointing

Accuracy of pointing can be measured by accuracy of the spot locations on the ground in the case of VSIS or the location of individual trees by ECHIDNA™. An accuracy of about half the spot size is preferred.

Note that this is a 90% requirement (within half a spot 90% of the time) so that at corresponds to about 2.5*RMS. For example, the centre of a 10 metre spot size is to be located with a 2 metre RMS.

For the VSIS, the accuracy depends on the GPS/INS and the sensor model parameters (such as position in aircraft etc).

One preferred design is the "tiling" model in which the spacing of the spots and between the lines is the same as the spot sizes. This gives very little "gap" between samples. The following provides sample calculations to help choose ranges of feasible combinations.

All of the requirements can be specified in terms of:

Flying height (h) units metres (m)

Beam divergence (IFOV) units milli-radians (mrad)

Aircraft speed (V) units metres/sec (m/sec)

Number of samples in a line (nsamp)

In terms of these requirements, sample calculations are:

$$spot = ifov * h / 1000$$

$$\theta_{scan} = 2 * \mathrm{Tan}^{-1}\left(\frac{nsamp * spot}{2 * h}\right)$$

$$\theta_{scan}(degrees) = \theta_{scan} * \frac{180}{\pi}$$

$$scan\_width = nsamp * spot$$

$$scan\_rate = \frac{V}{spot}$$

$$samp\_rate = 2\pi \frac{scan\_rate * nsamp}{\theta_{scan}}$$

$$Max\_rate = \frac{1.5\, 10^8}{h}$$

In these equations it is assumed scanning is achieved by a rotating mirror and that the period of sampling is a part of the cycle. That is, the scan to next line and the scan rate during sampling are the same.

Max_rate is the rate above which adjacent shots are be confused—ie the data are not unique and interleaved with the previous shot.

Typical values used in the calculations are heights of 1000 and 3000 metres, beam divergences between 1 and 8 mrad, aircraft speeds of 50 to 80 m/sec, and nsamp of 50 to 100.

Some initial cases found sampling rates of 5000 to 15,000 samples/sec cover the range of sampling needed for VSIS.

The scan angle is preferably kept to within +/−20 degrees if possible (+/−15 degrees is specified). However wider scans are possible if necessary.

Some examples for 100 samples across a line are shown in the following table (the $1^{st}$, $5^{th}$ to $8^{th}$ and last numbers indicate parameters outside acceptable ranges ie scans too widely or samples too fast):

effective way. The attitude sensor allows the orientation of the laser to be recorded. This enables geo-location of the data for each laser shot.

5.1.3.2 Specifications 5.1.3.2.1 Navigation Systems (GPS/INS)

A complete flight management system is installed in the aircraft. A ground based planning system enables missions to be planned and aircraft tracks with given overlaps to be tested. Flight planning requires input from sun tracking software to help eliminate sun spot effects—especially over areas with water under the vegetation. The final package includes this software in the aircraft to allow real-time adjustments to aircraft tracks.

A flight management system has a display in the cockpit for on track survey work to allow immediate feedback of aircraft position for the pilot.

A suitable attitude system is the Applanix POS/AV510.

5.1.3.2.2 Other Sensors

A suite of other sensors is installed on the aircraft. These can include outside air temperature, humidity and barometric pressure. An incident light sensor is installed in the roof of the aircraft to allow incoming radiation to be monitored.

The instruments are either aircraft instruments (resolution to +/−2 degrees) or a specially designed pod with a Vaisala temperature and Relative Humidity sensor. The pressure sensor can be an integrated pressure sensor.

Two pressure sensors are installed, one a sealed type and the other a differential. The sealed unit measures pressure relative to a standard atmosphere, which gives height above sea level not taking into account variations in local pressure changes. The other, a differential, is used to measure small variations in aircraft altitude between laser scans. The sealed pressure unit range operates between 600 mb (13,500 feet) and 1100 mb.

| h | ifov | V | nsamp | spot | ths | ths(deg) | scan_width | scan_rate | samp_rate | Max |
|---|---|---|---|---|---|---|---|---|---|---|
| 3000 | 1 | 60 | 100 | 3 | 0.0999 | 5.72 | 300 | 20.00 | 125768.36 | 50000 |
| 3000 | 3 | 60 | 100 | 9 | 0.2978 | 17.06 | 900 | 6.67 | 14066.73 | 50000 |
| 3000 | 4 | 60 | 100 | 12 | 0.3948 | 22.62 | 1200 | 5.00 | 7957.61 | 50000 |
| 3000 | 8 | 60 | 100 | 24 | 0.7610 | 43.60 | 2400 | 2.50 | 2064.09 | 50000 |
| 3000 | 10 | 60 | 100 | 30 | 0.9273 | 53.13 | 3000 | 2.00 | 1355.16 | 50000 |
| 1000 | 1 | 60 | 100 | 1 | 0.0999 | 5.72 | 100 | 60.00 | 377305.07 | 150000 |
| 1000 | 3 | 60 | 100 | 3 | 0.2978 | 17.06 | 300 | 20.00 | 42200.20 | 150000 |
| 1000 | 4 | 60 | 100 | 4 | 0.3948 | 22.62 | 400 | 15.00 | 23872.82 | 150000 |
| 1000 | 8 | 60 | 100 | 8 | 0.7610 | 43.60 | 800 | 7.50 | 6192.26 | 150000 |
| 1000 | 10 | 60 | 100 | 10 | 0.9273 | 53.13 | 1000 | 6.00 | 4065.49 | 150000 |

It may be possible to get a 5 metre spot size at 1000 metres but 3000 metres seems a better flying height. Spot sizes between 10 and 25 metres are easily obtained with scan widths of about 1–2 km and little gap between samples or lines.

5.1.3 Supporting Hardware 5.1.3.1 Module Description

The Supporting Hardware consists of all the equipment not directly accounted for in the Sections entitled 'Laser System and Driver' and 'Optical, Scanning and Digitising System'. The hardware includes the navigation and attitude systems, the spectral camera or imager, Data Acquisition System (DAS) and the data recording and storage system. There may also be ancillary data collected on the ground.

The navigation system is used to locate the aircraft and allow a mission to be completed in the most efficient and All the above instruments are interfaced to a computer and the data recorded on the same time-base as the Lidar data. Suitable interface boards are provided for each input device.

5.1.3.2.3 Spectral Camera/Multispectral Scanners

The airborne system contains at least a four band high resolution digital camera. The system has the capacity to accommodate the input from a full multispectral scanner like HyMap, cast or similar. Commercially available systems, both for digital camera or multispectral scanners require a full aerial camera port. An alternative is to employ a line scan camera with various filters.

Digital camera systems vary from a high resolution hand held camera to expensive high quality full motion control units.

The camera/multispectral scanner has its own data system which controls and logs all data.

5.1.3.2.4 Data Acquisition System Including Recording/Storing

The Data Acquisition System (DAS) consists of a computer, displays and recording system. The maximum rate of laser firing is assumed to be 15000 pulses per second. The sequence of events is:

1. Position the laser pointing;
2. Fire the laser;
3. Record output pulse energy;
4. Collect and digitise the return signal;
5. Check for valid data;
6. Process return signal.
7. Transfer signal and ancillary data to storage medium
8. Move the scanning mirror to the next position;
9. Repeat process

5.1.3.2.5 Data Acquisition

Data acquisition includes the lidar return and all ancillary data. Note that It is not be possible to record GPS and attitude data for each laser shot if the laser is operating near to its maximum firing rate. Under these conditions, the navigation and attitude data would have to be interpolated for geo-location of each lidar spot.

Estimates of data volume and acquisition rates in the following paragraphs are based on 8 bit digitisation at 0.5 ns (which gives 15 cm range resolution). Lidar data volumes are also based on recording data for 100 m in height to allow the background to be well sampled ie the lidar data volume is 100 bytes per shot.

In order to estimate data storage rates and volumes, calculations are made based on 1 hectare of data with 10 m spot size and full grid coverage i.e spots just touching. For a 1 km swath in this configuration there are 100 shots per line. Traveling at 70 m/s it is necessary to record 7 lines per second, therefore 700 shots per second. So 700 bytes has to be stored 700 times a second. There will be some dead time—assume 20%. So 700 bytes has to be processed and stored in 1.1 ms.

In addition to the ancillary data such as position, attitude and climate monitoring, a digital camera is included. This may have its own data acquisition and storage equipment. If not, this data is handled by the lidar control and acquisition software. A typical camera system produces four 2000×3000 pixel images of 8 bit data giving a total volume of 190 Mb per frame. Travelling at 70 m/s and assuming pixel resolution of 30 cm on the ground (which covers a 1 km swath with one frame), the recording rate needs to be about every 6 s. This gives 25% overlap along track. At this rate we need about 3 images per kilometre of flight are needed ie. in total, 570 Mb for the 1 hectare example.

The system is based on PC hardware. The hardware is commercially available. The hard disks are rugged versions of commercial systems.

Data is transferred to hard disk storage as the laser is fired. At the end of a mission, data is transferred to a medium which can be easily transported to the data processing site. Data storage systems eg DVDs and writable CDs can store vast amounts of data and can be accessed quickly. However their suitability for use in aircraft and at field sites where there may be adverse environmental conditions is suspect and a DAT type tape may be more suitable.

A quality Digital Storage Oscilloscope is used to monitor the laser returns. The oscilloscope is used to confirm laser data from targets and monitor laser output waveshape and levels.

5.1.3.2.6 Level 0 Processing

Level 0 data processing produces a useful near real-time display to provide the operator with a validation that realistic data are being recorded and system parameters are within acceptable ranges. Important parameters are

- ground elevation
- canopy elevation
- maximum returned intensity

Canopy and ground elevations are estimated by identifying, respectively, the first and last return above a threshold. A plot of ground and canopy elevation against time allows the operator to verify that the recorded data reflect a visual assessment of the terrain and vegetation. The maximum returned intensity is checked to see that the instrument is not saturating and that the full dynamic range is being used. The power or intensity of the outgoing laser pulse is recorded and optionally displayed.

The processing method follows these steps:

Identify first and last returns using a threshold.

Extract the intensity and possibly position of the peak return.

Display these data as a continually updating plot of height or range and intensity against time.

The time available for level 0 processing depends on the rate at which the laser is fired. At the maximum rate of 15000 pulses per second the laser is fired every 66 μs. At normal firing rates of 5000 pulses per second the interval between shots is 200 μs. Assuming the aircraft is flying at 10000 feet above terrain, it will take the laser pulse about 22 μs to travel from aircraft to ground and return to aircraft. All the information returning to the aircraft has to be analysed and processed during the remaining 44 μs if the laser is pulsed at 15000 pps.

5.2 ECHIDNA™—Hardware Issues

The ECHIDNA™ hardware system is a combination of the components linked similarly as shown in FIG. 5. It has different scanning modes, does not have a flight planning block and need not include the camera system.

5.2.1 Laser System and Driver

5.2.1.1 Module Description

The ECHIDNA™ transmits a pulse into the distributed foliage and measure the returning wave-shape. As with the airborne system, a window of the complete laser return signal is digitised.

There will be common timing throughout the system

This module contains the laser, power supply and control system.

The laser system consists of the

- laser
- laser power supply
- laser control system

The laser optics and scanning mechanism are described in the Optics, Scanning System and Drivers section.

5.2.1.2 Specifications

5.2.1.2.1 General

The laser is commercially available meeting the derived specifications. Each of the components in the laser system is described below

5.2.1.2.2 Laser

The laser output requires consistent shape and energy from shot to shot.

The critical areas of the laser system are the

- Wavelength
- Pulse shape
- Pulse width
- Power and signal to noise
- Laser power supply
- Laser control

5.2.1.2.3 Wavelength

The wavelength for the ECHIDNA™ system is 1540 nm. This resolves some of the problems with eye safety and allows a higher power laser to be employed. The laser must be eye safe at zero distance.

5.2.1.2.4 Pulse Shape

The ideal laser pulse is Gaussian to reduce the bandwidth of the signal, however, a Rayleigh pulse is acceptable. A Gaussian distribution is allowable for the circular beam pattern if it is stable and well characterised.

5.2.1.2.5 Beam Pattern

The ECHIDNA™ requires two beam patterns, a circular one for range and digitisation measurements and the second rectangular one for equivalent relaskop measurements. The operator selects which beam pattern is required for the particular applications before taking data. Specially designed optics are required to adapt to either beam pattern using the same laser. Both the circular and rectangular laser foot print on the target need to have as near uniform power distribution as possible.

The laser operates in the $TEM_\infty$ mode to give a smooth spatial beam pattern.

5.2.1.2.6 Pulse Rate and Width

The laser requires a pulse rate to a maximum of 10,000 pulses per second. The lidar has a pulse width of 3 to 6 ns and is stable within 3% from shot to shot. A small sample of the output pulse is recorded to enable waveshape and energy to be monitored.

5.2.1.2.7 Power and Signal to Noise

Signal to noise can be obtained and power values much lower than the VSIS can be assumed as SNR may be increased by using multiple shots. The SNR only increases if the target is stable, eg tree trunks.

5.2.1.2.8 Laser Power Supply

The ECHIDNA™ is a field portable unit and requires an energy efficient laser. The laser needs to operate from 28 Vdc.

5.2.1.2.9 Laser Control

The ECHIDNA™ computer controls the firing of the laser. The ECHIDNA™ can use multiple shots aimed in the same direction to increase signal to noise ratio.

5.2.2 Optics, Scanning and Digitising System

5.2.2.1 Module Description

5.2.2.1.1 Optics

Some of the transmitted power will be tapped off and fed to the input detector to enable consistent monitoring of the transmitted power and waveshape.

5.2.2.1.2 Scanning Mechanism

The ECHIDNA™ scanning system needs to be flexible with an ability to scan over a full hemisphere.

Several modes are required:
'almucantar' or constant zenith angle azimuthal scan
spiral scan
non-scanning mode
background detection mode In scanning modes, the software is able to identify the position of the Sun and adjust scans to eliminate a region around the solar disk. In scanning and non-scanning modes, it may be necessary to sample the same target with more than one shot and the software allows for this possibility. Background detection mode follows the scanning patterns of the other modes, but without firing the laser.

It is known that some types of forest have understorey of up to 2 metres in height so the ECHIDNA™ head needs to be able to be extended clear of such understorey and collect data of the surrounding vegetation.

The scanning system requires very accurate positioning information to provide 3D plots of the scanned area.

5.2.2.1.2 Detectors and Digitising System

It appears that current systems only produce 8 bit digitisation and 10 bits is preferred.

5.2.2.2 Specifications

5.2.2.2.1 Optics and Scanning System

The ECHIDNA™ operates in two major modes: normal hemispherical scan with round foot print and Rectangular or Wedge beam for almucantar scans.

A uniform distribution of laser power across the wedge beams is ideal for some analyses. TEMmn modes may also be used for beam shaping. Wedge beams are 1–4 degrees whereas the circular beams may have a Gaussian power distribution (TEM00) with beam divergence of 8 mrad to 1 or 2 degrees.

The pointing accuracy for ECHIDNA™ is 50 cm RMS at 500 m which is not an easy requirement. However, ECHIDNA™ has the advantage of being at one place for some time while the scanning occurs and also some "surveying" could be done to fix the grid of points.

5.2.2.2.2 Detectors and Digitisers

The sampling rate is 2 Gs/s as this is the limit of currently available boards. Digital Oscilloscopes can digitise single shot returns faster but transfer of the data to the storage medium may be slower. Most DSO have digitisation level of 8 bits.

The output of the digitisation is input to the computer system, then to storage.

5.2.3 Supporting Hardware

5.2.3.1 Module Description

The Supporting Hardware consists of all the equipment not directly accounted for in the documents titled Laser System and Driver and Optics, Scanning and Digitising System. The hardware includes the location and attitude systems, the camera or imager, Data Acquisition System (DAS) and the recording and storage system. Collection of ancillary data requires additional hardware such as a weather station.

The GPS system is used to locate the ECHIDNA™ and provide information to plan a mission in the most efficient and effective way. The attitude sensor allows the level of the laser to be recorded and allow geo-location of the data for each laser shot.

All the inputs from the ECHIDNA™ equipment below are interfaced to the main computer. One computer is used to control, display and record all the data. The ground based ancillary data has its own data recording system and is easily checked and down loaded at the end of each mission. The data must pass through similar QA standards to the airborne data.

All monitors being suggested here will be flat panel systems to reduce overall system weight and minimise radiation effects on personnel. These monitors will require high contrast displays to allow reading in bright sunlight.

Several variants of the ECHIDNA™ could be built, one mounted on a four wheeled bike and another needs to be portable to be carried into the forests by at most two field crew. The basic design is set for the portable model and this will be adapted to the mobile platform.

5.2.3.2 Specifications

5.2.3.2.1 Navigation and Location Systems (GPS/Tilt/Compass),

A differential GPS system will be used to locate the ECHIDNA™ in the field. An attitude or tilt sensor will be mounted on the laser system to confirm the laser is level when acquiring data. If not level then the tilt sensor can be used to correct the collected data. A suitable unit could be supplied by Morsdask Transducer Teknik. With compass and tilt instruments the position of the Sun can be calculated and the sampling can be stopped around the Sun disk.

5.2.3.2.2 Data Acquisition System Including Recording/Storing

Data acquisition includes the lidar return and all ancillary data. Ancillary data is similar to that required by the VSIS, however GPS location need only be recorded once for each site as the system is stationary. Aircraft parameters are replaced by tilt angles. The maximum laser shot rate is currently accepted as 10000 shots per second, so the minimum time available for data processing and storage will be about 80 μs. A digital camera is included in the system. The camera may be automatic and equipped with data acquisition and storage facilities.

The system is based on PC hardware. The hardware is commercially available. The hard disks are rugged versions of commercial systems.

Data is transferred to hard disk storage at each laser shot. A DAT type tape is used to transfer the data to allow easy transportation of data back to the office for complete data processing and product development.

The weather station is pre-programmed to collect data at set intervals. Under normal conditions a will collect data at a higher rate then average and store.

5.2.3.2.3 Level 0 Processing

Level 0 data processing produces a useful near real-time display to provide the operator with a validation that realistic data are being recorded and system parameters are within acceptable ranges. Important parameters are range to first return range of last return maximum returned intensity A plot of range of first and last returns against time allows the operator to verify that the recorded data reflect a visual assessment of surrounding vegetation. The maximum returned intensity is checked to see that the instrument is not saturating and that the full dynamic range is being used. The power or intensity of the outgoing laser pulse is recorded and can also be displayed.

5.2.3.2.4 Power Systems

Electrical power is critical for the ECHIDNA™ as the system is portable and is required to be used in the field as a stand alone instrument. The ECHIDNA™ is designed around a 12–24 Vdc power supply with portable petrol generators available which can serve the needs of the ECHIDNA™. A battery charging facility is also provided either in the transport vehicle or at the office to allow easy recharging.

6. Software Engineering and Algorithm Validation

The software needs for VSIS or ECHIDNA™ products and they way they fit together are illustrated in FIG. 6.

Overall system software needs can conveniently be divided into four broad sections:

Mission planning

Mission operation

Data processing

Product presentation

Mission planning involves surveys of existing data relating to sites of interest and studies of the terrain in order to plan flight lines and accessibility of ground sites.

Mission operation requires software for instrument control, data acquisition and quality checks, including basic data processing to provide near real time 'quicklooks'. The main data processing is undertaken away from the field site and implements the algorithms previously described.

The VSIS and ECHIDNA™ software requirements will be addressed separately, but there are some common requirements. Some higher level data processing requires input from both VSIS and ECHIDNA™ data, so it is important to follow consistent processing methods and maintain compatible data structures.

6.1 VSIS 6.1.1 Mission Planning

VSIS mission planning details flight lines and times of flight, taking into account sun position where necessary. The major software requirement in mission planning is to survey existing site information (such as DTM and satellite images) and this can be achieved with commercially available software such as GIS packages. Additional software will design the sampling pattern based on instrument capabilities and flight options such as altitude and ground speed. This can be a simple simulation demonstrating the relationship between the variable parameters of altitude, ground speed, beam divergence, laser firing rate and scan rate.

6.1.2 Data Processing

Standard products are be defined for Level 1, 2 and 3 processing. Level 1 and 2 processing will be different for VSIS and ECHIDNA™. Some level 3 processing will require data from both systems.

6.1.2.1 Level 1—Basic Post-Flight Processing

Level 1 data processing produces a data structure similar to the released SLICER data. The data header contains information relevant to the whole dataset, while the main structure contains shot by shot lidar returns and ancillary data. The header should contain the number of shots taken (ie. the number of data structure replicates included in the file), the range/height resolution (or digitising time interval), foot print size (or aircraft elevation and laser divergence) and any other relevant quantities.

The shot by shot data structure contains the recorded lidar waveform with ground pulse peak and edges identified as well as the top of the canopy. It also contains all necessary ancillary data such as time, geographic location (latitude, longitude), elevation, view/scan angles, output pulse information. Note elevation in this context should be a quantity which defines the elevation (above ground or whatever reference ellipsoid is being used) of some point in the waveform such as the start of recording, or the first identified return above the noise threshold (canopy top). 'Output pulse information' is whatever features of the output pulse are recorded and may be simply the power, if the pulse shape is found to be stable and scalable.

Processing follows these steps:

Read the data—raw lidar returns and ancillary data—GPS time and location, attitude, scan angles, outgoing pulse information.

Interpolate location and attitude data to the time of each laser shot

Calculate azimuth and inclination of laser shot from attitude and scan angles.

Calculate a noise threshold from the pre- and post-canopy/ground data. This should be monitored for consistency over neighbouring shots and the noise floor bias removed from the data. High frequency noise should be removed by filtering. Finally, the remaining noise threshold for each shot should be chosen so that canopy top and end of ground return can be identified.

Identify ground and canopy points in the lidar waveform

End of ground return is identified as the last point above the chosen threshold

Peak of ground return is identified as the point where the derivative of the waveform crosses zero Start of ground return is identified by the width of the pulse (based on the width of the back half and the known pulse shape).

Top of canopy is identified as the first point above the chosen threshold

Check ground identification by examining neighbouring points and reference to a DTM where available Write output data structure

6.1.2.2 Level 2—Standard Products

Level 2 standard products are derived from deconvolved lidar data ie. the first step in their generation is pulse deconvolution. Proposed products are:

DTM including slope and aspect

Waveform statistics eg. canopy height, height of maximum return, waveform median—data can be contoured or plotted as histograms.

$P_{gap}$

Projected foliage cover

Apparent foliage profile

Apparent reflectance profile

Structure diagrams

Details of the algorithms involved in these calculations have been described previously. An outline of the processing steps follows:

Pulse deconvolution in the time domain.

Identify elevation of ground return for each shot. 'Clean up' by smoothing and/or neighbourhood testing to find anomalies and non-ground detections. Interpolate/triangulate and calculate slope and aspect.

$P_{gap}$ and cover: calculate cumulative sum of returns from the canopy and divide by the sum of canopy and ground returns (modified by ratio of reflectances). $P_{gap}$ is calculated directly from this ($P_{gap}$=1−(cumulative return)/(total return)) and projected foliage cover is simply 1−$P_{gap}$.

Apparent foliage profile: This is calculated from $P_{gap}$. Cumulative projected cross sectional area is −log($P_{gap}$) and the derivative of this quantity is the apparent foliage profile.

Apparent reflectance is the reflectance of an equivalent uniform reflector at each height through the canopy.

Structure diagrams: Cover and height are derived in the previous calculations. A simple plot of height vs cover is a basic structure diagram. Neighbouring shots could be aggregated to produce structure diagrams with lower spatial resolution.

Structure diagrams are a primary GIS data layer provided in addition to the DTM.

6.1.2.3 Level 3—Advanced Products

These products include the application of models (eg. Weibull function fitted to foliage profile) and consider different layers within the canopy in regions identified from the ancillary and Lidar data. Structure diagrams and cover maps are produced for each layer. Statistics can be produced for clumps or other spatial patterns identified from aerial photography or satellite images. Details of the algorithms required for these calculations have been previously described.

6.2 ECHIDNA™

6.2.1 Mission Planning

ECHIDNA™ mission planning is largely similar to that for VSIS, but with a greater need for detailed DTM data to assess access to the sites. Again, commercially available software is used.

6.2.2 Data Processing

6.2.2.1 Level 1—Basic Data Processing

GPS and sensor attitude data are used to geolocate and orient earn shot.

Background noise is characterised and the noise floor subtracted. Identification of noise levels is more difficult for ECHIDNA™ than for VSIS since the targets are much closer to the sensor, and there is no definite last return (in contrast to the ground return for the airborne system). Also, the sky radiance and reflections of sunlight from canopy elements and clouds are significant. The noise floor should be checked for consistency over nearby shots. High frequency noise is removed by filtering. A high sampling rate ensures this is done without affecting the pulse smoothed signal.

6.2.2.2 Level 2—Standard Products.

Level 2 standard products are derived from deconvolved lidar data ie. the first step in their generation is pulse deconvolution which is a 'time domain' solution.

Standard products will be:

Waveform Statistics over almucantar or hemisphere

Base waveform statistics contoured and plotted (eg order statistics, peak canopy return level)

Gap probability, apparent foliage profiles and mean leaf angles

LAI from 32.5° elevation almucantar

Basal Area from horizontal almucantar, Log Volume

Aggregated Foliage angle distribution

These products can be aggregated over a number of shots if this is desired. The algorithms by which these products are derived have been previously described.

6.2.2.3 Level 3—Advanced Products

Advanced products incorporate models to study different layers within the canopy. Structure diagrams and cover are plotted for each layer. Height dependent models of foliage angle distributions can be used in calculations of foliage profiles or the angles may be inferred from the ECHIDNA™ data.

The following products are possible:

Scale effects and gap phase

Structure diagrams and foliage profile by class and layer

Biomass and FAI/LAI maps

Growth form and growth stage

Timber volume, basal area and stand suitability

Trafficability and visibility in forests

Triangulation and fly through information on typical data sets.

Stem to Foliage relationships

Carnahan Class

A1. Appendix 1—Solution When Calibration is not Fully Known

Assume that the calibration in the region where there are data has the form (out of the close range area where k(r) is operating):

$$C(r) = \frac{\tilde{C}}{r^2}$$

It follows that:

$$\tilde{S}(r) = \tilde{C}\rho_{app}(r) = r^2 \frac{E(r)}{E_0} = -\tilde{C}\rho_v \frac{dP_{gap}(r)}{dr}$$

Again, this quantity can be integrated over the profile to obtain:

$$\tilde{H}(r) = \int_0^r \tilde{S}(r')dr'$$
$$= \tilde{C}\rho_v(1 - P_{gap}(r))$$

and at the ground the relationship holds that:

$$\tilde{S}(h) = \tilde{C}\rho_g P_{gap}(h)$$
$$= \tilde{C}\rho_g\left(1 - \frac{\tilde{H}(h)}{\tilde{C}\rho_v}\right)$$
$$= \tilde{C}\rho_g - \frac{\rho_g}{\rho_v}\tilde{H}(h)$$

Hence, if the ratio of the ground and vegetation reflectance is known this relationship gives $\tilde{C}\rho_g$ and hence $\tilde{C}\rho_{84}$ giving the integrated gap profile $P_{gap}(r)$ and including $P_{gap}(r)$. If some shots do not have ground returns due to dense canopies the local estimate of the $\tilde{C}\rho_v$ can then be used to provide a gap profile.

$$\tilde{C}\rho_g = \tilde{S}(h) + \frac{\rho_g}{\rho_v}\tilde{H}(h)$$
$$\tilde{C}\rho_v = \frac{\rho_v}{\rho_g}\tilde{C}\rho_g$$
$$= \frac{\rho_v}{\rho_g}\left[\tilde{S}(h) + \frac{\rho_g}{\rho_v}\tilde{H}(h)\right]$$

That is, in general:

$$P_{gap}(r) = 1 - \text{cover}(r)$$
$$= 1 - \frac{\tilde{H}(r)}{\tilde{H}(h) + \frac{\rho_v}{\rho_g}\tilde{S}(h)}$$

To achieve this result operationally requires separating the ground signal from the above ground signal, identifying start of data and the background noise threshold.

A2. Appendix 2—Crown Factor and Density of Leaf Area

It the foliage density is uniform through the interior of the crown then it may be approximately estimated from the crown factor, or crown openness (CF).

If the foliage elements are relatively small and randomly distributed through the crown volume with a uniform leaf area volume density F then the probability that a ray of length s in direction μ within the canopy will not hit a foliage element is:

$$P_{gap,W}(s, \mu) = e^{-G(\mu)Fs}$$

where G is the Ross G-function. The ratio of the projected area of foliage elements in the direction μ to the one-sided area is used for the FAI and F. For randomly distributed leaves, G=0.5 for all directions.

The CF can be modelled by a simple method to get a starting value for a more complex method to define an equivalent F for the crown. In the simple method, the mean length of intercepts (s) vertically through the crown are used with the gap model to estimate CF and in the second the mean Pgap over the area covered by the crown using the same intercepts is used. The second is the "accurate" estimate.

A2.1 Foliage Density for Ellipsoidal Crowns

For an ellipsoidal crown it may be shown that the mean vertical path through the crown is ⅔T where T is the crown thickness. In this case an initial rough estimate for the mean gap fraction for the crown looking vertically up would be:

$$\overline{P}_{gap} = 1 - CF/100$$
$$\approx e^{-\frac{2}{3}GFT}$$

where G here is the vertical Ross G-function.

A more accurate estimate is to average $P_{gap,W}$ over the crown area which results is:

$$\overline{P}_{gap,W} = \frac{2}{r^2}\int_0^r \rho e^{-X\left(1-\frac{\rho^2}{r^2}\right)^{1/2}} d\rho$$
$$= \frac{2}{X^2}(1 - (1 + X)e^{-X})$$
$$X = GFT$$

If the simple estimate is used to get a first approximation to X then a refined estimate of X can be rapidly obtained by iteration allowing GF to be obtained for each Type from the CF data.

The missing data in the normal Walker/Hopkins field data set is G which can be used as 0.5 (random case) to make a start but ideally some idea of the foliage angle distribution should be provided for each crown type and/or species. Indications of foliage angle such as "erectophile" (vertical foliage), "planophile" (horizontal foliage) and "random" can be helpful.

However, such data can also be inferred if the species of the foliage type has been recorded in the field data and/or photographs are taken at the sites. The photographic method uses hemispherical photography in areas of measured structure to invert G and F.

A2.2 Foliage Density for Conical Crowns

For cones the simple estimate is:

$$\overline{P}_{gap,W} = 1 - CF/100$$
$$\approx e^{-\frac{1}{3}GFT}$$

and the more accurate method leads to:

$$\overline{P}_{gap,W} = \frac{2}{r^2}\int_0^r \rho e^{-X\frac{(r-\rho)}{r}} d\rho$$
$$= \frac{2}{X}\left(1 - \frac{1}{x}(1 - e^{-X})\right)$$
$$X = GFT$$

Hence, again the field data leads to an estimate for GF and some assumption about G is needed to obtain F by itself. However, it should be noted that GF is needed to model vertical Lidar returns.

A2.3 Foliage Density for Grass

For grass, the data usually available are height and cover. If the grass height is denoted by T then:

$$\overline{P}_{gap,G} = \left(1 - \frac{\text{cover}}{100}\right)$$
$$= e^{-GFT}$$

so that again GF is available from the field data for the grass canopy Type. But, again, some knowledge of G will be needed to obtain the complete actual Foliage Profile.

A3. Appendix 3—Mathematical Tools

A3.1 Basic Definitions in Mathematical Morphology

The Boolean Model has been used extensively in the derivation of statistics and information from both traditional and Lidar based canopy and forest measurements, and provides an axiomatic and mathematical approach to the analysis and measurement of structure of random sets. It had its practical base in the analysis of images that arise in crystallography, stereology and in mineral analysis.

Adopting the terminology of this work, such "images" have two basic phases—called the grains and the pores (or gaps) or more specifically the set X and its complement $X^c$.

Grains=$X \subseteq R^N$

Pores=$X^c = \{x \in R^n | x \notin X\}$

For example, an image of trees in a forest has the trees as the grains and the background, gaps or clearings as the pores. However, an image may have a number of "phases" or types of set.

A set transformation is an operation ($\Psi(X)$) on a set (eg forming the complement above) that results in a new set and a measure ($\mu(X)$) is an operation that results in a number (such as surface area, volume, area, mass etc).

Among the basic principles used in the description of the structure of sets are:

Increasing and decreasing Set transformations
Compatibility with translation and
Structuring elements Increasing set transformations are those for which $\Psi(X) \supseteq X$ and decreasing transformations are those for which $\Psi(X) \subseteq X$. These play a special role in defining "sieves". A special set transformation the translation of X:

$X_h = \{x+h | x \in X\}$

Transformations are said to be "compatible with translation" when:

$\Psi(X_h) = [\Psi(X)]_h$ so that it does not matter if the transformation is carried out before or after a translation. Such operations are said to be independent of the origin.

Another transformation that occurs is the "homothetic" transformation $\lambda X$ for scalar $\lambda$:

$\lambda X = \{\lambda x | x \in X\}$ and in terms of translation we have that $\lambda[X_h] = [\lambda X]_{\lambda h}$. Again, these operations can be used to create test functions and sieves for measuring size and shape.

A "structuring element" (B) is a special set that is used to create morphological transformations of X. A specific point in B is called its "centre" so that $B_x$ is the translation of the set by x or the set B centred at x. This tool, together with measures of the transformed sets make up the tools of an image analysis for structure.

Structuring elements are "test sets" that measure the components of an image. They may be points, lines, simple shapes such as disks or rectangles or combinations of these. They may be spheres or cubes in 3 or more dimensions. Selecting the structuring elements and simple families of structuring elements (such as $\lambda B$ for a given basic B) leads to some very useful algorithms.

Two primary set transformations are the Erosion and the Dilation. The Erosion (Y) of a set X is the locus of centres x of translates $B_x$ of B which are included in the set X. If the set subtraction operation of X by Y is defined as:

$$X \ominus Y = \bigcap_{y \in Y} X_y$$
$$= X \ominus \breve{B}$$

then it follows that we can write the operation of erosion of a set X by B as:

$$Y = \{x | B_x \subset X\} = \bigcap_{z \in B_o} X_{-z} = \bigcap_{-z \in B_o} X_z$$
$$= X \ominus \breve{B}$$

where the set $\breve{B}$ is the "symmetrical set" to B with respect to its origin:

$$\breve{B} = \bigcup_{z \in B} \{-z\}$$

The operation decreases the set X but at the same time increases the set $X^c$. The complementary increasing transformation is called the Dilation of a set. It is the locus of the centres x of $B_x$ which "hit" the set X:

$$X \oplus \breve{B} = \{x | B_x \cap X \neq \varnothing\} = \{x | B_x \pitchfork X\}$$
$$= \bigcup_{x \in X} \breve{B}_x$$
$$X^c \oplus \breve{B} = \left(X \ominus \breve{B}\right)^c$$

Despite the apparent complexity of these expressions, they have the property that they can be realised as software and hardware as basic image processing operations. An algebra of operations can be implemented and provides very useful results for analysis.

Two special transformations that can be developed out of basic erosion and dilations of a set by a structuring element are the Opening and the Closing of the set X by B Opening: $X_B = (X \ominus \breve{B}) \oplus B$ Closing: $X^B = (X \oplus \breve{B}) \ominus B$ These can provide very effective "sieves" for size distributions such as the way the measure $\mu(X_{\lambda B})$ changes with $\lambda$.

For example, the area of a set as it changes with the opening at closing by disks of different sizes can be used to estimate size distributions of the grains making up a set X—and it can be done by a hardware based image analyser (Serra, 1974).

In image processing terms, the structuring element is a local patch that is "moved" or incremented over the image. In the dilation, if part of the structuring element hits X the point is marked "in" otherwise "out". In erosion, only if the whole of the structuring element is in X is the centre point marked as "in", otherwise it is "out". These simple, realisable, operations are examples of the basic and very practical operations that arise from the study of Mathematical Morphology.

A3.2 The Boolean Model

A3.2.1 Basic Definition

An especially useful model for the purposes of deriving measurements of canopy structure and forest properties is the "Boolean Model". This model is an example of a random set model. It starts with a Poisson point process with density $\lambda$ and for each realisation of a Poisson point associates it with the centre of a grain. The grains are realisations of random sets $X_i'$ and the realisation of the Boolean model (X) is the union:

$$X = \bigcup_{i \in I} X_i'$$

For example, a set of disks with random diameters and Poisson distribution of centres forms a Boolean model. A particular "image" is one realisation of the model and the capacity to measure its properties will depend on the relationships the underlying model induces in the "images" of its realisations.

There are two fundamental properties of the Boolean model. The first relates to the probability of a structuring element (B) falling in the pores of X and the second to the number of grains of the Boolean model that hit a structuring element.

A3.2.2 Fundamental Property

Suppose B is a randomly located structuring element. The probability that B is completely in the pore (or gap) phase may be shown to be:

$$Q(B) = Pr\{B \subset X^c\} = e^{-\lambda E[Mes(X' \oplus \check{B})]}$$

Since 1−Q(B) is the proportion of the space occupied by the dilation of X by B (X⊕B̌) this fundamental relates the operation on the set X to its actions on the grains X'. This is one of the most useful of the properties of the model.

A3.2.3 Number Grains Hitting B

The number of primary grains (X') hitting B can be shown to be simply:

$$N_\lambda(B) = Poisson\{\lambda E[Mes(X' \oplus \check{B})]\}$$

Again, this is a very useful result.

A3.2.4 A Simple Example

Suppose that X is a Boolean model with primary grains as compact plane objects, roughly circular but random in area and local "shape"—a little like the cross sections of trunks or like vertically projected tree crowns.

Now suppose that the structuring element B is very simply a single point {X}. The probability that a point falls into the pores is:

$$q = P_{gap} = e^{-\lambda \overline{A}}$$

That is, the probability of a gap is the projected crown cover that we quoted previously. Further, the number of projected crowns hitting a point will be a Poisson variable with density $\lambda \overline{A}$ or the CAD. Hence, the CAD must be more than 100% for there to be any appreciable overlapping of the crowns.

This result, with some modifications, will be used below.

A3.3 Steiner's Theorem

Steiner's Theorem relates the functionals (such as volume, surface area or perimeter) of a compact convex set in $R^n$ to those of its dilation by a compact "ball" in $R^n$. Rather than providing its general derivation, only its two-dimensional form will be quoted here.

In the plane, Steiner's Theorem becomes:

$$\overline{A}(X \oplus B) = A(X) + \frac{U(X) \cdot U(B)}{2\pi} + A(B)$$

where A is area and U is perimeter.

Suppose, for example, that a Boolean model is dilated by a disk of radius r. It follows that for any primary grain:

$$\overline{A}(X' \oplus \check{B}) = \overline{A}(X') + \overline{U}(X')r + \pi r^2$$

from which the probability that the disk will be in the pores or the distribution of the number of primary grains hitting the disk can be found.

A3.4 Applications

A3.4.1 The Bitterlich Angle Count Method

In the angle count method for estimating Basal Area (BA) it is assumed the trees have a circular cross sections and are Poisson distributed, thereby forming a Boolean model. Interest here is in the "slice" of the trunks at breast height.

The principle by which this is estimated follows. For a given wedge angle, a tree will be "in" if the point of observation is within a radius of:

$$r_{crit} = \frac{r_i}{\sin\frac{\alpha}{2}}$$

of the tree centre. In this formula, $r_i$ is the radius of the tree in question and $\alpha$ is the wedge angle.

Turning the problem around, consider that each tree cross section is replaced by a disk of the radius $r_{crit}$. This is also a Boolean Model with the same density but a different (by a scale factor) grain area distribution.

The number of "in" trees will be exactly the number of overlapping grains at the point of observation. Assuming this point to be randomly selected it follows that:

$$N_\lambda(x) = Poisson\{\lambda E[Mes(X')]\}$$

$$= Poisson\{\lambda \overline{A} \times BAF\}$$

$$= Poisson\{BA \times BAF\}$$

$$BAF = \sin^2\frac{\alpha}{2}$$

where BAF is the "Basal Area Factor". That is, the expected number of "in" trees divided by the BAF is the basal area of the stand.

The BAF should not be too small since division by a small number, in the face of the variance of the estimate (which is equal to the mean—ie BA×BAF) is not desirable and also because the estimate should not be based on too big a plot size. If the effective plot size gets large and BA is not small then trees start to become "hidden" behind other trees. It is possible to make allowance for "occlusion" but the formulae are more complex.

A3.4.2 Number of Trees Apparently within a Given Distance

The Bitterlich angle count method is based on the assumption of circular tree trunks and lack of occlusion of "in" trees by other trees. The second is reasonable for relatively short ranges.

If the method is replaced by one that counts the number of trees of any size apparently less than a distance r from the plot centre we can use Steiner's Theorem to derive the expected information content of the data.

We will only assume that the trunk cross sections are convex in that case, in a similar way to the above derivation of the Bitterlich estimate for basal area, the number of trees apparently within a radius r of the plot centre (from any point of the tree) is:

$$N_\lambda(x) = Poisson\{\lambda E[Mes(X'_r)]\}$$

$$\lambda E[Mes(X'_r)] = \lambda \overline{A} + \frac{1}{2\pi}\lambda \overline{U} r + \lambda \pi r^2$$

If the number of trees apparently within the distance (by any hit) is measured as a function of r it can be seen that at small distances the data are dominated by BA and at large distances by density. However, as noted before, this is not always a stable way to estimate BA.

If the decision of whether a tree is in the distance is taken to be the intersection of a finite angle ray and some part of the tree then beam width is also included in this model. The use of varying beam width and more than one plot will improve the power of this technique.

A3.4.3 Projective Methods to Estimate Pgap

In most of the applications being discussed here, the gap probabilities can be discussed in terms of a reference surface or plane to which we wish to compute the gap probability is computed. For example, cover is related to the probability of a gap in the canopy to the background surface and "cover" or visibility in a forest of sterns could be looked at as related to the probability of a gap between the plot centre and a "sight board" held horizontal to the view at a distance in a forest.

Consider a Boolean Model of grains distributed in a volume above a surface (eg tree crowns or leaves etc). The Poisson density will be denoted $\lambda_v$ and it may well vary spatially in the "double Poisson" model.

If z denotes the height above the "surface" (or reference plane) ranging between 0 and h and containing all the grains then we can consider the result of projecting the grains onto the reference plane as "shadows" from a specific direction to the normal to the plane which will denoted as $\mu_v$. (Note, in this case the notation refers to the direction cosines of the vector direction and not just the cosine of the zenith angle).

It is easy to see that the projections of the grains onto the reference surface form a Boolean model such that:

$$\lambda = \int_0^h \lambda_v(z')dz'$$

$$Q(B) = Pr\{B \subset X^c\} = e^{-\lambda E[Mes(X'(\mu_v) \oplus \check{B})]}$$

$$N_\lambda(B) = Poisson\{\lambda E[Mes(X'(\mu_v) \oplus \check{B})]\}$$

where now $X'(\mu_v)$ is the projection of the grain X' onto the reference plane and Mes and B are planar measures and structuring elements.

For example, the Warren Wilson point quadrat method can be derived from the Poisson model since there is an expression for the number of hits by the needle as the expected number of overlapping projections. Expressions for crown cover, projected foliage cover and even for Lidar attenuation can be quickly developed from these basic results.

As a simple example, consider that the reference plane is now vertical and that the projections are all in a given direction in a forest. In this case, the trunks will project as rectangles with width the DBH. It may be shown in this way that the probability of a gap within range r parallel to the ground in a forest with a well defined trunk layer is:

$$P_{gap}(r) = e^{-\lambda \overline{U} r}$$

where U is the mean perimeter of the trunks ($\pi$ DBH). Thus, the attenuation of a signal in the horizontal is a measure of tree size and spacing that can be put together with the other relations into a set of measurements that will resolve these parameters.

If the test beam is a finite width then the attenuation must be modified to take into account the "structuring element". If the beam (or B) has varying size and shape it provides a tool for deriving many structural parameters in a forest.

A4. Appendix 4: Atmospheric Parameters & Reflectance

A4.1 Introduction

The Lidar system for VSIS is assumed to be effectively down looking normal to the ground. Its beam will be scattered and absorbed by the atmosphere between the instrument and ground on both the outward and return paths. In addition, radiation from the ground and backscatter from the atmosphere will enter the telescope FOV and provide background radiance.

A4.2 Background Radiance

The background radiance entering the FOV of the receive telescope can be modelled generally as follows:

$$L_t(\mu_o, \mu_s, h, \lambda) = \frac{1}{\pi} E_T t(\mu_o, h, \lambda)\frac{\rho_t + \rho_{env}}{1 - s\rho^*} + \frac{L_p(\mu_o, \mu_s, h, \lambda)}{1 - s(h)\rho^*}[+L_g(\mu_o, \mu_s, h, \lambda)]$$

where:

$L_t(\mu_o, \mu_s, h, \lambda)$ is the radiance observed from a surface with background reflectance $\rho_b$ by the instrument from altitude h, with look (or view) direction $\mu_v$ and sun direction $\mu_s$ at wavelength $\lambda$;

$$E_T^*(\lambda) = \frac{E_T(\lambda)}{1 - s\rho^*}$$

where:

$E_T(\lambda)$ is the irradiance at the target for a 'black' earth;
s is the sky hemispherical albedo.
$t(\mu_v, h, \lambda)$ is the beam transmittance through the layer between the surface and altitude h in direction $\mu_v$;

$$\rho_{env} = \rho^*\left(\frac{T(\mu_v, h, \lambda)}{t(\mu_v, h, \lambda)} - 1\right)$$

is the environmental reflectance due to the background albedo $\rho_b$ and $T(\mu_v, h, \lambda)$ is the diffuse transmittance for a layer of thickness h and for initial beam direction $\mu_v$.

$L_p(\mu_v, \mu_s, h, \lambda)$ is the path radiance of light which did not interact with the surface; and $L_g(\mu_v, \mu_s, h, \lambda)$ is the glint term that will occur over water covered targets.

The equation is written in this way as the background albedo is not normally known and should be computed locally during atmospheric correction. Hence, the basic data needed for atmospheric modelling are:

$$[E_T(\lambda), t(\mu_v, h, \lambda), T(\mu_v, h, \lambda), T(\mu_s, h, \lambda), s, s(h), L_p(\mu_v)[, L_g(\mu_v)]]$$

where the glint term is only used for water pixels.

These parameters have been provided for a given atmospheric model by the program called ATM_MOD. The background reflectance can be varied between 0 and 1 if needed to estimate background radiance (flux). This can be integrated to take account of telescope FOV and recording bandwidth.

As the receiver spectral bandwidth is assumed to be 10 nm it is reasonable to use the broadband ATM_MOD in this way, as it is accurate for wavebands that can be resolved by 1 nm bands. In fact, it would be even better if the Lidar instruments used much narrower filters than 10 nm (eg 1 nm). But even so, the ATM_MOD values can be used for modelling.

[NOTE: the formulation could be simplified considerably in the NIR and SWIR due to low scattering by aerosols and almost no multiple scattering. But it is not necessary to do this as ATM_MOD can be used as above. Note also that the background reflectance and the target apparent reflectance are not necessarily the same. It is best to assume a background and keep it fixed.]

A4.3 Reflectances and the Estimated Background Effect

The reflectance factor used in the above model can be measured in the field using a spectro-radiometer. The plot seen in FIG. 7.1 shows typical grass and soil background spectra over the visible, near infrared and shortwave infrared ranges taken in Canberra, Australia during a field mission.

If these are focussed on the two ranges being considered for the Lidar modelling the graphs seen in FIGS. 7.2 and 7.3 are derived.

Using these plots to select a background reflectance range, and using a typical atmosphere from some recent Hymap flights, the values for the background radiances across the FOV of the telescope (and integrated over the FOV) were computed as seen in FIGS. 7.4 and 7.5 with the uppermost line being a reflectance of 0.5 for reference and giving radiances of 60 W m−2 microm−1 sr−1 at 1054 nm and 30 W m−2 microm−1 sr−1 at 1540 nm.

It is clear that at 1540 nm there is less background radiance and (as is seen below) higher transmission—provided water vapour lines are avoided. The reflectance of vegetation is quite low. but that means there is less multiply scattered radiation from the foliage. The effect on Lidar backscattering will be discussed below.

In the case of the ECHIDNA™ the background radiance will be the sky radiance and any cloud reflections or aureole effects when the instrument scans near the sun position. This will have to be modelled and monitored carefully by the instrument. The sun needs to be avoided and the significance of the sky radiation on the data needs to be assessed and measured during the scans.

A4.4 Transmission

The Lidar transmission between the Laser system and the range of the apparent reflector $(t(\mu_v, h, \lambda)$ is modelled accurately for transmission as a Laser beam has a very narrow waveband. This is preferably done for the most detailed transmission model available—such as Hitran—owing to the existence of lines and narrow bands which the laser system must avoid.

As an example of this some plots from Modtran 3.7 are presented in FIGS. 7.6 and 7.7. This software package is often used in Laser modelling and has a frequency/wavelength resolution of 1 cm$^{-1}$ or about 1/10 of that of ATM_MOD.

FIGS. 7.6 and 7.7 plot the transmittances for a vertical path of 3 km (the upper trace) and a path to space (the lower trace) for the two wavelength ranges. The atmospheric model is a little different now so the results are a little different from the transmission from ATM_MOD. These differences can be resolved with fully consistent runs, however the difference averaged over 1 nm steps is not great.

Clearly, a transmittance of 0.9 in the NIR and 0.92 in the SWIR can be used in the models. If the Lidar is on a line it will need to be "tuned" into a clearer area, and Hitran or other similar codes can be used to find these clearest atmospheric paths.

From these plots it would seem if the Laser were moved to near 1050 nm from 1065 nm it would always be "in the clear" and the choice of 1540 nm seems to avoid absorption lines but should be monitored to avoid the many lines nearby.

A4.5 Lidar Scattering Effects

The Lidar backscattering (taking into account phase function) can be expressed for foliage and soil background as:

$$\rho_v = \frac{1}{5}\omega_v$$

$$\rho_g = \frac{1}{2}\omega_g$$

where $\omega_v$ and $\omega_g$ are the single scattering albedoes of the foliage and soil.

These albedoes can be approximated by the reflectance factors obtained by the GER.

In this way, the vegetation foliage is seen to be quite dark in the SWIR region (1540 nm). This could mean the Lidar will be more responsive to stems than leaves. Also, its sensitivity to non-vegetation targets in forests has military and other detection potential.

If an ECHIDNA™ is "pointing down" or an airborne Lidar were used with a 1540 nm laser, the factor of interest is the ratio:

$$\frac{\rho_v}{\rho_g} = \frac{2}{5}\frac{\omega_v}{\omega_g}$$

This is plotted in FIG. 7.8 for information in the analysis testing.

The ratio is actually lower in the visible region than the SWIR but the high non-vegetation reflectance in the SWIR gives it the attractiveness for locating solid objects in areas of dense foliage.

In addition to the specific advantages listed previously in relation to the invention the subject of the present application, the present invention in its various aspects will be seen as having a number of advantages over known systems and methods of assessing a vegetation canopy.

The present invention overcomes the blindness of airborne and spaceborne Lidars due to their limited scanning and methods that derive data from Lidars that previously have not been considered to be achievable.

Of high value in determining these aspects of canopies is the use of varying size and shape of the Lidar beam. This, combined with the more commonly available range and waveform data makes the products described here richer than those currently available from existing Lidar or any other forest measurement systems.

A vast range of previously under-utilised methodology and morphological operations can be re-vitalised to interpret the data and also many other areas not so far utilised for canopy structural measurement are available.

Forest measurement can be enhanced in terms of measurements that can be derived from the Lidar technology in accordance with the various aspects of the present invention, as follows:

Environmental:

Provided sufficient ground Lidar or other data are available to calibrate an airborne system it is possible to map the three main layers of vegetation cover and provide cover/height diagrams for each one at scales from 1:20,000 to 1:50,000 scales. Information on the structure (such as crown sizes, crown length ratio and growth forms) is not currently available. Moreover, combined with current video or scanner technology—or with current satellite data—the VSIS comprises a complete system for achieving much of the data needs for an NVIS mapping.

Forestry:

In Native Forests, The ECHIDNA™ can provide layer stratified BA, DBH, density, FAI as a function of height, mean foliage angles and (has the potential to provide crown length ratio and crown sizes. These can be packaged into a portable system for accurate measurement at a number of forest sites. The VSIS can extend these data over a wide area of similar forest community at scales between 1:20,000 and 1:50,000.

Specific products outputs of the system include Diameter at Breast Height (DBH), Tree density (λ), Height of dominant stratum (h), Crown diameters (D), thickness or length (T), Crown length ratio (measured as T/h), Basal Area (BA), Log Volume (V), Crown Closure (CC or CAD), Stand height curve.

Regarding plantations, the products or outputs are the same as for native forests but the intensity and scale is more detailed. The availability of the ECHIDNA™/VSIS combination or simply ECHIDNA™ provides an extensive inventory with more detail than current inventory uses.

Carbon:

The ECHIDNA™/VSIS combination provides effective structural data of the kind sought for biomass estimation. The combination provides the opportunity for new data relations in combination with site data on above ground biomass and root biomass.

The invention claimed is:

1. A ground-based method of determining the spatial statistics of fragmented and spatially variably dispersed objects in a transmissive medium, said method including:
   generating a plurality of pulsed beams of laser energy, said beams having selectively variable width and shape;
   selectively varying the width and shape of said beams;
   directing said beams toward the dispersed objects;
   selectively varying the range and/or angle of scaninig;
   measuring the time and/or phase and intensity of signals returned by the dispersed objects, and
   calculating the apparent reflectance of the dispersed objects as a function of the range of the dispersed objects for each beam width and beam shape;
   whereby the effects of object orientation are taken into account, and if the method surveys a forest and measures the spatial structure and cover of vegetation canopies in the forest, the effect of clumping of foliage and the effect of the angle of distribution of foliage are taken into account.

2. A ground-based method of determining the spatial statistics of fragmented and spatially variably dispersed objects in a transmissive medium as claimed in claim 1, and including:
   calibrating an instrument in accordance with the apparent reflectance calculated.

3. A ground-based system for determining the spatial statistics of fragmented and spatially variably dispersed objects in a transmissive medium, said system including:
   Lidar means for generating a plurality of pulsed beams of laser energy having selectively variable width and shape, for selectively varying the width and shape of said beams, for directing said beams toward the dispersed objects, and for selectively varying the range and/or angle of scanning;
   measuring means for measuring the time and/or phase and intensity of signals returned by the dispersed objects; and
   calculating means for calculating the apparent reflectance of the dispersed objects as a function of the range of the dispersed objects for each beam width and beam shape;
   whereby the system is calibrated in accordance with the apparent reflectance calculated, the effects of obiect orientation are taken into account, and if the method surveys a forest and measures the spatial structure and cover of vegetation canopies in the forest, the effect of clumping of foliage and the effect of the angle of distribution of foliage are taken into account.

4. A ground-based method of determining the spatial statistics of fragmented and spatially variably dispersed objects in a transmissive medium as claimed in claim 1, wherein the method surveys a forest and measures the spatial structure and cover of vegetation canopies in the forest.

5. A ground-based system of determining the spatial statistics of fragmented and spatially variably dispersed objects in a transmissive medium as claimed in claim 3, wherein the system surveys a forest and measures the spatial structure and cover of vegetation canopies in the forest.

6. A ground based method of surveying a forest as claimed in claim 4, said method including:
   taking into account the trade-off between scatterer density and reflectivity by the controlled variation of beam size and range, and by utilising a high sampling rate of return pulse intensity, a small pulse width and a suitable Signal to Noise Ratio.

7. A ground-based method of determining the spatial statistics of fragmented and spatially variably dispersed objects in a transinissive medium as claimed in claim 1, wherein the method surveys an individual measure tree and derives statistical information relating thereto.

8. A ground-based system for determining the spatial statistics of fragmented and spatially variably dispersed objects in a transmissive medium as claimed in claim 3, wherein the system surveys an individual measure tree and derives statistical information relating thereto.

* * * * *